US012703614B2

(12) United States Patent
High et al.

(10) Patent No.: US 12,703,614 B2
(45) Date of Patent: *Aug. 11, 2026

(54) SYSTEMS, DEVICES AND METHODS FOR DETERMINING ITEM AVAILABILITY IN A SHOPPING SPACE

(71) Applicant: Walmart Apollo, LLC, Bentonville, AR (US)

(72) Inventors: Donald R. High, Noel, MO (US); Michael D. Atchley, Eureka Springs, AR (US); David C. Winkle, Leesburg, FL (US)

(73) Assignee: WALMART APOLLO, LLC, Bentonville, AR (US)

( * ) Notice: Subject to any disclaimer, the term of this patent is extended or adjusted under 35 U.S.C. 154(b) by 151 days.

This patent is subject to a terminal disclaimer.

(21) Appl. No.: 18/443,191

(22) Filed: Feb. 15, 2024

(65) Prior Publication Data

US 2024/0191448 A1 Jun. 13, 2024

Related U.S. Application Data

(63) Continuation of application No. 17/551,130, filed on Dec. 14, 2021, now abandoned, which is a (Continued)

(51) Int. Cl.
*B66F 9/06* (2006.01)
*A47F 3/08* (2006.01)
(Continued)

(52) U.S. Cl.
CPC ................ *B66F 9/063* (2013.01); *A47F 3/08* (2013.01); *A47F 10/04* (2013.01); *A47F 13/00* (2013.01);
(Continued)

(58) Field of Classification Search
None
See application file for complete search history.

(56) References Cited

U.S. PATENT DOCUMENTS

| | | | |
|---|---|---|---|
| 2,669,345 | A | 2/1954 | Brown |
| 3,765,546 | A | 10/1973 | Westerling |

(Continued)

FOREIGN PATENT DOCUMENTS

| | | |
|---|---|---|
| CA | 2524037 | 5/2006 |
| CA | 2625885 | 4/2007 |

(Continued)

OTHER PUBLICATIONS

Marder et al (Using image analytics to monitor retail store shelves) (Year: 2015).*

(Continued)

*Primary Examiner* — Mamon Obeid
(74) *Attorney, Agent, or Firm* — Fitch, Even, Tabin & Flannery LLP

(57) ABSTRACT

Systems, apparatuses, and methods for determining item availability are provided. A computer implemented method for determining item availability in a shopping space comprising: receiving a request for an item for purchase, instructing a motorized transport unit to travel to a display space in the shopping space corresponding to the item for the purchase, determining whether the item is available in the display space based on information captured by one or more sensors of the motorized transport unit, and in an event that the item for purchase is not available in the display space: determining an item unavailable response to present to the customer.

15 Claims, 21 Drawing Sheets

Related U.S. Application Data continuation of application No. 16/399,854, filed on Apr. 30, 2019, now abandoned, which is a continuation of application No. 15/288,923, filed on Oct. 7, 2016, now Pat. No. 10,315,897, which is a continuation of application No. 15/061,801, filed on Mar. 4, 2016, now Pat. No. 10,130,232.

(60) Provisional application No. 62/303,021, filed on Mar. 3, 2016, provisional application No. 62/302,547, filed on Mar. 2, 2016, provisional application No. 62/302,567, filed on Mar. 2, 2016, provisional application No. 62/302,713, filed on Mar. 2, 2016, provisional application No. 62/292,084, filed on Feb. 5, 2016, provisional application No. 62/214,826, filed on Sep. 4, 2015, provisional application No. 62/214,824, filed on Sep. 4, 2015, provisional application No. 62/207,858, filed on Aug. 20, 2015, provisional application No. 62/205,548, filed on Aug. 14, 2015, provisional application No. 62/205,569, filed on Aug. 14, 2015, provisional application No. 62/205,555, filed on Aug. 14, 2015, provisional application No. 62/205,539, filed on Aug. 14, 2015, provisional application No. 62/202,744, filed on Aug. 7, 2015, provisional application No. 62/202,747, filed on Aug. 7, 2015, provisional application No. 62/194,131, filed on Jul. 17, 2015, provisional application No. 62/194,119, filed on Jul. 17, 2015, provisional application No. 62/194,121, filed on Jul. 17, 2015, provisional application No. 62/194,127, filed on Jul. 17, 2015, provisional application No. 62/185,478, filed on Jun. 26, 2015, provisional application No. 62/182,339, filed on Jun. 19, 2015, provisional application No. 62/175,182, filed on Jun. 12, 2015, provisional application No. 62/171,822, filed on Jun. 5, 2015, provisional application No. 62/165,579, filed on May 22, 2015, provisional application No. 62/165,416, filed on May 22, 2015, provisional application No. 62/165,586, filed on May 22, 2015, provisional application No. 62/157,388, filed on May 5, 2015, provisional application No. 62/152,421, filed on Apr. 24, 2015, provisional application No. 62/152,465, filed on Apr. 24, 2015, provisional application No. 62/152,440, filed on Apr. 24, 2015, provisional application No. 62/152,630, filed on Apr. 24, 2015, provisional application No. 62/152,711, filed on Apr. 24, 2015, provisional application No. 62/152,610, filed on Apr. 24, 2015, provisional application No. 62/152,667, filed on Apr. 24, 2015, provisional application No. 62/138,877, filed on Mar. 26, 2015, provisional application No. 62/138,885, filed on Mar. 26, 2015, provisional application No. 62/129,726, filed on Mar. 6, 2015, provisional application No. 62/129,727, filed on Mar. 6, 2015.

(51) Int. Cl.

| | |
|---|---|
| *A47F 10/04* | (2006.01) |
| *A47F 13/00* | (2006.01) |
| *A47L 11/40* | (2006.01) |
| *B07C 5/28* | (2006.01) |
| *B07C 5/342* | (2006.01) |
| *B60L 53/36* | (2019.01) |
| *B60L 53/63* | (2019.01) |
| *B60P 3/06* | (2006.01) |
| *B62B 5/00* | (2006.01) |
| *B65F 3/00* | (2006.01) |
| *E01H 5/06* | (2006.01) |
| *E01H 5/12* | (2006.01) |
| *G01C 21/20* | (2006.01) |
| *G01S 1/02* | (2010.01) |
| *G01S 1/70* | (2006.01) |
| *G01S 1/72* | (2006.01) |
| *G05B 19/048* | (2006.01) |
| *G05D 1/00* | (2006.01) |
| *G05D 1/22* | (2024.01) |
| *G05D 1/222* | (2024.01) |
| *G05D 1/223* | (2024.01) |
| *G05D 1/226* | (2024.01) |
| *G05D 1/227* | (2024.01) |
| *G05D 1/247* | (2024.01) |
| *G05D 1/249* | (2024.01) |
| *G05D 1/43* | (2024.01) |
| *G05D 1/48* | (2024.01) |
| *G05D 1/617* | (2024.01) |
| *G05D 1/648* | (2024.01) |
| *G05D 1/69* | (2024.01) |
| *G05D 1/692* | (2024.01) |
| *G05D 1/693* | (2024.01) |
| *G05D 1/695* | (2024.01) |
| *G05D 1/81* | (2024.01) |
| *G06F 3/01* | (2006.01) |
| *G06F 18/214* | (2023.01) |
| *G06Q 10/02* | (2012.01) |
| *G06Q 10/0631* | (2023.01) |
| *G06Q 10/08* | (2023.01) |
| *G06Q 10/083* | (2023.01) |
| *G06Q 10/087* | (2023.01) |
| *G06Q 10/1093* | (2023.01) |
| *G06Q 10/30* | (2023.01) |
| *G06Q 30/016* | (2023.01) |
| *G06Q 30/02* | (2023.01) |
| *G06Q 30/0601* | (2023.01) |
| *G06Q 50/40* | (2024.01) |
| *G06T 7/593* | (2017.01) |
| *G06T 7/73* | (2017.01) |
| *G06V 20/20* | (2022.01) |
| *G06V 20/40* | (2022.01) |
| *G06V 20/52* | (2022.01) |
| *G06V 20/56* | (2022.01) |
| *G06V 20/58* | (2022.01) |
| *G06V 20/64* | (2022.01) |
| *G06V 30/224* | (2022.01) |
| *G08G 1/00* | (2006.01) |
| *G10L 13/00* | (2006.01) |
| *G10L 15/22* | (2006.01) |
| *G10L 17/22* | (2013.01) |
| *H02J 7/50* | (2026.01) |
| *H02J 7/92* | (2026.01) |
| *H04B 10/116* | (2013.01) |
| *H04L 67/12* | (2022.01) |
| *H04L 67/141* | (2022.01) |
| *H04L 67/143* | (2022.01) |
| *H04N 5/77* | (2006.01) |
| *H04N 7/18* | (2006.01) |
| *H04N 13/282* | (2018.01) |
| *H04W 4/02* | (2018.01) |
| *H04W 4/021* | (2018.01) |
| *H04W 4/029* | (2018.01) |
| *H04W 4/30* | (2018.01) |

| | |
|---|---|
| ***H04W 4/33*** | (2018.01) |
| ***H04W 4/40*** | (2018.01) |
| ***H04W 4/80*** | (2018.01) |
| *A47F 10/00* | (2006.01) |
| *A47F 10/02* | (2006.01) |
| *B62B 3/14* | (2006.01) |
| *G01S 5/16* | (2006.01) |
| *G01S 5/18* | (2006.01) |
| *G05B 19/12* | (2006.01) |
| *G06F 16/903* | (2019.01) |
| *G06F 21/60* | (2013.01) |
| *G06K 7/10* | (2006.01) |
| *G06K 7/14* | (2006.01) |
| *G06Q 20/12* | (2012.01) |
| *H02J 7/42* | (2026.01) |
| *H04B 1/38* | (2015.01) |
| *H04L 9/40* | (2022.01) |

(52) U.S. Cl.

CPC ............. *A47L 11/4011* (2013.01); *B07C 5/28* (2013.01); *B07C 5/3422* (2013.01); *B60L 53/36* (2019.02); *B60L 53/63* (2019.02); *B60P 3/06* (2013.01); *B62B 5/0026* (2013.01); *B62B 5/0069* (2013.01); *B62B 5/0076* (2013.01); *B65F 3/00* (2013.01); *E01H 5/061* (2013.01); *E01H 5/12* (2013.01); *G01C 21/206* (2013.01); *G01S 1/02* (2013.01); *G01S 1/70* (2013.01); *G01S 1/7034* (2019.08); *G01S 1/7038* (2019.08); *G01S 1/72* (2013.01); *G05B 19/048* (2013.01); *G05D 1/0011* (2013.01); *G05D 1/0016* (2013.01); *G05D 1/0022* (2013.01); *G05D 1/0027* (2013.01); *G05D 1/0061* (2013.01); *G05D 1/0088* (2013.01); *G05D 1/021* (2013.01); *G05D 1/0214* (2013.01); *G05D 1/0219* (2013.01); *G05D 1/0234* (2013.01); *G05D 1/0246* (2013.01); *G05D 1/0255* (2013.01); *G05D 1/0276* (2013.01); *G05D 1/028* (2013.01); *G05D 1/0289* (2013.01); *G05D 1/0291* (2013.01); *G05D 1/0293* (2013.01); *G05D 1/0297* (2013.01); *G05D 1/04* (2013.01); *G05D 1/22* (2024.01); *G05D 1/222* (2024.01); *G05D 1/223* (2024.01); *G05D 1/226* (2024.01); *G05D 1/227* (2024.01); *G05D 1/247* (2024.01); *G05D 1/249* (2024.01); *G05D 1/43* (2024.01); *G05D 1/48* (2024.01); *G05D 1/617* (2024.01); *G05D 1/648* (2024.01); *G05D 1/69* (2024.01); *G05D 1/692* (2024.01); *G05D 1/693* (2024.01); *G05D 1/695* (2024.01); *G05D 1/81* (2024.01); *G06F 3/017* (2013.01); *G06F 18/214* (2023.01); *G06Q 10/02* (2013.01); *G06Q 10/0631* (2013.01); *G06Q 10/06311* (2013.01); *G06Q 10/08* (2013.01); *G06Q 10/083* (2013.01); *G06Q 10/087* (2013.01); *G06Q 10/1093* (2013.01); *G06Q 10/30* (2013.01); *G06Q 30/016* (2013.01); *G06Q 30/0281* (2013.01); *G06Q 30/0601* (2013.01); *G06Q 30/0605* (2013.01); *G06Q 30/0613* (2013.01); *G06Q 30/0617* (2013.01); *G06Q 30/0619* (2013.01); *G06Q 30/0631* (2013.01); *G06Q 30/0633* (2013.01); *G06Q 30/0635* (2013.01); *G06Q 30/0639* (2013.01); *G06Q 30/0641* (2013.01); *G06Q 50/40* (2024.01); *G06T 7/593* (2017.01); *G06T 7/74* (2017.01); *G06V 20/20* (2022.01); *G06V 20/40* (2022.01); *G06V 20/52* (2022.01); *G06V 20/56* (2022.01); *G06V 20/58* (2022.01); *G06V 20/647* (2022.01); *G06V 30/224* (2022.01); *G08G 1/20* (2013.01); *G10L 13/00* (2013.01); *G10L 15/22* (2013.01); *G10L 17/22* (2013.01); *H02J 7/50* (2026.01); *H02J 7/92* (2026.01); *H04B 10/116* (2013.01); *H04L 67/12* (2013.01); *H04L 67/141* (2013.01); *H04L 67/143* (2013.01); *H04N 5/77* (2013.01); *H04N 7/18* (2013.01); *H04N 7/183* (2013.01); *H04N 7/185* (2013.01); *H04N 13/282* (2018.05); *H04W 4/02* (2013.01); *H04W 4/021* (2013.01); *H04W 4/029* (2018.02); *H04W 4/30* (2018.02); *H04W 4/33* (2018.02); *H04W 4/40* (2018.02); *H04W 4/80* (2018.02); *A47F 2010/005* (2013.01); *A47F 2010/025* (2013.01); *A47L 2201/04* (2013.01); *B07C 2501/0045* (2013.01); *B07C 2501/0054* (2013.01); *B07C 2501/0063* (2013.01); *B60Y 2410/10* (2013.01); *B62B 3/1404* (2013.01); *B62B 5/005* (2013.01); *B65F 2210/168* (2013.01); *G01S 5/16* (2013.01); *G01S 5/18* (2013.01); *G01S 2201/01* (2019.08); *G01S 2201/02* (2019.08); *G05B 19/124* (2013.01); *G05B 2219/23363* (2013.01); *G05B 2219/39107* (2013.01); *G06F 16/90335* (2019.01); *G06F 21/606* (2013.01); *G06K 7/10297* (2013.01); *G06K 7/10821* (2013.01); *G06K 7/1413* (2013.01); *G06Q 10/06315* (2013.01); *G06Q 20/12* (2013.01); *G06T 2207/10028* (2013.01); *G06V 20/44* (2022.01); *G10L 2015/223* (2013.01); *H02J 7/42* (2026.01); *H04B 1/38* (2013.01); *H04L 63/06* (2013.01); *H04L 63/08* (2013.01); *H04L 63/0846* (2013.01); *Y02W 30/82* (2015.05); *Y02W 90/00* (2015.05); *Y02W 90/10* (2015.05); *Y04S 10/50* (2013.01); *Y10S 901/01* (2013.01)

(56) References Cited

U.S. PATENT DOCUMENTS

| | | | |
|---|---|---|---|
| 3,866,780 | A | 2/1975 | Miller |
| 4,071,740 | A | 1/1978 | Paul |
| 4,158,416 | A | 6/1979 | Sergio |
| 4,588,349 | A | 5/1986 | Reuter |
| 4,672,280 | A | 6/1987 | Honjo |
| 4,771,840 | A | 9/1988 | Keller |
| 4,777,416 | A | 10/1988 | George, II |
| 4,791,482 | A | 12/1988 | Barry |
| 4,868,544 | A | 9/1989 | Havens |
| 4,911,608 | A | 3/1990 | Krappitz |
| 5,080,541 | A | 1/1992 | Andre |
| 5,119,087 | A | 6/1992 | Lucas |
| 5,279,672 | A | 1/1994 | Betker |
| 5,287,266 | A | 2/1994 | Malec |
| 5,295,551 | A | 3/1994 | Sukonick |
| 5,363,305 | A | 11/1994 | Cox |
| 5,380,138 | A | 1/1995 | Kasai |
| 5,384,450 | A | 1/1995 | Goetz, Jr. |
| 5,395,206 | A | 3/1995 | Cerny, Jr. |
| 5,402,051 | A | 3/1995 | Fujiwara |
| 5,548,515 | A | 8/1996 | Pilley |
| 5,632,381 | A | 5/1997 | Thust |
| 5,652,489 | A | 7/1997 | Kawakami |
| 5,671,362 | A | 9/1997 | Cowe |
| 5,777,571 | A | 7/1998 | Chuang |
| 5,801,340 | A | 9/1998 | Peter |
| 5,860,485 | A | 1/1999 | Ebbenga |
| 5,917,174 | A | 6/1999 | Moore |
| 5,920,261 | A | 7/1999 | Hughes |

(56) References Cited

U.S. PATENT DOCUMENTS 5,969,317 A 10/1999 Espy
6,018,397 A 1/2000 Cloutier
6,199,753 B1 3/2001 Tracy
6,201,203 B1 3/2001 Tilles
6,240,342 B1 5/2001 Fiegert
6,339,735 B1 1/2002 Peless
6,365,857 B1 4/2002 Maehata
6,374,155 B1 4/2002 Wallach
6,394,519 B1 5/2002 Byers
6,431,078 B2 8/2002 Serrano
6,522,952 B1 2/2003 Arai
6,525,509 B1 2/2003 Petersson
6,535,793 B2 3/2003 Allard
6,550,672 B1 4/2003 Tracy
6,571,197 B1 5/2003 Frank
6,571,693 B1 6/2003 Kaldenberg
6,584,375 B2 6/2003 Bancroft
6,584,376 B1 6/2003 Vankommer
6,587,835 B1 7/2003 Treyz
6,600,418 B2 7/2003 Francis
6,601,759 B2 8/2003 Fife
6,606,411 B1 8/2003 Loui
6,626,632 B2 9/2003 Guenzi
6,633,800 B1 10/2003 Ward
6,655,897 B1 12/2003 Harwell
6,667,592 B2 12/2003 Jacobs
6,672,601 B1 1/2004 Hofheins
6,678,583 B2 1/2004 Nasr
6,688,435 B1 2/2004 Will
6,728,597 B2 4/2004 Didriksen
6,731,204 B2 5/2004 Lehmann
6,745,186 B1 6/2004 Testa
6,752,582 B2 6/2004 Garcia
6,810,149 B1 10/2004 Squilla
6,816,085 B1 11/2004 Haynes
6,832,884 B2 12/2004 Robinson
6,841,963 B2 1/2005 Song
6,850,899 B1 2/2005 Chow
6,883,201 B2 4/2005 Jones
6,885,736 B2 4/2005 Uppaluru
6,886,101 B2 4/2005 Glazer
6,895,301 B2 5/2005 Mountz
6,910,828 B1 6/2005 Hughes
6,937,989 B2 8/2005 McIntyre
6,954,695 B2 10/2005 Bonilla
6,967,455 B2 11/2005 Nakadai
6,975,997 B1 12/2005 Murakami
7,039,499 B1 5/2006 Nasr
7,040,541 B2 * 5/2006 Swartz ................. G06Q 20/343
235/462.46
7,066,291 B2 6/2006 Martins
7,101,113 B2 9/2006 Hughes
7,101,139 B1 9/2006 Benedict
7,117,902 B2 10/2006 Osborne
7,145,562 B2 12/2006 Schechter
7,147,154 B2 12/2006 Myers
7,177,820 B2 2/2007 McIntyre
7,184,586 B2 2/2007 Jeon
7,205,016 B2 4/2007 Garwood
7,206,753 B2 4/2007 Bancroft
7,222,363 B2 5/2007 Rice
7,233,241 B2 6/2007 Overhultz
7,234,609 B2 6/2007 DeLazzer
7,261,511 B2 8/2007 Felder
7,367,245 B2 5/2008 Okazaki
7,381,022 B1 6/2008 King
7,402,018 B2 7/2008 Mountz
7,431,208 B2 10/2008 Feldman
7,447,564 B2 11/2008 Yasukawa
7,463,147 B1 12/2008 Laffoon
7,474,945 B2 1/2009 Matsunaga
7,487,913 B2 2/2009 Adema
7,533,029 B2 5/2009 Mallett
7,554,282 B2 6/2009 Nakamoto
7,556,108 B2 7/2009 Won
7,556,219 B2 7/2009 Page
7,587,756 B2 9/2009 Peart
7,613,544 B2 11/2009 Park
7,627,515 B2 12/2009 Borgs
7,636,045 B2 12/2009 Sugiyama
7,648,068 B2 1/2010 Silverbrook
7,653,603 B1 1/2010 Holtkamp, Jr.
7,658,327 B2 2/2010 Tuchman
7,689,322 B2 3/2010 Tanaka
7,693,605 B2 4/2010 Park
7,693,745 B1 4/2010 Pomerantz
7,693,757 B2 4/2010 Zimmerman
7,706,917 B1 4/2010 Chiappetta
7,716,064 B2 5/2010 McIntyre
7,725,326 B1 * 5/2010 Tracy .................. G06Q 20/204
705/16
7,726,563 B2 6/2010 Scott
7,762,458 B2 7/2010 Stawar
7,783,527 B2 8/2010 Bonner
7,787,985 B2 8/2010 Tsujimoto
7,817,394 B2 10/2010 Mukherjee
7,826,919 B2 11/2010 Dandrea
7,835,281 B2 11/2010 Lee
7,894,932 B2 2/2011 Mountz
7,894,939 B2 2/2011 Zini
7,957,837 B2 6/2011 Ziegler
7,969,297 B2 6/2011 Haartsen
7,996,109 B2 8/2011 Zini
8,010,230 B2 8/2011 Zini
8,032,249 B1 10/2011 Shakes
8,041,455 B2 10/2011 Thorne
8,050,976 B2 11/2011 Staib
8,065,032 B2 11/2011 Stifter
8,065,353 B2 11/2011 Eckhoff-Hornback
8,069,092 B2 11/2011 Bryant
8,083,013 B2 12/2011 Bewley
8,099,191 B2 1/2012 Blanc
8,103,398 B2 1/2012 Duggan
8,195,333 B2 6/2012 Ziegler
8,239,276 B2 8/2012 Lin
8,244,041 B1 8/2012 Silver
8,248,467 B1 8/2012 Ganick
8,260,456 B2 9/2012 Siegel
8,269,456 B2 9/2012 Hui
8,284,240 B2 10/2012 Saint-Pierre
8,295,542 B2 10/2012 Albertson
8,321,303 B1 11/2012 Krishnamurthy
8,325,036 B1 12/2012 Fuhr
8,342,467 B2 1/2013 Stachowski
8,352,110 B1 1/2013 Szybalski
8,359,122 B2 1/2013 Koselka
8,374,926 B2 * 2/2013 Solomon ................ B65G 1/137
705/28
8,380,349 B1 2/2013 Hickman
8,393,846 B1 3/2013 Coots
8,412,400 B2 4/2013 Dandrea
8,423,280 B2 4/2013 Edwards
8,425,153 B1 4/2013 South
8,425,173 B2 4/2013 Lert
8,429,004 B2 4/2013 Hamilton
8,430,192 B2 4/2013 Gillett
8,433,470 B1 4/2013 Szybalski
8,433,507 B2 4/2013 Hannah
8,437,875 B2 5/2013 Hernandez
8,444,369 B2 5/2013 Watt
8,447,863 B1 5/2013 Francis, Jr.
8,452,450 B2 5/2013 Dooley
8,474,090 B2 7/2013 Jones
8,494,908 B2 7/2013 Herwig
8,504,202 B2 8/2013 Ichinose
8,508,590 B2 8/2013 Laws
8,510,033 B2 8/2013 Park
8,511,606 B1 8/2013 Lutke
8,515,580 B2 8/2013 Taylor
8,516,651 B2 8/2013 Jones
8,538,577 B2 9/2013 Bell
8,544,858 B2 10/2013 Eberlein
8,571,700 B2 10/2013 Keller
8,572,712 B2 10/2013 Rice

(56) References Cited

U.S. PATENT DOCUMENTS

| | | | |
|---|---|---|---|
| 8,577,538 | B2 | 11/2013 | Lenser |
| 8,587,662 | B1 | 11/2013 | Moll |
| 8,588,969 | B2 | 11/2013 | Frazier |
| 8,594,834 | B1 | 11/2013 | Clark |
| 8,606,314 | B2 | 12/2013 | Barnesjr |
| 8,606,392 | B2 | 12/2013 | Wurman |
| 8,639,382 | B1 | 1/2014 | Clark |
| 8,645,223 | B2 | 2/2014 | Ouimet |
| 8,649,557 | B2 | 2/2014 | Hyung |
| 8,656,550 | B2 | 2/2014 | Jones |
| 8,670,866 | B2 | 3/2014 | Ziegler |
| 8,671,507 | B2 | 3/2014 | Jones |
| 8,676,377 | B2 | 3/2014 | Siegel |
| 8,676,420 | B2 | 3/2014 | Kume |
| 8,676,480 | B2 | 3/2014 | Lynch |
| 8,700,230 | B1 | 4/2014 | Hannah |
| 8,708,285 | B1 | 4/2014 | Carreiro |
| 8,718,814 | B1 | 5/2014 | Clark |
| 8,724,282 | B2 | 5/2014 | Hiremath |
| 8,732,039 | B1 | 5/2014 | Chen |
| 8,744,626 | B2 | 6/2014 | Johnson |
| 8,751,042 | B2 | 6/2014 | Lee |
| 8,763,199 | B2 | 7/2014 | Jones |
| 8,770,976 | B2 | 7/2014 | Moser |
| 8,775,064 | B2 | 7/2014 | Zeng |
| 8,798,786 | B2 | 8/2014 | Wurman |
| 8,798,840 | B2 | 8/2014 | Fong |
| 8,814,039 | B2 | 8/2014 | Bishop |
| 8,818,556 | B2 | 8/2014 | Sanchez |
| 8,820,633 | B2 | 9/2014 | Bishop |
| 8,825,226 | B1 | 9/2014 | Worley, III |
| 8,831,984 | B2 | 9/2014 | Hoffman |
| 8,838,268 | B2 | 9/2014 | Friedman |
| 8,843,244 | B2 | 9/2014 | Phillips |
| 8,851,369 | B2 | 10/2014 | Biship |
| 8,882,432 | B2 | 11/2014 | Bastian, II |
| 8,886,390 | B2 | 11/2014 | Wolfe |
| 8,892,240 | B1 | 11/2014 | Vliet |
| 8,892,241 | B2 | 11/2014 | Weiss |
| 8,899,903 | B1 | 12/2014 | Saad |
| 8,918,202 | B2 | 12/2014 | Kawano |
| 8,918,230 | B2 | 12/2014 | Chen |
| 8,930,044 | B1 | 1/2015 | Peeters |
| 8,965,561 | B2 | 2/2015 | Jacobus |
| 8,972,045 | B1 | 3/2015 | Mountz |
| 8,972,061 | B2 | 3/2015 | Rosenstein |
| 8,983,647 | B1 | 3/2015 | Dwarakanath |
| 8,989,053 | B1 | 3/2015 | Skaaksrud |
| 9,002,506 | B1 | 4/2015 | Agarwal |
| 9,008,827 | B1 | 4/2015 | Dwarakanath |
| 9,008,829 | B2 | 4/2015 | Worsley |
| 9,014,848 | B2 | 4/2015 | Farlow |
| 9,053,506 | B2 | 6/2015 | Van Nest |
| 9,075,136 | B1 | 7/2015 | Joao |
| 9,129,277 | B2 | 9/2015 | Macintosh |
| 9,170,117 | B1 | 10/2015 | Abuelsaad |
| 9,173,816 | B2 | 11/2015 | Reinhardt |
| 9,190,304 | B2 | 11/2015 | Macknight |
| 9,205,886 | B1 | 12/2015 | Hickman |
| 9,278,839 | B2 | 3/2016 | Gilbride |
| 9,305,280 | B1 | 4/2016 | Berg |
| 9,329,597 | B2 | 5/2016 | Stoschek |
| 9,415,869 | B1 | 8/2016 | Chan |
| 9,494,936 | B2 | 11/2016 | Kerzner |
| 9,495,703 | B1 | 11/2016 | Kaye |
| 9,519,882 | B2 | 12/2016 | Galluzzo |
| 9,534,906 | B2 | 1/2017 | High |
| 9,550,577 | B1 | 1/2017 | Beckman |
| 9,573,684 | B2 | 2/2017 | Kimchi |
| 9,578,282 | B1 | 2/2017 | Sills |
| 9,607,285 | B1 | 3/2017 | Wellman |
| 9,623,923 | B2 | 4/2017 | Riedel |
| 9,649,766 | B2 | 5/2017 | Stubbs |
| 9,656,805 | B1 | 5/2017 | Evans |
| 9,658,622 | B2 | 5/2017 | Walton |
| 9,659,204 | B2 | 5/2017 | Wu |
| 9,663,292 | B1 | 5/2017 | Brazeau |
| 9,663,293 | B2 | 5/2017 | Wurman |
| 9,663,295 | B1 | 5/2017 | Wurman |
| 9,663,296 | B1 | 5/2017 | Dingle |
| 9,747,480 | B2 | 8/2017 | Mcallister |
| 9,757,002 | B2 | 9/2017 | Thompson |
| 9,785,911 | B2 | 10/2017 | Galluzzo |
| 9,796,093 | B2 | 10/2017 | Mascorro Medina |
| 9,801,517 | B2 | 10/2017 | High |
| 9,827,678 | B1 | 11/2017 | Gilbertson |
| 9,875,502 | B2 | 1/2018 | Kay |
| 9,875,503 | B2 | 1/2018 | High |
| 9,896,315 | B2 | 2/2018 | High |
| 9,908,760 | B2 | 3/2018 | High |
| 9,948,917 | B2 | 4/2018 | Inacio De Matos |
| 9,994,434 | B2 | 6/2018 | High |
| 10,017,322 | B2 | 7/2018 | High |
| 10,071,891 | B2 | 9/2018 | High |
| 10,071,892 | B2 | 9/2018 | High |
| 10,071,893 | B2 | 9/2018 | High |
| 10,081,525 | B2 | 9/2018 | High |
| 10,130,232 | B2 * | 11/2018 | Atchley ............. G06Q 30/0631 |
| 10,138,100 | B2 | 11/2018 | Thompson |
| 10,147,069 | B2 | 12/2018 | Galluzzo |
| 10,189,691 | B2 | 1/2019 | High |
| 10,189,692 | B2 | 1/2019 | High |
| 10,214,400 | B2 | 2/2019 | High |
| 10,239,738 | B2 | 3/2019 | High |
| 10,239,739 | B2 | 3/2019 | High |
| 10,239,740 | B2 | 3/2019 | Mchale |
| 10,280,054 | B2 | 5/2019 | High |
| 10,287,149 | B2 | 5/2019 | Thompson |
| 10,303,415 | B1 | 5/2019 | Ananthanarayanan |
| 10,315,897 | B2 * | 6/2019 | High .................. G06Q 30/0613 |
| 10,336,592 | B2 | 7/2019 | Atchley |
| 10,346,794 | B2 | 7/2019 | High |
| 10,351,399 | B2 | 7/2019 | High |
| 10,351,400 | B2 | 7/2019 | High |
| 10,358,326 | B2 | 7/2019 | Atchley |
| 10,424,009 | B1 | 9/2019 | Paton |
| 10,435,279 | B2 | 10/2019 | Taylor |
| 10,466,092 | B1 | 11/2019 | Shiee |
| 10,486,951 | B2 | 11/2019 | High |
| 10,508,010 | B2 | 12/2019 | High |
| 10,570,000 | B2 | 2/2020 | High |
| 10,597,270 | B2 | 3/2020 | High |
| 10,611,614 | B2 | 4/2020 | High |
| 10,633,231 | B2 | 4/2020 | High |
| 10,669,140 | B2 | 6/2020 | High |
| 10,792,814 | B2 * | 10/2020 | Hitchcock ............... H04L 67/52 |
| 10,815,104 | B2 | 10/2020 | Thompson |
| 11,034,563 | B2 | 6/2021 | High |
| 11,046,562 | B2 | 6/2021 | High |
| 11,679,969 | B2 | 6/2023 | High |
| 11,761,160 | B2 | 9/2023 | High |
| 11,840,814 | B2 | 12/2023 | High |
| 12,361,374 | B2 * | 7/2025 | Philip .................. G06Q 10/087 |
| 12,361,379 | B2 * | 7/2025 | Rasulkhani ........ G06Q 10/0875 |
| 2001/0028301 | A1 | 10/2001 | Geiger |
| 2001/0042024 | A1 | 11/2001 | Rogers |
| 2002/0060542 | A1 | 5/2002 | Song |
| 2002/0084323 | A1 | 7/2002 | Benyak |
| 2002/0095342 | A1 | 7/2002 | Feldman |
| 2002/0154974 | A1 | 10/2002 | Fukuda |
| 2002/0156551 | A1 | 10/2002 | Tackett |
| 2002/0158133 | A1 * | 10/2002 | Conzola ............... G07G 1/0045 235/462.45 |
| 2002/0165638 | A1 | 11/2002 | Bancroft |
| 2002/0165643 | A1 | 11/2002 | Bancroft |
| 2002/0165790 | A1 | 11/2002 | Bancroft |
| 2002/0170961 | A1 | 11/2002 | Dickson |
| 2002/0174021 | A1 | 11/2002 | Chu |
| 2003/0028284 | A1 | 2/2003 | Chirnomas |
| 2003/0152679 | A1 | 8/2003 | Garwood |
| 2003/0170357 | A1 | 9/2003 | Garwood |
| 2003/0185948 | A1 | 10/2003 | Garwood |
| 2003/0222798 | A1 | 12/2003 | Floros |
| 2004/0050611 | A1 | 3/2004 | Kamen |

(56) References Cited

U.S. PATENT DOCUMENTS

2004/0068348 A1 4/2004 Jager
2004/0081729 A1 4/2004 Garwood
2004/0093650 A1 5/2004 Martins
2004/0098167 A1 5/2004 Yi
2004/0117063 A1 6/2004 Sabe
2004/0146602 A1 7/2004 Garwood
2004/0203633 A1 10/2004 Knauerhase
2004/0216339 A1 11/2004 Garberg
2004/0217166 A1 11/2004 Myers
2004/0221790 A1 11/2004 Sinclair
2004/0225613 A1 11/2004 Narayanaswami
2004/0249497 A1 12/2004 Saigh
2005/0008463 A1 1/2005 Stehr
2005/0047895 A1 3/2005 Lert
2005/0072651 A1 4/2005 Wieth
2005/0080520 A1 4/2005 Kline
2005/0086051 A1 4/2005 Brulle-Drews
2005/0104547 A1 5/2005 Wang
2005/0149414 A1 7/2005 Schrodt
2005/0154265 A1 7/2005 Miro
2005/0177446 A1 8/2005 Hoblit
2005/0216126 A1 9/2005 Koselka
2005/0222712 A1 10/2005 Orita
2005/0230472 A1 10/2005 Chang
2005/0238465 A1 10/2005 Razumov
2005/0246248 A1 11/2005 Vesuna
2005/0267826 A1 12/2005 Levy
2006/0047550 A1* 3/2006 Dineen ............ G06Q 10/06311 705/7.29
2006/0089844 A1 4/2006 Dickinson
2006/0107067 A1 5/2006 Safal
2006/0147087 A1 7/2006 Goncalves
2006/0163350 A1 7/2006 Melton
2006/0178777 A1 8/2006 Park
2006/0206235 A1 9/2006 Shakes
2006/0210382 A1 9/2006 Mountz
2006/0220809 A1 10/2006 Stigall
2006/0221072 A1 10/2006 Se
2006/0231301 A1 10/2006 Rose
2006/0235570 A1 10/2006 Jung
2006/0241827 A1 10/2006 Fukuchi
2006/0244588 A1 11/2006 Hannah
2006/0279421 A1 12/2006 French
2006/0293810 A1 12/2006 Nakamoto
2007/0005179 A1 1/2007 Mccrackin
2007/0017855 A1 1/2007 Pippin
2007/0017984 A1 1/2007 Mountz
2007/0045018 A1 3/2007 Carter
2007/0049363 A1 3/2007 Green
2007/0061210 A1 3/2007 Chen
2007/0069014 A1 3/2007 Heckel
2007/0072662 A1 3/2007 Templeman
2007/0085682 A1 4/2007 Murofushi
2007/0112461 A1 5/2007 Zini
2007/0125727 A1 6/2007 Winkler
2007/0150368 A1 6/2007 Arora
2007/0152057 A1 7/2007 Cato
2007/0208534 A1* 9/2007 Benfield ................ G16H 10/40 702/179
2007/0222679 A1 9/2007 Morris
2007/0269177 A1 11/2007 Braiman
2007/0269299 A1 11/2007 Ross
2007/0284442 A1 12/2007 Herskovitz
2007/0288123 A1 12/2007 D'Andrea
2007/0288127 A1 12/2007 Haq
2007/0293978 A1 12/2007 Wurman
2008/0011836 A1 1/2008 Adema
2008/0031491 A1 2/2008 Ma
2008/0041644 A1 2/2008 Tudek
2008/0042836 A1 2/2008 Christoper
2008/0075566 A1 3/2008 Benedict
2008/0075568 A1 3/2008 Benedict
2008/0075569 A1 3/2008 Benedict
2008/0077511 A1* 3/2008 Zimmerman ........ G06Q 10/087 705/28
2008/0079820 A1* 4/2008 McSpadden ............. H04N 5/76 348/E7.085
2008/0105445 A1 5/2008 Dayton
2008/0131255 A1 6/2008 Hessler
2008/0140253 A1 6/2008 Brown
2008/0154720 A1 6/2008 Gounares
2008/0201227 A1 8/2008 Bakewell
2008/0226129 A1 9/2008 Kundu
2008/0228600 A1 9/2008 Treyz
2008/0243301 A1 10/2008 Lanigan
2008/0267759 A1 10/2008 Morency
2008/0281515 A1 11/2008 Ann
2008/0281664 A1 11/2008 Campbell
2008/0292439 A1 11/2008 Dunkel
2008/0294288 A1 11/2008 Yamauchi
2008/0306787 A1* 12/2008 Hamilton ........... G06Q 10/0639 705/7.38
2008/0308630 A1 12/2008 Bhogal
2008/0314667 A1 12/2008 Hannah
2009/0063306 A1* 3/2009 Fano .................... G06Q 10/087 705/28
2009/0063307 A1* 3/2009 Groenovelt .......... G06Q 10/087 705/28
2009/0074545 A1 3/2009 Lert
2009/0132250 A1 5/2009 Chiang
2009/0134572 A1 5/2009 Obuchi
2009/0138375 A1 5/2009 Schwartz
2009/0154708 A1 6/2009 Kolar
2009/0155033 A1 6/2009 Olsen
2009/0164902 A1 6/2009 Cohen
2009/0177323 A1 7/2009 Ziegler
2009/0210536 A1 8/2009 Allen
2009/0240571 A1 9/2009 Bonner
2009/0259571 A1 10/2009 Ebling
2009/0265193 A1 10/2009 Collins
2009/0269173 A1 10/2009 De Leo
2009/0299822 A1 12/2009 Harari
2009/0319399 A1 12/2009 Resta
2010/0025964 A1 2/2010 Fisk
2010/0030417 A1 2/2010 Fang
2010/0076959 A1 3/2010 Ramani
2010/0131103 A1 5/2010 Herzog
2010/0138281 A1 6/2010 Zhang
2010/0143089 A1 6/2010 Hvass
2010/0171826 A1 7/2010 Hamilton
2010/0176922 A1 7/2010 Schwab
2010/0191582 A1 7/2010 Dicker
2010/0211441 A1 8/2010 Sprigg
2010/0222925 A1 9/2010 Anezaki
2010/0262278 A1 10/2010 Winkler
2010/0268697 A1 10/2010 Karlsson
2010/0295847 A1 11/2010 Titus
2010/0299065 A1 11/2010 Mays
2010/0302102 A1 12/2010 Desai
2010/0316470 A1 12/2010 Lert
2010/0324773 A1 12/2010 Choi
2011/0010023 A1 1/2011 Kunzig
2011/0022201 A1 1/2011 Reumerman
2011/0055103 A1 3/2011 Swafford, Jr.
2011/0098920 A1 4/2011 Chuang
2011/0153081 A1 6/2011 Romanov
2011/0163160 A1 7/2011 Zini
2011/0176803 A1 7/2011 Song
2011/0225071 A1 9/2011 Sano
2011/0238211 A1 9/2011 Shirado
2011/0240777 A1 10/2011 Johns
2011/0258060 A1 10/2011 Sweeney
2011/0260865 A1 10/2011 Bergman
2011/0279252 A1 11/2011 Carter
2011/0288682 A1 11/2011 Pinter
2011/0288684 A1 11/2011 Farlow
2011/0288763 A1 11/2011 Hui
2011/0295424 A1 12/2011 Johnson
2011/0301757 A1 12/2011 Jones
2011/0320034 A1 12/2011 Dearlove
2011/0320322 A1 12/2011 Roslak
2012/0000024 A1 1/2012 Layton
2012/0029697 A1 2/2012 Ota
2012/0035823 A1 2/2012 Carter

(56) References Cited

U.S. PATENT DOCUMENTS

2012/0046998 A1 2/2012 Staib
2012/0059743 A1 3/2012 Rao
2012/0072303 A1 3/2012 Brown
2012/0134771 A1 5/2012 Larson
2012/0143726 A1 6/2012 Chirnomas
2012/0166241 A1 6/2012 Livingston
2012/0185094 A1 7/2012 Rosenstein
2012/0185355 A1 7/2012 Kilroy
2012/0190386 A1 7/2012 Anderson
2012/0192260 A1 7/2012 Kontsevich
2012/0197431 A1 8/2012 Toebes
2012/0203661 A1 8/2012 Baharloo
2012/0226556 A1 9/2012 Itagaki
2012/0239224 A1 9/2012 Mccabe
2012/0255810 A1 10/2012 Yang
2012/0259732 A1 10/2012 Sasankan
2012/0271758 A1 10/2012 Jammer
2012/0272500 A1 11/2012 Reuteler
2012/0294698 A1 11/2012 Villamar
2012/0296511 A1 11/2012 More
2012/0303263 A1 11/2012 Alam
2012/0303397 A1 11/2012 Prosser
2012/0303479 A1 11/2012 Derks
2012/0330458 A1 12/2012 Weiss
2013/0016011 A1 1/2013 Harriman
2013/0026224 A1 1/2013 Ganick
2013/0030915 A1 1/2013 Statler
2013/0051667 A1 2/2013 Deng
2013/0054052 A1 2/2013 Waltz
2013/0054280 A1 2/2013 Moshfeghi
2013/0060461 A1 3/2013 Wong
2013/0073405 A1 3/2013 Ariyibi
2013/0076726 A1 3/2013 Ferrara
2013/0080289 A1 3/2013 Roy
2013/0096735 A1 4/2013 Byford
2013/0103539 A1 4/2013 Abraham
2013/0105036 A1 5/2013 Smith
2013/0110671 A1 5/2013 Gray
2013/0141555 A1 6/2013 Ganick
2013/0144595 A1 6/2013 Lord
2013/0145572 A1 6/2013 Schregardus
2013/0151335 A1 6/2013 Avadhanam
2013/0155058 A1 6/2013 Golparvar-Fard
2013/0173049 A1 7/2013 Brunner
2013/0174371 A1 7/2013 Jones
2013/0181370 A1 7/2013 Rafie
2013/0211953 A1 8/2013 Abraham
2013/0218453 A1 8/2013 Geelen
2013/0231779 A1 9/2013 Purkayastha
2013/0235206 A1 9/2013 Smith
2013/0238130 A1 9/2013 Dorschel
2013/0245810 A1 9/2013 Sullivan
2013/0254304 A1 9/2013 Van Ness
2013/0276004 A1 10/2013 Boncyk
2013/0300729 A1 11/2013 Grimaud
2013/0302132 A1 11/2013 D'Andrea
2013/0309637 A1 11/2013 Minvielle
2013/0317642 A1 11/2013 Asaria
2013/0333961 A1 12/2013 O'Donnell
2013/0338825 A1 12/2013 Cantor
2014/0006229 A1 1/2014 Birch
2014/0014470 A1 1/2014 Razumov
2014/0019300 A1* 1/2014 Sinclair .............. G06Q 30/0641
705/26.9
2014/0032034 A1 1/2014 Raptopoulos
2014/0032379 A1 1/2014 Schuetz
2014/0037404 A1 2/2014 Hancock
2014/0046512 A1 2/2014 Villamar
2014/0058556 A1 2/2014 Kawano
2014/0067564 A1 3/2014 Yuan
2014/0081445 A1 3/2014 Villamar
2014/0091013 A1 4/2014 Streufert
2014/0100715 A1 4/2014 Mountz
2014/0100768 A1 4/2014 Kessens
2014/0100769 A1 4/2014 Wurman
2014/0100998 A1 4/2014 Mountz
2014/0100999 A1 4/2014 Mountz
2014/0101690 A1 4/2014 Boncyk
2014/0108087 A1 4/2014 Fukui
2014/0124004 A1 5/2014 Rosenstein
2014/0129054 A1 5/2014 Huntzicker
2014/0133943 A1 5/2014 Razumov
2014/0135984 A1 5/2014 Hirata
2014/0136414 A1 5/2014 Abhyanker
2014/0143039 A1 5/2014 Branton
2014/0149958 A1 5/2014 Samadi
2014/0152507 A1 6/2014 Mcallister
2014/0156450 A1 6/2014 Ruckart
2014/0156461 A1 6/2014 Lerner
2014/0157156 A1 6/2014 Kawamoto
2014/0164123 A1 6/2014 Wissner-Gross
2014/0172197 A1 6/2014 Ganz
2014/0172727 A1 6/2014 Abhyanker
2014/0177907 A1 6/2014 Argue
2014/0177924 A1 6/2014 Argue
2014/0180478 A1 6/2014 Letsky
2014/0180528 A1 6/2014 Argue
2014/0180865 A1 6/2014 Argue
2014/0180914 A1 6/2014 Abhyanker
2014/0201001 A1 7/2014 Rellas
2014/0201041 A1 7/2014 Meyer
2014/0207614 A1 7/2014 Ramaswamy
2014/0209514 A1 7/2014 Gitschel
2014/0211988 A1 7/2014 Fan
2014/0214205 A1 7/2014 Kwon
2014/0217242 A1 8/2014 Muren
2014/0228999 A1 8/2014 D'Andrea
2014/0229320 A1 8/2014 Mohammed
2014/0239733 A1 8/2014 Mach
2014/0244026 A1 8/2014 Neiser
2014/0244207 A1 8/2014 Hicks
2014/0246257 A1 9/2014 Jacobsen
2014/0247116 A1 9/2014 Davidson
2014/0250613 A1 9/2014 Jones
2014/0254896 A1 9/2014 Zhou
2014/0257928 A1 9/2014 Chen
2014/0258854 A1 9/2014 Li
2014/0266616 A1 9/2014 Jones
2014/0267409 A1 9/2014 Fein
2014/0274309 A1 9/2014 Nguyen
2014/0277693 A1 9/2014 Naylor
2014/0277742 A1 9/2014 Wells
2014/0277841 A1 9/2014 Klicpera
2014/0285134 A1 9/2014 Kim
2014/0289009 A1 9/2014 Campbell
2014/0292260 A1 10/2014 Dyer
2014/0297090 A1 10/2014 Ichinose
2014/0297362 A1 10/2014 Kumar
2014/0304107 A1 10/2014 Mcallister
2014/0306654 A1 10/2014 Partovi
2014/0309809 A1 10/2014 Dixon
2014/0319889 A1 10/2014 Giampavolo
2014/0330456 A1 11/2014 Lopez Morales
2014/0330677 A1 11/2014 Boncyk
2014/0344011 A1 11/2014 Dogin
2014/0344118 A1 11/2014 Parpia
2014/0350725 A1 11/2014 Lafary
2014/0350851 A1 11/2014 Carter
2014/0350855 A1 11/2014 Vishnuvajhala
2014/0361077 A1 12/2014 Davidson
2014/0369558 A1 12/2014 Holz
2014/0371912 A1 12/2014 Passot
2014/0379588 A1 12/2014 Gates
2015/0006319 A1 1/2015 Thomas
2015/0029339 A1 1/2015 Kobres
2015/0032252 A1 1/2015 Galluzzo
2015/0045992 A1 2/2015 Ashby
2015/0046299 A1 2/2015 Yan
2015/0066283 A1 3/2015 Wurman
2015/0070170 A1 3/2015 Margalit
2015/0073589 A1 3/2015 Khodl
2015/0084584 A1 3/2015 Monks
2015/0088310 A1 3/2015 Pinter
2015/0088703 A1 3/2015 Yan

(56) References Cited

U.S. PATENT DOCUMENTS

| | | | |
|---|---|---|---|
| 2015/0098775 | A1 | 4/2015 | Razumov |
| 2015/0100439 | A1 | 4/2015 | Lu |
| 2015/0100461 | A1 | 4/2015 | Baryakar |
| 2015/0112826 | A1 | 4/2015 | Crutchfield, Jr. |
| 2015/0123973 | A1 | 5/2015 | Larsen |
| 2015/0134403 | A1 | 5/2015 | Schwartz |
| 2015/0142249 | A1 | 5/2015 | Ooga |
| 2015/0149221 | A1 | 5/2015 | Tremblay |
| 2015/0203140 | A1 | 7/2015 | Holtan |
| 2015/0205298 | A1 | 7/2015 | Stoschek |
| 2015/0205300 | A1 | 7/2015 | Caver |
| 2015/0217449 | A1 | 8/2015 | Meier |
| 2015/0217790 | A1 | 8/2015 | Golden |
| 2015/0221854 | A1 | 8/2015 | Melz |
| 2015/0228004 | A1 | 8/2015 | Bednarek |
| 2015/0229906 | A1 | 8/2015 | Inacio De Matos |
| 2015/0231873 | A1 | 8/2015 | Okamoto |
| 2015/0277440 | A1 | 10/2015 | Kimchi |
| 2015/0278889 | A1 | 10/2015 | Qian |
| 2015/0278908 | A1 | 10/2015 | Nice |
| 2015/0297052 | A1 | 10/2015 | Eidmohammadi |
| 2015/0307276 | A1 | 10/2015 | Hognaland |
| 2015/0317708 | A1 | 11/2015 | Eramian |
| 2015/0325128 | A1 | 11/2015 | Lord |
| 2015/0336668 | A1 | 11/2015 | Pasko |
| 2015/0360865 | A1 | 12/2015 | Massey |
| 2015/0379468 | A1 | 12/2015 | Harvey |
| 2016/0016731 | A1 | 1/2016 | Razumov |
| 2016/0023675 | A1 | 1/2016 | Hannah |
| 2016/0052139 | A1 | 2/2016 | Hyde |
| 2016/0101794 | A1 | 4/2016 | Fowler |
| 2016/0101936 | A1 | 4/2016 | Chamberlin |
| 2016/0101940 | A1 | 4/2016 | Grinnell |
| 2016/0110701 | A1 | 4/2016 | Herring |
| 2016/0114488 | A1 | 4/2016 | Mascorro Medina |
| 2016/0132854 | A1 | 5/2016 | Singh |
| 2016/0158635 | A1 | 6/2016 | Aders |
| 2016/0165988 | A1 | 6/2016 | Glasgow |
| 2016/0167557 | A1 | 6/2016 | Mecklinger |
| 2016/0167577 | A1 | 6/2016 | Simmons |
| 2016/0176638 | A1 | 6/2016 | Toebes |
| 2016/0189114 | A1 | 6/2016 | Cattone |
| 2016/0189115 | A1 | 6/2016 | Cattone |
| 2016/0196755 | A1 | 7/2016 | Navot |
| 2016/0207193 | A1 | 7/2016 | Wise |
| 2016/0210602 | A1 | 7/2016 | Siddique |
| 2016/0224857 | A1 | 8/2016 | Zhang |
| 2016/0236867 | A1 | 8/2016 | Brazeau |
| 2016/0247182 | A1 | 8/2016 | Peterson |
| 2016/0255969 | A1 | 9/2016 | High |
| 2016/0257212 | A1 | 9/2016 | Thompson |
| 2016/0257240 | A1 | 9/2016 | High |
| 2016/0257401 | A1 | 9/2016 | Buchmueller |
| 2016/0258762 | A1 | 9/2016 | Taylor |
| 2016/0258763 | A1 | 9/2016 | High |
| 2016/0259028 | A1 | 9/2016 | High |
| 2016/0259329 | A1 | 9/2016 | High |
| 2016/0259331 | A1 | 9/2016 | Thompson |
| 2016/0259339 | A1 | 9/2016 | High |
| 2016/0259340 | A1 | 9/2016 | Kay |
| 2016/0259341 | A1 | 9/2016 | High |
| 2016/0259342 | A1 | 9/2016 | High |
| 2016/0259343 | A1 | 9/2016 | High |
| 2016/0259344 | A1 | 9/2016 | High |
| 2016/0259345 | A1 | 9/2016 | Mchale |
| 2016/0259346 | A1 | 9/2016 | High |
| 2016/0260049 | A1 | 9/2016 | High |
| 2016/0260054 | A1 | 9/2016 | High |
| 2016/0260055 | A1 | 9/2016 | High |
| 2016/0260142 | A1 | 9/2016 | Winkle |
| 2016/0260145 | A1 | 9/2016 | High |
| 2016/0260148 | A1 | 9/2016 | High |
| 2016/0260158 | A1 | 9/2016 | High |
| 2016/0260159 | A1 | 9/2016 | Atchley |
| 2016/0260161 | A1 | 9/2016 | Atchley |
| 2016/0261698 | A1 | 9/2016 | Thompson |
| 2016/0274586 | A1 | 9/2016 | Stubbs |
| 2016/0288601 | A1 | 10/2016 | Gehrke |
| 2016/0288687 | A1 | 10/2016 | Scherle |
| 2016/0297610 | A1 | 10/2016 | Grosse |
| 2016/0300291 | A1 | 10/2016 | Carmeli |
| 2016/0301698 | A1 | 10/2016 | Katara |
| 2016/0325932 | A1 | 11/2016 | Hognaland |
| 2016/0349754 | A1 | 12/2016 | Mohr |
| 2016/0355337 | A1 | 12/2016 | Lert |
| 2016/0364732 | A1 | 12/2016 | Jagatheesan |
| 2016/0364785 | A1 | 12/2016 | Wankhede |
| 2016/0364786 | A1* | 12/2016 | Wankhede ........... G07G 1/0036 |
| 2016/0375579 | A1 | 12/2016 | Muttik |
| 2017/0009417 | A1 | 1/2017 | High |
| 2017/0010608 | A1 | 1/2017 | High |
| 2017/0010609 | A1 | 1/2017 | High |
| 2017/0010610 | A1 | 1/2017 | Atchley |
| 2017/0020354 | A1 | 1/2017 | High |
| 2017/0024806 | A1 | 1/2017 | High |
| 2017/0079202 | A1 | 3/2017 | Balutis |
| 2017/0080846 | A1 | 3/2017 | Lord |
| 2017/0101120 | A1 | 4/2017 | Hannah |
| 2017/0107055 | A1 | 4/2017 | Magens |
| 2017/0110017 | A1 | 4/2017 | Kimchi |
| 2017/0120443 | A1 | 5/2017 | Kang |
| 2017/0129602 | A1 | 5/2017 | Alduaiji |
| 2017/0137235 | A1 | 5/2017 | Thompson |
| 2017/0148075 | A1 | 5/2017 | High |
| 2017/0158430 | A1 | 6/2017 | Raizer |
| 2017/0166399 | A1 | 6/2017 | Stubbs |
| 2017/0176986 | A1 | 6/2017 | High |
| 2017/0178066 | A1 | 6/2017 | High |
| 2017/0178082 | A1 | 6/2017 | High |
| 2017/0183159 | A1 | 6/2017 | Weiss |
| 2017/0193434 | A1 | 7/2017 | Shah |
| 2017/0225321 | A1 | 8/2017 | Deyle |
| 2017/0255900 | A1* | 9/2017 | High ................... G06Q 10/087 |
| 2017/0283171 | A1 | 10/2017 | High |
| 2017/0300759 | A1 | 10/2017 | Beard |
| 2017/0318446 | A1 | 11/2017 | Lee |
| 2017/0355081 | A1 | 12/2017 | Fisher |
| 2018/0009108 | A1 | 1/2018 | Yamamoto |
| 2018/0020896 | A1 | 1/2018 | High |
| 2018/0068357 | A1 | 3/2018 | High |
| 2018/0075403 | A1 | 3/2018 | Mascorro Medina |
| 2018/0099846 | A1 | 4/2018 | High |
| 2018/0170729 | A1 | 6/2018 | High |
| 2018/0170730 | A1 | 6/2018 | High |
| 2018/0273292 | A1 | 9/2018 | High |
| 2018/0282139 | A1 | 10/2018 | High |
| 2018/0346299 | A1 | 12/2018 | High |
| 2018/0346300 | A1 | 12/2018 | High |
| 2019/0002256 | A1 | 1/2019 | High |
| 2019/0082281 | A1 | 3/2019 | Beran |
| 2019/0084814 | A1 | 3/2019 | Thompson |
| 2019/0112171 | A1 | 4/2019 | High |
| 2019/0119083 | A1 | 4/2019 | High |
| 2019/0169005 | A1 | 6/2019 | High |
| 2019/0185302 | A1 | 6/2019 | Mchale |
| 2019/0210849 | A1 | 7/2019 | High |
| 2019/0218081 | A1 | 7/2019 | High |
| 2019/0256334 | A1 | 8/2019 | High |
| 2019/0263644 | A1 | 8/2019 | Atchley |
| 2019/0284034 | A1 | 9/2019 | High |
| 2019/0292030 | A1 | 9/2019 | High |
| 2020/0118064 | A1* | 4/2020 | Perrella ............... G06F 16/2246 |
| 2020/0270106 | A1 | 8/2020 | High |
| 2021/0009391 | A1 | 1/2021 | Thompson |
| 2021/0039930 | A1 | 2/2021 | High |
| 2021/0130092 | A1* | 5/2021 | Hu ........................... B65G 1/10 |
| 2021/0146543 | A1 | 5/2021 | Cristache |
| 2021/0269293 | A1 | 9/2021 | High |
| 2021/0300740 | A1 | 9/2021 | High |
| 2022/0106174 | A1 | 4/2022 | High |
| 2023/0374746 | A1 | 11/2023 | High |
| 2023/0391592 | A1 | 12/2023 | High |

(56) References Cited

U.S. PATENT DOCUMENTS

2024/0068189 A1 2/2024 High
2024/0144169 A1* 5/2024 Kuroda ................ G06Q 10/087

FOREIGN PATENT DOCUMENTS

| | | | |
|---|---|---|---|
| CA | 2833670 | A | 10/2012 |
| CN | 100999277 | | 7/2007 |
| CN | 102079433 | | 6/2011 |
| CN | 202847767 | | 4/2013 |
| CN | 103136923 | | 5/2013 |
| CN | 103213115 | | 7/2013 |
| CN | 203166399 | | 8/2013 |
| CN | 203191819 | | 9/2013 |
| CN | 203401274 | | 1/2014 |
| CN | 203402565 | | 1/2014 |
| CN | 103625808 | | 3/2014 |
| CN | 203468521 | | 3/2014 |
| CN | 103696393 | | 4/2014 |
| CN | 103723403 | | 4/2014 |
| CN | 203512491 | | 4/2014 |
| CN | 103770117 | A | 5/2014 |
| CN | 203782622 | | 8/2014 |
| CN | 104102188 | | 10/2014 |
| CN | 104102219 | | 10/2014 |
| CN | 102393739 | | 12/2014 |
| CN | 204054062 | | 12/2014 |
| CN | 204309852 | | 12/2014 |
| CN | 204331404 | | 5/2015 |
| CN | 105460051 | | 4/2016 |
| DE | 102013013438 | | 2/2015 |
| EP | 861415 | | 5/1997 |
| EP | 1136052 | | 9/2001 |
| EP | 0887491 | | 4/2004 |
| EP | 1439039 | | 7/2004 |
| EP | 1447726 | | 8/2004 |
| EP | 2148169 | | 1/2010 |
| EP | 2106886 | | 3/2011 |
| EP | 2309487 | | 4/2011 |
| EP | 2050544 | | 8/2011 |
| EP | 2498158 | | 9/2012 |
| EP | 2571660 | | 3/2013 |
| EP | 2590041 | | 5/2013 |
| EP | 2608163 | | 6/2013 |
| EP | 2662831 | | 11/2013 |
| EP | 2728533 | A | 5/2014 |
| EP | 2730377 | | 5/2014 |
| EP | 2886020 | | 6/2015 |
| FR | 2710330 | | 3/1995 |
| GB | 1382806 | | 2/1971 |
| GB | 2530626 | | 3/2016 |
| GB | 2542472 | | 3/2017 |
| GB | 2542905 | | 5/2017 |
| JP | 62247458 | | 10/1987 |
| JP | H10129996 | | 5/1998 |
| JP | 2003288396 | | 10/2003 |
| JP | 2005350222 | | 12/2005 |
| JP | 2009284944 | | 12/2009 |
| JP | 2010105644 | | 5/2010 |
| JP | 2010231470 | | 10/2010 |
| KR | 20120100505 | A | 9/2012 |
| WO | 8503277 | A | 8/1985 |
| WO | 9603305 | | 7/1995 |
| WO | 1997018523 | | 5/1997 |
| WO | 9855903 | | 12/1998 |
| WO | 0043850 | A2 | 7/2000 |
| WO | 2000061438 | | 10/2000 |
| WO | 0132366 | | 5/2001 |
| WO | 2004092858 | | 10/2004 |
| WO | 2005102875 | | 11/2005 |
| WO | 2006056614 | | 6/2006 |
| WO | 2006120636 | | 11/2006 |
| WO | 2006137072 | | 12/2006 |
| WO | 2007007354 | | 1/2007 |
| WO | 2007047514 | | 4/2007 |
| WO | 2007149196 | | 12/2007 |
| WO | 2008118906 | | 10/2008 |
| WO | 2008144638 | | 11/2008 |
| WO | 2008151345 | | 12/2008 |
| WO | 2009022859 | | 2/2009 |
| WO | 2009027835 | | 3/2009 |
| WO | 2009103008 | | 8/2009 |
| WO | 2011063527 | | 6/2011 |
| WO | 2012075196 | | 6/2012 |
| WO | 2013138193 | | 9/2013 |
| WO | 2013138333 | | 9/2013 |
| WO | 2013176762 | | 11/2013 |
| WO | 2014022366 | | 2/2014 |
| WO | 2014022496 | | 2/2014 |
| WO | 2014045225 | | 3/2014 |
| WO | 2014046757 | | 3/2014 |
| WO | 2014101714 | | 7/2014 |
| WO | 2014116947 | | 7/2014 |
| WO | 2014138472 | | 9/2014 |
| WO | 2014165286 | | 10/2014 |
| WO | 2015021958 | | 2/2015 |
| WO | 2015104263 | | 7/2015 |
| WO | 2015155556 | | 10/2015 |
| WO | 2016009423 | | 1/2016 |
| WO | 2016015000 | | 1/2016 |
| WO | 2016144765 | | 9/2016 |

OTHER PUBLICATIONS

Kumar et al (Remote Retail Monitoring and Stock Assessment using Mobile Robots) (Year: 2014).*

U.S. Appl. No. 18/144,759, filed May 8, 2023, High Donald R.

U.S. Appl. No. 18/385,282, filed Oct. 30, 2023, High Donald R.

ABBRobotics; "ABB Robotics—Innovative Packaging Solutions", https://www.youtube.com/watch?v=e5jif-IUvHY, published on May 16, 2013, pp. 1-5.

Ang, Fitzwatler, et al.; "Automated Waste Sorter With Mobile Robot Delivery Waste System", De La Salle University Research Congress 2013, Mar. 7-9, 2013, pp. 1-7.

Ansari, Sameer, et al.; "Automated Trash Collection & Removal in Office Cubicle Environments", Squad Collaborative Robots, Sep. 27, 2013, pp. 1-23.

Armstrong, Jean, et al.; "Visible Light Positioning: A Roadmap for International Standardization", IEEE Communications Magazine, Dec. 2013, pp. 2-7.

Artal, U.S., et al.; "Autonomous Mobile Robot with Hybrid PEM Fuel-Cell and Ultracapacitors Energy System, Dedalo 2.0", International Conference on Renewable Energies and Power Quality, Santiago de Compostela, Spain, Mar. 28-30, 2012, pp. 1-6.

Atherton, Kelsey D .; "New GPS Receiver Offers Navigation Accurate to an Inch", Popular Science, www.popsci.com/technology/article/2013-08/global-positioning-down-inches, Aug. 16, 2013, pp. 1-2.

Avezbadalov, Ariel, et al.; "Snow Shoveling Robot", engineering.nyu.edu/mechatronics/projects/ME3484/2006/Snow Shoveling Robot/Mechatronics Snow Robot Presentation Update Dec. 19, 2006.pdf, 2006, pp. 1-24.

Bares, John, et al.; "Designing Crash-Survivable Unmanned Vehicles", AUVSI Symposium, Jul. 10, 2002, pp. 1-15.

Bohren; Jonathan et al.; "Towards Autonomous Robotic Butlers: Lessons Learned with the PR2", Willow Garage, May 9, 2011, pp. 1-8.

Bouchard, Samuel; "A Robot to Clean Your Trash Bin!", Robotiq, http://blog.robotiq.com/bid/41203/A-Robot-to-Clean-your-Trash-Bin, Aug. 22, 2011, pp. 1-7.

Budgee; "The Robotic Shopping Cart Budgee"; https://www.youtube.com/watch?v=2dYNdVPF4VM; published on Mar. 20, 2015; pp. 1-6.

Burns, Tom; "irobot roomba 780 review best robot vacuum floor cleaning robot review video demo", https://www.youtube.com/watch?v=MkwtlyVAaEY, published on Feb. 13, 2013, pp. 1-10.

Bytelight; "Scalable Indoor Location", http://www.bytelight.com/, Dec. 12, 2014, pp. 1-2.

Canadian Manufacturing; "Amazon unleashes army of order-picking robots", http://www.canadianmanufacturing.com/supply-chain/amazon-unleashes-army-order-picking-robots-142902/, Dec. 2, 2014, pp. 1-4.

(56) References Cited

OTHER PUBLICATIONS

Capel, Claudine; "Waste sorting—A look at the separation and sorting techniques in today's European market", Waste Management World, http://waste-management-world.com/a/waste-sorting-a-look-at-the-separation-and-sorting-techniques-in-todayrsquos-european-market, Jul. 1, 2008, pp. 1-8.
Carnegie Mellon Univeristy; "AndyVision—The Future of Retail", https://www.youtube.com/watch?v=n5309ILTV2s, published on Jul. 16, 2012, pp. 1-9.
Carnegie Mellon University; "Robots in Retail", www.cmu.edu/homepage/computing/2012/summer/robots-in-retail.shmtl, 2012, pp. 1.
Chopade, Jayesh, et al.; "Control of Spy Robot By Voice and Computer Commands", International Journal of Advanced Research in Computer and Communication Engineering, vol. 2, Issue 4, Apr. 2013, pp. 1-3.
CNET; "iRobot Braava 380t—No standing ovation for this robotic floor mop", https://www.youtube.com/watch?v=JAtClxFtC6Q, published on May 7, 2014, pp. 1-6.
Coltin, Brian & Ventura, Rodrigo; "Dynamic User Task Scheduling for Mobile Robots", Association for the Advancement of Artificial Intelligence, 2011, pp. 1-6.
Couceiro, Micael S., et al.; "Marsupial teams of robots: deployment of miniature robots for swarm exploration under communication constraints", Robotica, Cambridge University Press, downloaded Jan. 14, 2014, pp. 1-22.
Coxworth, Ben; "Robot designed to sort trash for recycling", Gizmag, http://www.gizmag.com/robot-sorts-trash-for-recycling/18426/, Apr. 18, 2011, pp. 1-7.
Daily Mail; "Dancing with your phone: The gyrating robotic dock that can move along with your music", Sep. 12, 2012, http://www.dailymail.co.uk/sciencetech/article-2202164/The-intelligent-dancing-robot-controlled-mobile-phone.html, pp. 1-23.
Davis, Jo; "The Future of Retail: In Store Now", Online Brands, http://onlinebrands.co.nz/587/future-retail-store-now/, Nov. 16, 2014, pp. 1-5.
Denso; "X-mobility", Oct. 10, 2014, pp. 1-2, including machine translation.
DHL; "Self-Driving Vehicles In Logistics: A Dhl perspective on implications and use cases for the logistics industry", 2014, pp. 1-39.
Dorrier, Jason; "Service Robots Will Now Assist Customers at Lowe's Store", SingularityHUB, http://singularityhub.com/2014/10/29/service-robots-will-now-assist-customers-at-lowes-store/, Oct. 29, 2014, pp. 1-4.
DroneWatch; "Weatherproof Drone XAircraft Has 'Black Box'", DroneWatch, http://www.dronewatch.nl/2015/02/13/weatherproof-drone-van-xaircraft-beschikt-over-zwarte-doos/, Feb. 13, 2015, pp. 1-5.
Dyson US; "See the new Dyson 360 Eye robot vacuum cleaner in action #DysonRobot", https://www.youtube.com/watch?v=OadhuICDAjk, published on Sep. 4, 2014, pp. 1-7.
Edwards, Lin; "Supermarket robot to help the elderly (w/Video)", Phys.Org, http://phys.org/news/2009-12-supermarket-robot-elderly-video.html, Dec. 17, 2009, pp. 1-5.
Elfes, Alberto; "Using Occupancy Grids for Mobile Robot Perception and Navigation", IEEE, 1989, pp. 46-57.
Elkins, Herschel T.; "Important 2014 New Consumer Laws", County of Los Angeles Department of Consumer Affairs Community Outreach & Education, updated Jan. 6, 2014, pp. 1-46.
Emspak, Jesse; "Electric Trucks Plus Drones Could Make Deliveries 'Green'"; https://www.livescience.com/48510-delivery-drones-electric-trucks.html; Oct. 29, 2014; pp. 1-5.
Falconer, Jason; "HOSPI-R drug delivery robot frees nurses to do more important work", Gizmag, http://www.gizmag.com/panasonic-hospi-r-delivery-robot/29565/, Oct. 28, 2013, pp. 1-6.
Falconer, Jason; "Toyota unveils helpful Human Support Robot", Gizmag, http:/www.gizmag.com/toyota-human-support-robot/24246/, Sep. 22, 2012, pp. 1-6.
Farivar, Cyrus; "This in-store robot can show you the hammer aisle, but not the bathroom", Ars Technica, http://arstechnica.com/business/2014/12/this-in-store-robot-can-show-you-the-hammer-aisle-but-not-the-bathroom/, Dec. 3, 2014, pp. 1-4.
Fellow Robots; "Meet OSHBOT", http://fellowrobots.com/oshbot/, May 19, 2015, pp. 1-3.
Fellow Robots; "Oshbot Progress—Fellow Robots", https://vimeo.com/139532370, published Sep. 16, 2015, pp. 1-5.
Follow Inspiration; "wiiGO"; https://www.youtube.com/watch?v=dhHXldpknC4; published on Jun. 16, 2015; pp. 1-7.
FORA.TV; "A Day in the Life of a Kiva Robot", https://www.youtube.com/watch?v=6KRjuuEVEZs, published on May 11, 2011, pp. 1-11.
Gamma2Video; "FridayBeerBot.wmv", https://www.youtube.com/watch?v=KXXIIDYatxQ, published on Apr. 27, 2010, pp. 1-7.
Garun, Natt; "Hop the hands-free suitcase follows you around like an obedient pet"; https://www.digitaltrends.com/cool-tech/hop-the-hands-free-suitcase-follows-you-around-like-an-obedient-pet/; Oct. 10, 2012; pp. 1-6.
Glas, Dylan F., et al.; "The Network Robot System: Enabling Social Human-Robot Interaction in Public Spaces", Journal of Human-Robot Interaction, vol. 1, No. 2, 2012, pp. 5-32.
Green, A., et al.; "Report on evaluation of the robot trolley", CommRob IST-045441, Advanced Behaviour and High-Level Multimodal Communications with and among Robots, Jun. 14, 2010, pp. 10-67.
Gross, H.-M., et al.; TOOMAS: Interactive Shopping Guide Robots in Everyday Use—Final Implementation and Experiences from Long-term Field Trials, Proc. IEEE/RJS Intern. Conf. on Intelligent Robots and Systems (IROS'09), St. Louis, USA, 2009, pp. 2005-2012.
Habib, Maki K., "Real Time Mapping and Dynamic Navigation for Mobile Robots", International Journal of Advanced Robotic Systems, vol. 4, No. 3, 2007, pp. 323-338.
HRJ3 Productions; "Japanese Automatic Golf Cart", https://www.youtube.com/watch?v=8diWYtqb6C0, published on Mar. 29, 2014, pp. 1-4.
Huang, Edward Y.C.; "A Semi-Autonomous Vision-Based Navigation System for a Mobile Robotic Vehicle", Thesis submitted to the Massachusetts Institute of Technology Department of Electrical Engineering and Computer Science on May 21, 2003, pp. 1-76.
IEEE Spectrum; "Warehouse Robots at Work", https://www.youtube.com/watch?v=IWsMdN7HMuA, published on Jul. 21, 2008, pp. 1-11.
Intelligent Autonomous Systems; "TUM James goes shopping", https://www.youtube.com/watch?v=JS2zycc4AUE, published on May 23, 2011, pp. 1-13.
Katic, M., Dusko; "Cooperative Multi Robot Systems for Contemporary Shopping Malls", Robotics Laboratory, Mihailo Pupin Institute, University of Belgrade, Dec. 30, 2010, pp. 10-17.
Kehoe, Ben, et al.; "Cloud-Based Robot Grasping with the Google Object Recognition Engine", 2013, pp. 1-7.
Kendricks, Cooper; "Trash Disposal Robot", https://prezi.com31acae05zf8i/trash-disposal-robot/, Jan. 9, 2015, pp. 1-7.
Kibria, Shafkat, "Speech Recognition for Robotic Control", Master's Thesis in Computing Science, Umea University, Dec. 18, 2005, pp. 1-77.
King, Rachael; "Newest Workers for Lowe's: Robots", The Wall Street Journal, http:/www.wsj.com/articles/newest-workers-for-lowes-robots-1414468866, Oct. 28, 2014, pp. 1-4.
Kitamura, Shunichi; "Super Golf Cart with Remote drive and NAVI system in Japan", https://www.youtube.com/watch?v=2_3-dUR12F8, published on Oct. 4, 2009, pp. 1-6.
Kiva Systems; "Automated Goods-to-Man Order Picking System—Kiva Systems", http://www.kivasystems.com/solutions/picking/, printed on Apr. 2, 2015, pp. 1-2.
Kiva Systems; "Frequently Asked Questions about Kiva Systems—Kiva Systems", http://kivasystems.com/about-us-the-kiva-approach/faq/, printed on Apr. 2, 2015, pp. 1-2.
Kiva Systems; "how a Kiva system makes use of the vertical space—Kiva Systems", http://www.kivasystems.com/solutions/vertical-storage/, printed on Apr. 2, 2015, pp. 1-2.

(56) References Cited

OTHER PUBLICATIONS

Kiva Systems; "How Kiva Systems and Warehouse Management Systems Interact", 2010, pp. 1-12.
Kiva Systems; "Kiva replenishment is more productive and accurate than replenishing pick faces in traditional distribution operations", http//www.kivasystems.com/solutions/replenishment/, printed on Apr. 2, 2015, pp. 1-2.
Kiva Systems; "Kiva warehouse control software, Kiva WCS—Kiva Systems", http://www.kivasystems.com/solutions/software/, printed on Apr. 2, 2015, pp. 1-2.
Kiva Systems; "Kiva's warehouse automation system is the most powerful and flexible A . . . ", http://www.kivasystems.com/solutions/, printed on Apr. 2, 2015, pp. 1-2.
Kiva Systems; "Shipping Sortation—Kiva Systems", http://www.kivasystems.com/solutions/shipping-sortation/, printed on Apr. 2, 2015, pp. 1-2.
Kiva's Robot Hit Their Stride; photo by Wade Roush; https://xconomy.com/boston/2008/04/21/kivas-robots-hit-their-strideer-slide/ Year: 2008).
Kohtsuka, T. et al.; "Design of a Control System for Robot Shopping Carts"; KES'11 Proceedings of the 15th International Conference on Knowledge-Based and Intelligent Information and Engineering Systems; Sep. 12-14, 2011; pp. 280-288.
Kohtsuka, Takafumi, et al.; "Design of a Control System for Robot Shopping Carts", Knowledge-Based and Intelligent Information and Engineering Systems, 15th International Conference, KES 2011, Kaiserslautern, Germany, Sep. 12-14, 2011, pp. 4.
Koubaa, Anis; "A Service-Oriented Architecture for Virtualizing Robots in Robot-as-a-Service Clouds", 2014, pp. 1-13.
Kumar Paradkar, Prashant; "Voice Controlled Robotic Project using interfacing of Ardruino and Bluetooth HC-05", Robotics_Projects_C/C++_Android, Jan. 23, 2016, pp. 1-14.
Kumar, Swagat; "Robotics-as-a-Service: Transforming the Future of Retail", Tata Consultancy Services, http://www.tcs.com/resources/white_papers/Pages/Robotics-as-Service.aspx, printed on May 13, 2015, pp. 1-4.
Lejepekov, Fedor; "Yuki-taro. Snow recycle robot.", https://www.youtube.com/watch?v=gl2j9PY4jGY, published on Jan. 17, 2011, pp. 1-4.
Liu, Xiaohan, et al.; "Design of an Indoor Self-Positioning System for the Visually Impaired—Simulation with RFID and Bluetooth in a Visible Light Communication System", Proceedings of the 29th Annual International Conference of the IEEE EMBS, Cite Internationale, Lyon, France, Aug. 23-26, 2007, pp. 1655-1658.
Lowe's Home Improvement; "OSHbots from Lowe's Innovation Labs", https://www.youtube.com/watch?v=W-RKAjP1dtA, published on Dec. 15, 2014, pp. 1-8.
Lowe's Innovation Labs; "Autonomous Retail Service Robots", http://www.lowesinnovationlabs.com/innovation-robots/, printed on Feb. 26, 2015, pp. 1-4.
Matos, Luis; "wi-GO—The autonomous and self-driven shopping cart"; https://www.indiegogo.com/projects/wi-go-the-autonomous-and-self-driven-shopping-cart; printed on Feb. 27, 2015, pp. 1-16.
Meena, M., & Thilagavathi, P.; "Automatic Docking System with Recharging and Battery Replacement for Surveillance Robot", International Journal of Electronics and Computer Science Engineering, 2012, pp. 1148-1154.
Messieh, Nancy; "Humanoid robots will be roaming Abu Dhabi's malls next year", The Next Web, Oct. 17, 2011, https://thenextweb.com/me/2011/10/17/humanoid-robots-will-be-roaming-abu-dhabis-malls-next-year/, pp. 1-6.
Murph, Darren; "B.O.S.S. shopping cart follows you around", Engadget, http://www.engadget.com/2006/08/11/b-o-s-s-shopping-cart-follows-you-around/, Aug. 11, 2006, pp. 1-4.
Nakajima, Madoka & Haruyama, Shinichiro; "New indoor navigation system for visually impaired people using visible light communication", EURASIP Journal on Wireless Communications and Networking, 2013, pp. 1-10.
NEUROBTV; "Shopping Robot TOOMAS 2009", https://www.youtube.com/watch?v=49Pkm30qmQU, published on May 8, 2010, pp. 1-7.
Nickerson, S.B., et al.; "An autonomous mobile robot for known industrial environments", Autonomous Robot for a Known environment, Aug. 28, 1997, pp. 1-28.
Nishimura, S. et al.; "Development of Attachable Modules for Robotizing Daily Items: Person Following Shopping Cart Robot"; Proceedings of the 2007 IEEE International Conference on Robotics and Biomimetics (Sanya, China); Dec. 15-18, 2007; pp. 1506-1511.
O'Donnell, Jake; "Meet the Bluetooth-Connected Self-Following Robo-Caddy of the Future", Sportsgrid; http://www.sportsgrid.com/uncategorized/meet-the-bluetooth-connected-self-following-robo-caddy-of-the-future/, Apr. 22, 2014, pp. 1-5.
Ogawa, Keisuke; "Denso Demos In-wheel Motor System for Baby Carriages, Shopping Carts", Nikkei Technology, http://techon.nikkeiibp.co.jp/english/NEWS_EN/20141010/381880/?ST=english_PRINT, Oct. 10, 2014, pp. 1-2.
Onozato, Taishi et al.; "A Control System for the Robot Shopping Cart"; 2010 IRAST International Congress on Computer Applications and Computational Science (CACS 2010); 2010; pp. 907-910.
Orchard Supply Hardware; "Orchard Supply Hardware's OSHbot", https://www.youtube.com/watch?v=Sp9176vm7Co, published on Oct. 28, 2014, pp. 1-9.
Osborne, Charlie; "Smart Cart Follows You When Grocery Shopping", Smartplanet, http://www.smartplanet.com/blog/smart-takes/smart-cart-follows-you-when-grocery-shopping/, Feb. 29, 2012, pp. 1-4.
Owano, Nancy; "HEARBO robot can tell beeps, notes, and spoken word (w/ Video)", Phys.org, Nov. 21, 2012, https://phys.org/news/2012-11-hearbo-robot-beeps-spoken-word.html, pp. 1-4.
PCT; App No. PCT/US2016/020919; International Search Report & Written Opinion mailed May 17, 2016; (16 pages).
PCT; App. No. PCT/IB2016/050852; International Search Report and Written Opinion mailed Jun. 10, 2016; (14 pages).
Poudel, Dev Bahadur; "Coordinating Hundreds of Cooperative, Autonomous Robots in a Warehouse", Jan. 27, 2013, pp. 1-13.
Robotlab Inc.; "NAO robot drives autonomously it's own car", https://www.youtube.com/watch?v=0BHYwYlo1UE, published on Sep. 8, 2014, pp. 1-6.
Rodriguez, Ashley; "Meet Lowe's Newest Sales Associate—OSHbot, the Robot", Advertising Age, http://adage.com/article/cmo-strategy/meet-lowe-s-newest-sales-associate-oshbot-robot/295591/, Oct. 28, 2014, pp. 1-8.
Sales, Jorge, et al.; "CompaRob: The Shopping Cart Assistance Robot", International Journal of Distributed Sensor Networks, vol. 2016, Article ID 4781280, Jan. 3, 2016, http://dx.doi.org/10.1155/2016/4781280, pp. 1-16.
Scholz, J. et al.; "Cart Pushing with a Mobile Manipulation System: Towards Navigation with Moveable Objects"; Proceedings of the 2011 IEEE International Conference on Robotics and Automation (Shanghai, China); May 9-13, 2011; pp. 6115-6120.
Sebaali, G., et al.; "Smart Shopping Cart", Department of Electrical and Computer Engineering, American University of Beirut, 2014, pp. 1-6.
Shandrow, Kim Lachance; "This shopping cart of the future creepily follows you around stores"; https://www.entrepreneur.com/article/241335; Dec. 31, 2014; pp. 1-13.
Shukla, Neha; "SaviOne the Butler Bot: Service Robot for Hospitality Industry", TechieTonics, http://www.techietonics.com/robo-tonics/savione-the-butler-bot-service-for-hospitality-industry.html, Aug. 14, 2014, pp. 1-5.
SK Telecom Co.; "SK Telecom Launches Smart Cart Pilot Test in Korea"; http://www.sktelecom.com/en/press/press_detail.do?idx=971; Oct. 4, 2011; pp. 1-2.
Song, Guangming, et al.; "Automatic Docking System for Recharging Home Surveillance Robots", http://www.academia.edu/6495007/Automatic_Docking_System_for_Recharging_Home_Surveillance_Robots, IEEE Transactions on Consumer Electronics, vol. 57, No. 2, May 2011, pp. 1-8.
Soper, Taylor; "Amazon vet's new robot-powered apparel startup aims to revolutionize how we buy clothes", GeekWire, http://www.

(56) References Cited

OTHER PUBLICATIONS geekwire.com/2012/hointer-robot-jeans-clothing-apparel-store-startup/, Nov. 29, 2012, pp. 1-12.
Stewart Golf; "Introducing the New Stewart Golf X9 Follow", https://www.youtube.com/watch?v=HHivFGtiuE, published on Apr. 9, 2014, pp. 1-9.
Sun, Eric; "Smart Bin & Trash Route system—RMIT 2012 Green Inventors Competition", http://www.youtube.com/watch?v=OrTA57aIO0k, published on Nov. 14, 2012, pp. 1-8.
Superdroid Robots; "Cool Robots, Making Life Easier", http://www.superdroidrobots.com/shop/custom.aspx/cool-robots-making-life-easier/83/, printed on Jun. 16, 2015, pp. 1-7.
Swisslog; "RoboCourier Autonomous Mobile Robot", http://www.swisslog.com/en/Products/HCS/Automated-Material-Transport/RoboCourier-Autonomous-Mobile-Robot, printed May 27, 2015, pp. 1.
Tam, Donna; "Meet Amazon's busiest employee—the Kiva robot", CNET, http://www.cnet.com/news/meet-amazons-busiest-employee-the-kiva-robot/, Nov. 30, 2014, pp. 1-6.
Technion; "Autonomous Tracking Shopping Cart—Shopping Made Easy from Technion"; https://www.youtube.com/watch?v=pQcb9fofmXg; published on Nov. 23, 2014; pp. 1-10.
UKIPO; App. No. GB1612303.6; Examination Report under Section 18(3) mailed Aug. 30, 2017.
UKIPO; App. No. GB1613519.6; Examination Report under Section 18(3) mailed Oct. 10, 2017.
UKIPO; App. No. GB1703373.9; Examination Report mailed Feb. 13, 2019; (3 pages).
UKIPO; App No. 1721654.0; Office Action mailed Jun. 28, 18; (3 pages).
UKIPO; App No. 1721664.9; Office Action mailed Jun. 29, 18; ( 3 pages).
UKIPO; App No. 1721666.4; Office Action mailed Jun. 28, 18; (3 pages).
UKIPO; App. No. 1602881.3; Office Action mailed Feb. 1, 2018; (5 pages).
UKIPO; App. No. 1613873.7; Office Action mailed Sep. 26, 2018; (5 pages).
UKIPO; App. No. 1714769.5; Office Action mailed Mar. 27, 2018; ( 7 pages).
UKIPO; App. No. 1715523.5; Office Action mailed Mar. 26, 2018; (6 pages).
UKIPO; App. No. 1806952.6; Office Action mailed Sep. 17, 2018; (5 pages).
UKIPO; App. No. GB1602881.3; Combined Search and Examination Report mailed Jun. 23, 2016; (7 pages).
UKIPO; App. No. GB1612298.8; Examination Report under Section 18(3) mailed Sep. 6, 2017; (8 pages).
UKIPO; App. No. GB1612303.6; Combined Search and Examination Report under Sections 17 and 18(3) mailed Jan. 17, 2017.
UKIPO; App. No. GB1612320.0; Combined Search and Examination Report under Sections 17 and 18(3) mailed Jan. 12, 2017; (12 pages).
UKIPO; App. No. GB1612320.0; Examination Report mailed Aug. 31, 2017; (7 pages).
UKIPO; App. No. GB1612321.8; Combined Search & Examination Report under Sections 17 and 18(3) mailed Jan. 16, 2017; (9 pages).
UKIPO; App. No. GB1612321.8; Examination Report under Section 18(3) mailed Aug. 31, 2017; (5 pages).
UKIPO; App. No. GB1613518.8; Combined Search and Examination Report under Sections 17 and 18(3) mailed Feb. 7, 2017; (11 pages).
UKIPO; App. No. GB1613518.8; Office Action mailed Sep. 12, 2017; (5 pages).
UKIPO; App. No. GB1613519.6; Combined Search and Examination Report under Sections 17 and 18(3) mailed Jan. 30, 2017; (11 pages).
UKIPO; App. No. GB1613519.6; Examination Report under Section 18(3) mailed Jun. 27, 2017; (5 pages).
UKIPO; App. No. GB1613851.3; Combined Search and Examination Report mailed Jan. 9, 2017; (6 pages).
UKIPO; App. No. GB1613851.3; Examination Report mailed Feb. 9, 2018; (4 pages).
UKIPO; App. No. GB1613851.3; Examination Report mailed Dec. 4, 2018; (5 pages).
UKIPO; App. No. GB1613851.3; Office Action mailed May 28, 2019; (6 pages).
UKIPO; App. No. GB1613870.3; Combined Search and Examination Report under Sections 17 and 18(3) mailed Feb. 10, 2017; (11 pages).
UKIPO; App. No. GB1613873.7; Combined Search and Examination Report under Sections 17 and 18(3) mailed Feb. 1, 2017; (8 pages).
UKIPO; App. No. GB1613873.7; Examination Report mailed Jul. 22, 2019; (5 pages).
UKIPO; App. No. GB1613873.7; Office Action mailed Oct. 31, 2019; (6 pages).
UKIPO; App. No. GB1701922.5; Office Action mailed Feb. 27, 2019; (3 pages).
UKIPO; App. No. GB1701922.5; Office Action mailed Jul. 20, 2017; (10 pages).
UKIPO; App. No. GB1703372.1; Combined Search and Examination Report mailed Aug. 31, 2017; (5 pages).
UKIPO; App. No. GB1703373.9; Examination Report mailed Aug. 31, 2018; (3 pages).
UKIPO; App. No. GB1703373.9; Office Action mailed Aug. 31, 2017; (6 pages).
UKIPO; App. No. GB1703444.8; Combined Search and Examination Report mailed Aug. 8, 2017; (7 pages).
UKIPO; App. No. GB1703444.8; Examination Report mailed Sep. 17, 2018; (3 pages).
UKIPO; App. No. GB1704956.0; Office Action mailed Sep. 21, 2017; GB (7 pages).
UKIPO; App. No. GB1714329.8; Combined Search and Examination Report mailed Feb. 27, 2018; (8 pages).
UKIPO; App. No. GB1714329.8; Examination Report mailed Jul. 22, 2019; (3 pages).
UKIPO; App. No. GB1714769.5; Office Action mailed Feb. 28, 2019; (3 pages).
UKIPO; App. No. GB1715523.5; Office Action mailed Mar. 4, 2019; (5 pages).
UKIPO; App. No. GB1721298.6; Examination Report mailed Jun. 28, 2018; (3 pages).
UKIPO; App. No. GB1721298.6; Office Action mailed Jan. 31, 2018; (5 pages).
UKIPO; App. No. GB1721298.6; Office Action mailed Jun. 28, 2018; (3 pages).
UKIPO; App. No. GB1721654.0; Examination Report mailed Jun. 28, 2018; (3 pages).
UKIPO; App. No. GB1721654.0; Office Action mailed Jan. 26, 2018; (8 pages).
UKIPO; App. No. GB1721664.9; Examination Report mailed Jun. 29, 2018; (3 pages).
UKIPO; App. No. GB1721664.9; Office Action mailed Jan. 24, 2018; (5 pages).
UKIPO; App. No. GB1721666.4; Examination Report mailed Jun. 28, 2018; (3 pages).
UKIPO; App. No. GB1721666.4; Office Action mailed Jan. 24, 2018; (5 pages).
UKIPO; App. No. GB1804414.9; Combined Search and Examination Report mailed Sep. 20, 2018; (8 pages).
UKIPO; App. No. GB1809524.0; Combined Search and Examination Report mailed Dec. 5, 2018; (5 pages).
UKIPO; App. No. GB1815686.9; Combined Search and Examination Report mailed Mar. 4, 2019; (6 pages).
UKIPO; App. No. GB1815687.7; Combined Search and Examination Report mailed Mar. 5, 2019; (6 pages).
UKIPO; App. No. GB1816227.1; Combined Search and Examination Report mailed Mar. 1, 2019; (4 pages).
UKIPO; App. No. GB1816227.1; Examination Report mailed Nov. 29, 2019; (2 pages).

(56) References Cited

OTHER PUBLICATIONS

UKIPO; App. No. GB1908036.5; Combined Search and Examination Report mailed Jul. 11, 2019; (6 pages).
UKIPO; App. No. GB1908036.5; Examination Report mailed Aug. 19, 2019; (4 pages).
UKIPO; App. No. GB1908038.1; Combined Search and Examination Report mailed Jul. 15, 2019; (17 pages).
Universal Robotics; "Neocortex Enables Random Part Handling and Automated Assembly", http://www.universalrobotics.com/random-bin-picking, printed on Dec. 22, 2015, pp. 1-3.
Uphigh Productions; "Behold the Future (E017 Robot Sales Assistant)", https://www.youtube.com/watch?v=8WbvjaPm7d4, published on Nov. 19, 2014, pp. 1-7.
Urankar, Sandeep, et al.; "Robo-Sloth: A Rope-Climbing Robot", Department of Mechanical Engineering, Indian Institute of Technology, 2003, pp. 1-10.
U.S. Appl. No. 15/061,507; Office Action mailed Jun. 13, 2017; (15 pages).
U.S. Appl. No. 15/447,202; Office Action mailed Apr. 2, 2019; (17 pages).
U.S. Appl. No. 16/001,774; Notice of Allowance mailed Jul. 28, 2020, (7 pages).
U.S. Appl. No. 16/282,888; Notice of Allowance mailed Apr. 16, 2020, (pp. 1-7).
U.S. Appl. No. 15/060,953; Notice of Allowance mailed Dec. 21, 2018; (5 pages).
U.S. Appl. No. 15/060,953; Office Action mailed Feb. 7, 2018; (15 pages).
U.S. Appl. No. 15/060,953; Office Action mailed Jul. 27, 2018; (19 pages).
U.S. Appl. No. 15/061,025; Corrected Notice of Allowability mailed Feb. 18, 2017; (2 pages).
U.S. Appl. No. 15/061,025; Corrected Notice of Allowability mailed Dec. 21, 2017; (4 pages).
U.S. Appl. No. 15/061,025; Notice of Allowance mailed May 26, 2017; (8 pages).
U.S. Appl. No. 15/061,025; Notice of Allowance mailed Aug. 30, 2017; (5 pages).
U.S. Appl. No. 15/061,054; Notice of Allowance mailed Apr. 10, 2017; (7 pages).
U.S. Appl. No. 15/061,054; Notice of Allowance mailed Sep. 8, 2017; (8 pages).
U.S. Appl. No. 15/061,054; Office Action mailed Dec. 12, 2016; (8 pages).
U.S. Appl. No. 15/061,203; Notice of Allowance mailed May 8, 2018; (5 pages).
U.S. Appl. No. 15/061,203; Office Action mailed Aug. 7, 2017; (18 pages).
U.S. Appl. No. 15/061,203; Office Action mailed Dec. 12, 2017; (18 pages).
U.S. Appl. No. 15/061,265; Notice of Allowance mailed Nov. 9, 2018; (8 pages).
U.S. Appl. No. 15/061,265; Office Action mailed Jul. 24, 2018; (10 pages).
U.S. Appl. No. 15/061,285; Notice of Allowance mailed Feb. 27, 2018; (5 pages).
U.S. Appl. No. 15/061,285; Notice of Allowance mailed Jul. 30, 2018; (5 pages).
U.S. Appl. No. 15/061,285; Office Action mailed Aug. 29, 2017; (11 pages).
U.S. Appl. No. 15/061,325; Notice of Allowance mailed May 15, 2017; (5 pages).
U.S. Appl. No. 15/061,325; Notice of Allowance mailed Aug. 18, 2017; (5 pages).
U.S. Appl. No. 15/061,325; Office Action mailed Jan. 26, 2017; (9 pages).
U.S. Appl. No. 15/061,350; Notice of Allowance mailed Nov. 1, 2017; (5 pages).
U.S. Appl. No. 15/061,350; Office Action mailed May 16, 2017; (7 pages).
U.S. Appl. No. 15/061,402; Notice of Allowance mailed Nov. 27, 2017; (5 pages).
U.S. Appl. No. 15/061,402; Office Action mailed Aug. 4, 2017; (15 pages).
U.S. Appl. No. 15/061,406; Notice of Allowance mailed May 15, 2018; (5 pages).
U.S. Appl. No. 15/061,406; Office Action mailed Dec. 19, 2017; (17 pages).
U.S. Appl. No. 15/061,443; Notice of Allowance mailed Mar. 22, 2019; (8 pages).
U.S. Appl. No. 15/061,443; Notice of Allowance mailed Nov. 6, 2018; (8 pages).
U.S. Appl. No. 15/061,443; Office Action mailed Apr. 4, 2018; (13 pages).
U.S. Appl. No. 15/061,474; Notice of Allowance mailed Oct. 24, 2017; (8 pages).
U.S. Appl. No. 15/061,474; Office Action mailed Jul. 7, 2017; (19 pages).
U.S. Appl. No. 15/061,507; Notice of Allowance mailed Nov. 9, 2018; (8 pages).
U.S. Appl. No. 15/061,507; Office Action mailed Jun. 22, 2018; (19 pages).
U.S. Appl. No. 15/061,507; Office Action mailed Dec. 5, 2017; (15 pages).
U.S. Appl. No. 15/061,671; Notice of Allowance mailed May 24, 2019; (11 pages).
U.S. Appl. No. 15/061,671; Office Action mailed Feb. 1, 2019; (20 pages).
U.S. Appl. No. 15/061,671; Office Action mailed Apr. 18, 2018; (18 pages).
U.S. Appl. No. 15/061,671; Office Action mailed Aug. 1, 2018; (26 pages).
U.S. Appl. No. 15/061,671; Office Action mailed Oct. 13, 2017; (15 pages).
U.S. Appl. No. 15/061,677; Office Action mailed Feb. 5, 2020; (28 pages).
U.S. Appl. No. 15/061,677; Office Action mailed Jun. 14, 2018; (18 pages).
U.S. Appl. No. 15/061,677; Office Action mailed Jul. 30, 2019; (27 pages).
U.S. Appl. No. 15/061,677; Office Action mailed Dec. 18, 2018; (21 pages).
U.S. Appl. No. 15/061,686; Notice of Allowance mailed Jan. 26, 2017; (8 pages).
U.S. Appl. No. 15/061,686; Notice of Allowance mailed May 5, 2017; (7 pages).
U.S. Appl. No. 15/061,686; Notice of Allowance mailed Oct. 28, 2016; (7 pages).
U.S. Appl. No. 15/061,688; Notice of Allowance mailed Mar. 9, 2020; (6 pages).
U.S. Appl. No. 15/061,688; Office Action mailed Mar. 26, 2018; (18 pages).
U.S. Appl. No. 15/061,688; Office Action mailed Oct. 25, 2017; (15 pages).
U.S. Appl. No. 15/061,722; Notice of Allowance mailed Mar. 19, 2019; (5 pages).
U.S. Appl. No. 15/061,722; Office Action mailed Sep. 26, 2018; (13 pages).
U.S. Appl. No. 15/061,770; Notice of Allowance mailed May 1, 2020, (9 pages).
U.S. Appl. No. 15/061,770; Office Action mailed May 14, 2019; (13 pages).
U.S. Appl. No. 15/061,770; Office Action mailed Nov. 9, 2018; (10 pages).
U.S. Appl. No. 15/061,792; Corrected Notice of Allowability mailed Apr. 24, 2019; (5 pages).
U.S. Appl. No. 15/061,792; Notice of Allowance dated Mar. 12, 2019; (9 pages).
U.S. Appl. No. 15/061,792; Office Action mailed Oct. 29, 2018; (13 pages).
U.S. Appl. No. 15/061,801; Notice of Allowance mailed Mar. 2, 2018; (5 pages).

(56) References Cited

OTHER PUBLICATIONS

U.S. Appl. No. 15/061,801; Notice of Allowance mailed Jul. 20, 2018; (5 pages).
U.S. Appl. No. 15/061,801; Notice of Allowance mailed Oct. 20, 2017; (5 pages).
U.S. Appl. No. 15/061,801; Office Action mailed Jul. 3, 2017; (9 pages).
U.S. Appl. No. 15/061,805; Office Action mailed May 3, 2017; (10 pages).
U.S. Appl. No. 15/061,805; Office Action mailed Nov. 9, 2017; (12 pages).
U.S. Appl. No. 15/061,844; Notice of Allowance mailed Aug. 31, 2016; (8 pages).
U.S. Appl. No. 15/061,848; Notice of Allowance mailed Nov. 14, 2018; (5 pages).
U.S. Appl. No. 15/061,848; Office Action mailed Feb. 20, 2018; (6 pages).
U.S. Appl. No. 15/061,848; Office Action mailed Jul. 13, 2018; (6 pages).
U.S. Appl. No. 15/061,848; Office Action mailed Sep. 13, 2017; (9 pages).
U.S. Appl. No. 15/061,908; Corrected Notice of Allowability mailed Oct. 9, 2019; (2 pages).
U.S. Appl. No. 15/061,908; Notice of Allowance mailed Feb. 27, 2020; (7 pages).
U.S. Appl. No. 15/061,908; Notice of Allowance mailed Sep. 30, 2019; (9 pages).
U.S. Appl. No. 15/061,908; Office Action mailed Jun. 6, 2019; (27 pages).
U.S. Appl. No. 15/061,908; Office Action mailed Nov. 26, 2018; (28 pages).
U.S. Appl. No. 15/061,980; Notice of Allowance mailed Jan. 8, 2019; (9 pages).
U.S. Appl. No. 15/061,980; Office Action mailed Mar. 1, 2018; (21 pages).
U.S. Appl. No. 15/061,980; Office Action mailed Aug. 30, 2018; (22 pages).
U.S. Appl. No. 15/274,991; Notice of Allowance mailed Feb. 8, 2018; (5 pages).
U.S. Appl. No. 15/274,991; Notice of Allowance mailed Sep. 21, 2018; (5 pages).
U.S. Appl. No. 15/274,991; Office Action mailed May 17, 2018; (9 pages).
U.S. Appl. No. 15/274,991; Office Action mailed Oct. 19, 2017; (11 pages).
U.S. Appl. No. 15/275,009; Notice of Allowance mailed Jun. 12, 2018; (6 pages).
U.S. Appl. No. 15/275,019; Notice of Allowance mailed Feb. 8, 2019; (5 pages).
U.S. Appl. No. 15/275,019; Office Action mailed Aug. 8, 2018; (13 pages).
U.S. Appl. No. 15/275,019; Office Action mailed Oct. 2, 2018; (13 pages).
U.S. Appl. No. 15/275,047; Notice of Allowance mailed May 21, 2018; (5 pages).
U.S. Appl. No. 15/275,047; Office Action mailed Nov. 14, 2017; (7 pages).
U.S. Appl. No. 15/275,047; Supplemental Notice of Allowability mailed Jun. 8, 2018; (2 pages).
U.S. Appl. No. 15/282,951; Notice of Allowance mailed Sep. 11, 2018; (7 pages).
U.S. Appl. No. 15/282,951; Office Action mailed Mar. 30, 2018; (12 pages).
U.S. Appl. No. 15/288,923; Notice of Allowance mailed Jan. 30, 2019; (8 pages).
U.S. Appl. No. 15/423,812, Notice of Allowance mailed Jan. 24, 2020; (10 pages).
U.S. Appl. No. 15/423,812; Office Action mailed Sep. 26, 2019; (9 pages).
U.S. Appl. No. 15/446,914; Notice of Allowance mailed Aug. 12, 2019; (9 pages).
U.S. Appl. No. 15/447,175; Corrected Notice of Allowability mailed Oct. 9, 2019; (2 pages).
U.S. Appl. No. 15/447,175; Notice of Allowance mailed Jul. 11, 2019; (5 pages).
U.S. Appl. No. 15/447,175; Office Action mailed Feb. 11, 2019; (10 pages).
U.S. Appl. No. 15/447,202; Office Action mailed Apr. 16, 2020, (13 pages).
U.S. Appl. No. 15/447,202; Office Action mailed Jul. 12, 2019; (13 pages).
U.S. Appl. No. 15/447,202; Office Action mailed Nov. 8, 2019; (15 pages).
U.S. Appl. No. 15/471,278; Notice of Allowance mailed Apr. 19, 2018; (7 pages).
U.S. Appl. No. 15/471,278; Notice of Allowance mailed Dec. 15, 2017; (7 pages).
U.S. Appl. No. 15/692,226; Notice of Allowance mailed Oct. 17, 2019; (11 pages).
U.S. Appl. No. 15/692,226; Office Action mailed Jun. 11, 2019; (20 pages).
U.S. Appl. No. 15/698,068; Notice of Allowance mailed Apr. 24, 2020, (14 pages).
U.S. Appl. No. 15/698,068; Office Action mailed Jan. 6, 2020; (pp. 1-20).
U.S. Appl. No. 15/698,068; Office Action mailed Mar. 15, 2019; (16 pages).
U.S. Appl. No. 15/698,068; Office Action mailed Aug. 29, 2019; (19 pages).
U.S. Appl. No. 15/836,708; Notice of Allowance mailed Mar. 17, 2020; (11 pages).
U.S. Appl. No. 15/836,708; Supplemental Notice of Allowability mailed May 15, 2020, (3 pages).
U.S. Appl. No. 15/882,526; Office Action mailed Jan. 10, 2020; (38 pages).
U.S. Appl. No. 15/892,250; Notice of Allowance mailed Nov. 25, 2019; (10 pages).
U.S. Appl. No. 15/892,250; Office Action mailed Aug. 19, 2019; (33 pages).
U.S. Appl. No. 15/894,155; Notice of Allowance mailed Mar. 5, 2019; (9 pages).
U.S. Appl. No. 15/894,155; Office Action mailed Oct. 24, 2018; (9 pages).
U.S. Appl. No. 15/990,274; Notice of Allowance mailed Nov. 14, 2018; (7 pages).
U.S. Appl. No. 15/990,274; Office Action mailed Sep. 18, 2018; (12 pages).
U.S. Appl. No. 16/001,774; Corrected Notice of Allowability mailed Sep. 29, 2020; (2 pages).
U.S. Appl. No. 16/001,774; Office Action mailed Mar. 12, 2020; (11 pages).
U.S. Appl. No. 16/059,431; Notice of Allowance mailed Mar. 4, 2019; (5 pages).
U.S. Appl. No. 16/059,431; Office Action mailed Oct. 29, 2018; (8 pages).
U.S. Appl. No. 16/100,064; Corrected Notice of Allowability mailed Nov. 24, 2020, (2 pages).
U.S. Appl. No. 16/100,064; Notice of Allowance mailed Aug. 14, 2020, (10 pages).
U.S. Appl. No. 16/109,290; Notice of Allowance mailed Sep. 23, 2020; (5 pages).
U.S. Appl. No. 16/109,290; Notice of Allowance mailed Nov. 29, 2019; (5 pages).
U.S. Appl. No. 16/191,192; Notice of Allowance mailed Jun. 25, 2020, (8 pages).
U.S. Appl. No. 16/191,192; Office Action mailed Jan. 16, 2020; (6 pages).
U.S. Appl. No. 16/216,147; Office Action mailed Dec. 1, 2020; (8 pages).
U.S. Appl. No. 16/224,536; Notice of Allowance mailed Nov. 8, 2019; (9 pages).

(56) References Cited

OTHER PUBLICATIONS

U.S. Appl. No. 16/269,262; Notice of Allowance mailed Dec. 19, 2019; (9 pages).
U.S. Appl. No. 16/269,262; Office Action mailed Aug. 20, 2019; (8 pages).
U.S. Appl. No. 16/282,888; Corrected Notice of Allowability mailed Jun. 15, 2020, (2 pages).
U.S. Appl. No. 16/282,888; Office Action mailed Sep. 30, 2019; (11 pages).
U.S. Appl. No. 16/359,828; Office Action mailed Jul. 8, 2021; (23 pages).
U.S. Appl. No. 16/361,015; Notice of Allowance mailed Feb. 24, 2021; (5 pages).
U.S. Appl. No. 16/361,015; Office Action mailed Sep. 22, 2020; (7 pages).
U.S. Appl. No. 16/399,854; Notice of Allowance mailed Sep. 14, 2021; (8 pages).
U.S. Appl. No. 16/399,854; Office Action mailed Jan. 14, 2021; (8 pages).
U.S. Appl. No. 16/399,854; Office Action mailed May 26, 2021; (10 pages).
U.S. Appl. No. 16/408,335; Office Action mailed Aug. 2, 2021; (7 pages).
U.S. Appl. No. 16/434,816; Office Action mailed Sep. 21, 2020; (9 pages).
U.S. Appl. No. 16/442,134; Office Action mailed Sep. 29, 2020; (15 pages).
U.S. Appl. No. 16/845,428; Notice of Allowance mailed Feb. 16, 2021; (9 pages).
U.S. Appl. No. 16/845,428; Office Action mailed Oct. 26, 2020; (6 pages).
U.S. Appl. No. 16/858,403; Office Action mailed Oct. 6, 2021; (8 pages).
U.S. Appl. No. 17/081,657; Non-Final Rejection mailed Feb. 1, 2023; (7 pages).
U.S. Appl. No. 17/081,657; Notice of Allowance and Fees Due (PTOL-85) mailed Jul. 31, 2023; (7 pages).
U.S. Appl. No. 17/081,657; Notice of Allowance and Fees Due (PTOL-85) mailed Aug. 18, 2023; (pp. 1-4).
U.S. Appl. No. 17/321,290; Non-Final Rejection mailed Nov. 9, 2022; (5 pages).
U.S. Appl. No. 17/321,290; Notice of Allowance and Fees Due (PTOL-85) mailed Apr. 27, 2023; (9 pages).
U.S. Appl. No. 17/030,799; Non-Final Rejection mailed Sep. 6, 2023; (pp. 1-35).
U.S. Appl. No. 17/346,954; Non-Final Rejection mailed Oct. 11, 2022; (8 pages).
U.S. Appl. No. 17/346,954; Notice of Allowance and Fees Due (PTOL-85) mailed Feb. 6, 2023; (5 pages).
U.S. Appl. No. 17/551,130; Notice of Allowance and Fees Due (PTOL-85) mailed Nov. 15, 2023; (pp. 1-8).
U.S. Appl. No. 18/144,759; Non-Final Rejection mailed Jan. 18, 2024; (pp. 1-8).
U.S. Appl. No. 18/226,132; Non-Final Rejection mailed Feb. 13, 2024; (pp. 1-5).
U.S. Appl. No. 15/061,350; Notice of Allowance mailed Apr. 4, 2018; (8 pages).
Vasilescu, Iuliu, et al.; "Autonomous Modular Optical Underwater Robot (AMOUR) Design, Prototype and Feasibility Study", Apr. 18, 2005, pp. 1-7.
VMECAVacuumTech; "VMECA Magic Suction Cup with ABB robot for pick and place (packaging application)", https://www.youtube.com/watch?v=5btR9MLtGJA, published on Sep. 14, 2014, pp. 1-4.
Wang, Xuan; "2D Mapping Solutions for Low Cost Mobile Robot", Master's Thesis in Computer Science, Royal Institute of Technology, KTH CSC, Stockholm, Sweden, 2013, pp. 1-60.
Webb, Mick; "Robovie II—the personal robotic shopping", Gizmag, http://www.gizmag.com/robovie-ii-robotic-shopping-assistance/13664/, Dec. 23, 2009, pp. 1-5.
Weise, Elizabeth; "15,000 robots usher in Amazon's Cyber Monday", USAToday, http://www.usatoday.com/story/tech/2014/12/01/robots-amazon.kiva-fulfillment-centers-cyber-monday/19725229/, Dec. 2, 2014, pp. 1-3.
Weiss, C.C.; "Multifunctional hybrid robot shovels snow and mows your lawn", Gizmag, http://www.gizmag.com/snowbyte-snow-shoveling-robot/32961/, Jul. 21, 2014, pp. 1-7.
Wikipedia; "Kiva Systems", http://en.wikipedia.org/wiki/Kiva_Systems, printed on Apr. 2, 2015, pp. 1-3.
Wikipedia; "Leeds Kirkgate Market"; https://en.wikipedia.org/wiki/Leeds_Kirkgate_Market; Retrieved on Apr. 5, 2017; 8 pages.
WIRED; "High-Speed Robots Part 1: Meet BettyBot in "Human Exclusion Zone" Warehouses—The Window—WIRED", https://www.youtube.com/watch?v=8gy5tYVR-28, published on Jul. 2, 2013, pp. 1-6.
WorkHorse Group; "HorseFly by Workhorse—Drone Delivery Concept"; https://www.youtube.com/watch?v=epqZ-luhzKQ; published on Oct. 13, 2015; pp. 1-8.
WorkHorse; "HorseFly"; http://workhorse.com/aerospace; Feb. 2017; pp. 1-6.
Wulf, O., et al.; "Colored 2D maps for robot navigation with 3D sensor data," Institute for Systems Engineering, University of Hannover, Hannover, Germany, 2014, pp. 1-6.
YRF; "The Diamond Robbery—Scene Dhoom:2 Hrithik Roshan", https://www.youtube.com/watch?v=3bMYgo_S0Kc, published on Jul. 12, 2012, pp. 1-7.
Zito, Daniel; "Workhorse Group Obtains Section 333 Exemption From Federal Aviation Administration to Test HorseFly(TM) UAS;" https://web.archive.org/web/20160626120625/http://globenewswire.com:80/news-release/2015/12/09/794112/10158200/en/Workhorse-Group-Obtains-Section-333-Exemption-From-Federal-Aviation-Administration-to-Test-HorseFly-TM-UAS.html; published Dec. 9, 2015; pp. 1-3.

* cited by examiner

100

102

SYSTEMS, DEVICES AND METHODS FOR DETERMINING ITEM AVAILABILITY IN A SHOPPING SPACE

CROSS-REFERENCE TO RELATED APPLICATIONS

This application is a continuation of U.S. application Ser. No. 17/551,130, filed Dec. 14, 2021, which is a continuation of U.S. application Ser. No. 16/399,854, filed Apr. 30, 2019, which a continuation of U.S. application Ser. No. 15/288,923, filed Oct. 7, 2016, which is a continuation of U.S. application Ser. No. 15/061,801, filed Mar. 4, 2016, now U.S. Pat. No. 10,130,232, issued Nov. 20, 2018, which claims the benefit of each of the following U.S. Provisional applications: U.S. Provisional Application No. 62/129,726, filed Mar. 6, 2015; U.S. Provisional Application No. 62/129,727, filed Mar. 6, 2015; U.S. Provisional Application No. 62/138,877, filed Mar. 26, 2015; U.S. Provisional Application No. 62/138,885, filed Mar. 26, 2015; U.S. Provisional Application No. 62/152,421, filed Apr. 24, 2015; U.S. Provisional Application No. 62/152,465, filed Apr. 24, 2015; U.S. Provisional Application No. 62/152,440, filed Apr. 24, 2015; U.S. Provisional Application No. 62/152,630, filed Apr. 24, 2015; U.S. Provisional Application No. 62/152,711, filed Apr. 24, 2015; U.S. Provisional Application No. 62/152,610, filed Apr. 24, 2015; U.S. Provisional Application No. 62/152,667, filed Apr. 24, 2015; U.S. Provisional Application No. 62/157,388, filed May 5, 2015; U.S. Provisional Application No. 62/165,579, filed May 22, 2015; U.S. Provisional Application No. 62/165,416, filed May 22, 2015; U.S. Provisional Application No. 62/165,586, filed May 22, 2015; U.S. Provisional Application No. 62/171,822, filed Jun. 5, 2015; U.S. Provisional Application No. 62/175,182, filed Jun. 12, 2015; U.S. Provisional Application No. 62/182,339, filed Jun. 19, 2015; U.S. Provisional Application No. 62/185,478, filed Jun. 26, 2015; U.S. Provisional Application No. 62/194,131, filed Jul. 17, 2015; U.S. Provisional Application No. 62/194,119, filed Jul. 17, 2015; U.S. Provisional Application No. 62/194,121, filed Jul. 17, 2015; U.S. Provisional Application No. 62/194,127, filed Jul. 17, 2015; U.S. Provisional Application No. 62/202,744, filed Aug. 7, 2015; U.S. Provisional Application No. 62/202,747, filed Aug. 7, 2015; U.S. Provisional Application No. 62/205,548, filed Aug. 14, 2015; U.S. Provisional Application No. 62/205,569, filed Aug. 14, 2015; U.S. Provisional Application No. 62/205,555, filed Aug. 14, 2015; U.S. Provisional Application No. 62/205,539, filed Aug. 14, 2015; U.S. Provisional Application No. 62/207,858, filed Aug. 20, 2015; U.S. Provisional Application No. 62/214,826, filed Sep. 4, 2015; U.S. Provisional Application No. 62/214,824, filed Sep. 4, 2015; U.S. Provisional Application No. 62/292,084, filed Feb. 5, 2016; U.S. Provisional Application No. 62/302,547, filed Mar. 2, 2016; U.S. Provisional Application No. 62/302,567, filed Mar. 2, 2016; U.S. Provisional Application No. 62/302,713, filed Mar. 2, 2016; and U.S. Provisional Application No. 62/303,021, filed Mar. 3, 2016, all of these applications being incorporated herein by reference in their entirety.

TECHNICAL FIELD

These teachings relate generally to shopping environments and more particularly to devices, systems and methods for assisting customers and/or workers in those shopping environments.

BACKGROUND

In a modern retail store environment, there is a need to improve the customer experience and/or convenience for the customer. Whether shopping in a large format (big box) store or smaller format (neighborhood) store, customers often require assistance that employees of the store are not always able to provide. For example, particularly during peak hours, there may not be enough employees available to assist customers such that customer questions go unanswered. Additionally, due to high employee turnover rates, available employees may not be fully trained or have access to information to adequately support customers. Other routine tasks also are difficult to keep up with, particularly during peak hours. For example, shopping carts are left abandoned, aisles become messy, inventory is not displayed in the proper locations or is not even placed on the sales floor, shelf prices may not be properly set, and theft is hard to discourage. All of these issues can result in low customer satisfaction or reduced convenience to the customer. With increasing competition from non-traditional shopping mechanisms, such as online shopping provided by e-commerce merchants and alternative store formats, it can be important for "brick and mortar" retailers to focus on improving the overall customer experience and/or convenience.

BRIEF DESCRIPTION OF DRAWINGS

The above needs are at least partially met through provision of embodiments of systems, devices, and methods designed to provide assistance to customers and/or workers in a shopping facility, such as described in the following detailed description, particularly when studied in conjunction with the drawings, wherein.

Figure 1:
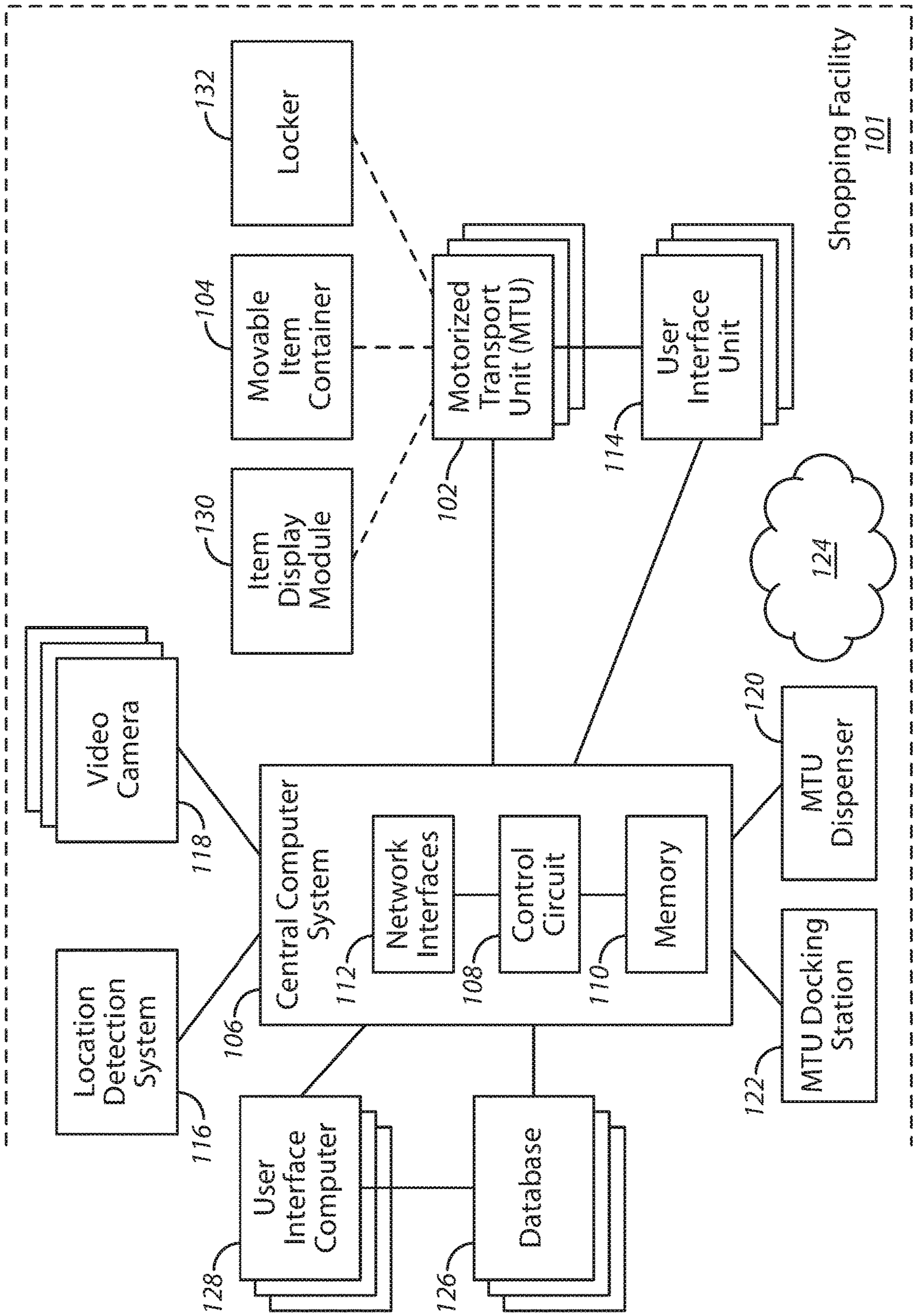
FIG. 1 comprises a block diagram of a shopping assistance system as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems, devices and methods are provided for assistance of persons at a shopping facility. Generally, assistance may be provided to customers or shoppers at the facility and/or to workers at the facility. The facility may be any type of shopping facility at a location in which products for display and/or for sale are variously distributed throughout the shopping facility space. The shopping facility may be a retail sales facility, or any other type of facility in which products are displayed and/or sold. The shopping facility may include one or more of sales floor areas, checkout locations, parking locations, entrance and exit areas, stock room areas, stock receiving areas, hallway areas, common areas shared by merchants, and so on. Generally, a shopping facility includes areas that may be dynamic in terms of the physical structures occupying the space or area and objects, items, machinery and/or persons moving in the area. For example, the shopping area may include product storage units, shelves, racks, modules, bins, etc., and other walls, dividers, partitions, etc. that may be configured in different layouts or physical arrangements. In other example, persons or other movable objects may be freely and independently traveling through the shopping facility space. And in other example, the persons or movable objects move according to known travel patterns and timing. The facility may be any size of format facility, and may include products from one or more merchants. For example, a facility may be a single store operated by one merchant or may be a collection of stores covering multiple merchants such as a mall. Generally, the system makes use of automated, robotic mobile devices, e.g., motorized transport units, that are capable of self-powered movement through a space of the shopping facility and providing any number of functions. Movement and operation of such devices may be controlled by a central computer system or may be autonomously controlled by the motorized transport units themselves. Various embodiments provide one or more user interfaces to allow various users to interact with the system including the automated mobile devices and/or to directly interact with the automated mobile devices. In some embodiments, the automated mobile devices and the corresponding system serve to enhance a customer shopping experience in the shopping facility, e.g., by assisting shoppers and/or workers at the facility.

In some embodiments, a shopping facility personal assistance system comprises: a plurality of motorized transport units located in and configured to move through a shopping facility space; a plurality of user interface units, each corresponding to a respective motorized transport unit during use of the respective motorized transport unit; and a central computer system having a network interface such that the central computer system wirelessly communicates with one or both of the plurality of motorized transport units and the plurality of user interface units, wherein the central computer system is configured to control movement of the plurality of motorized transport units through the shopping facility space based at least on inputs from the plurality of user interface units.

System Overview

Referring now to the drawings, FIG. 1 illustrates embodiments of a shopping facility assistance system 100 that can serve to carry out at least some of the teachings set forth herein.

It will be understood that the details of this example are intended to serve in an illustrative capacity and are not necessarily intended to suggest any limitations as regards the present teachings. It is noted that generally, FIGS. 1-5 describe the general functionality of several embodiments of a system, and FIGS. 6-21 expand on some functionalities of some embodiments of the system and/or embodiments independent of such systems.

In the example of FIG. 1, a shopping assistance system 100 is implemented in whole or in part at a shopping facility 101. Generally, the system 100 includes one or more motorized transport units (MTUs) 102; one or more item containers 104; a central computer system 106 having at least one control circuit 108, at least one memory 110 and at least one network interface 112; at least one user interface unit 114; a location determination system 116; at least one video camera 118; at least one motorized transport unit (MTU) dispenser 120; at least one motorized transport unit (MTU) docking station 122; at least one wireless network 124; at least one database 126; at least one user interface computer device 128; an item display module 130; and a locker or an item storage unit 132. It is understood that more or fewer of such components may be included in different embodiments of the system 100.

These motorized transport units 102 are located in the shopping facility 101 and are configured to move throughout the shopping facility space. Further details regarding such motorized transport units 102 appear further below. Generally speaking, these motorized transport units 102 are configured to either comprise, or to selectively couple to, a corresponding movable item container 104. A simple example of an item container 104 would be a shopping cart as one typically finds at many retail facilities, or a rocket cart, a flatbed cart or any other mobile basket or platform that may be used to gather items for potential purchase.

In some embodiments, these motorized transport units 102 wirelessly communicate with, and are wholly or largely controlled by, the central computer system 106. In particular, in some embodiments, the central computer system 106 is configured to control movement of the motorized transport units 102 through the shopping facility space based on a variety of inputs. For example, the central computer system 106 communicates with each motorized transport unit 102 via the wireless network 124 which may be one or more wireless networks of one or more wireless network types (such as, a wireless local area network, a wireless personal area network, a wireless mesh network, a wireless star network, a wireless wide area network, a cellular network, and so on), capable of providing wireless coverage of the desired range of the motorized transport units 102 according to any known wireless protocols, including but not limited to a cellular, Wi-Fi, Zigbee or Bluetooth network.

By one approach the central computer system 106 is a computer based device and includes at least one control circuit 108, at least one memory 110 and at least one wired and/or wireless network interface 112. Such a control circuit 108 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here. This control circuit 108 is configured (for example, by using corresponding programming stored in the memory 110 as will be well understood by those skilled in the art) to carry out one or more of the steps, actions, and/or functions described herein.

In this illustrative example the control circuit 108 operably couples to one or more memories 110. The memory 110 may be integral to the control circuit 108 or can be physically discrete (in whole or in part) from the control circuit 108 as desired. This memory 110 can also be local with respect to the control circuit 108 (where, for example, both share a common circuit board, chassis, power supply, and/or housing) or can be partially or wholly remote with respect to the control circuit 108 (where, for example, the memory 110 is physically located in another facility, metropolitan area, or even country as compared to the control circuit 108).

This memory 110 can serve, for example, to non-transitorily store the computer instructions that, when executed by the control circuit 108, cause the control circuit 108 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

Additionally, at least one database 126 may be accessible by the central computer system 106. Such databases may be integrated into the central computer system 106 or separate from it. Such databases may be at the location of the shopping facility 101 or remote from the shopping facility 101. Regardless of location, the databases comprise memory to store and organize certain data for use by the central control system 106. In some embodiments, the at least one database 126 may store data pertaining to one or more of: shopping facility mapping data, customer data, customer shopping data and patterns, inventory data, product pricing data, and so on.

In this illustrative example, the central computer system 106 also wirelessly communicates with a plurality of user interface units 114. These teachings will accommodate a variety of user interface units including, but not limited to, mobile and/or handheld electronic devices such as so-called smart phones and portable computers such as tablet/pad-styled computers. Generally speaking, these user interface units 114 should be able to wirelessly communicate with the central computer system 106 via a wireless network, such as the wireless network 124 of the shopping facility 101 (such as a Wi-Fi wireless network). These user interface units 114 generally provide a user interface for interaction with the system. In some embodiments, a given motorized transport unit 102 is paired with, associated with, assigned to or otherwise made to correspond with a given user interface unit 114. In some embodiments, these user interface units 114 should also be able to receive verbally-expressed input from a user and forward that content to the central computer system 106 or a motorized transport unit 102 and/or convert that verbally-expressed input into a form useful to the central computer system 106 or a motorized transport unit 102.

By one approach at least some of the user interface units 114 belong to corresponding customers who have come to the shopping facility 101 to shop. By another approach, in lieu of the foregoing or in combination therewith, at least some of the user interface units 114 belong to the shopping facility 101 and are loaned to individual customers to employ as described herein. In some embodiments, one or more user interface units 114 are attachable to a given movable item container 104 or are integrated with the movable item container 104. Similarly, in some embodiments, one or more user interface units 114 may be those of shopping facility workers, belong to the shopping facility 101 and are loaned to the workers, or a combination thereof.

In some embodiments, the user interface units 114 may be general purpose computer devices that include computer programming code to allow it to interact with the system 106. For example, such programming may be in the form of an application installed on the user interface unit 114 or in the form of a browser that displays a user interface provided by the central computer system 106 or other remote computer or server (such as a web server). In some embodiments, one or more user interface units 114 may be special purpose devices that are programmed to primarily function as a user interface for the system 100. Depending on the functionality and use case, user interface units 114 may be operated by customers of the shopping facility or may be operated by workers at the shopping facility, such as facility employees (associates or colleagues), vendors, suppliers, contractors, etc.

By one approach, the system 100 optionally includes one or more video cameras 118. Captured video imagery from such a video camera 118 can be provided to the central computer system 106. That information can then serve, for example, to help the central computer system 106 determine a present location of one or more of the motorized transport units 102 and/or determine issues or concerns regarding automated movement of those motorized transport units 102 in the shopping facility space. As one simple example in these regards, such video information can permit the central computer system 106, at least in part, to detect an object in a path of movement of a particular one of the motorized transport units 102.

By one approach these video cameras 118 comprise existing surveillance equipment employed at the shopping facility 101 to serve, for example, various security purposes. By another approach these video cameras 118 are dedicated to providing video content to the central computer system 106 to facilitate the latter's control of the motorized transport units 102. If desired, the video cameras 118 can have a selectively movable field of view and/or zoom capability that the central computer system 106 controls as appropriate to help ensure receipt of useful information at any given moment.

In some embodiments, a location detection system 116 is provided at the shopping facility 101. The location detection system 116 provides input to the central computer system 106 useful to help determine the location of one or more of the motorized transport units 102. In some embodiments, the location detection system 116 includes a series of light sources (e.g., LEDs (light-emitting diodes)) that are mounted in the ceiling at known positions throughout the space and that each encode data in the emitted light that identifies the source of the light (and thus, the location of the light). As a given motorized transport unit 102 moves through the space, light sensors (or light receivers) at the motorized transport unit 102, on the movable item container 104 and/or at the user interface unit 114 receive the light and can decode the data. This data is sent back to the central computer system 106 which can determine the position of the motorized transport unit 102 by the data of the light it receives, since it can relate the light data to a mapping of the light sources to locations at the facility 101. Generally, such lighting systems are known and commercially available, e.g., the ByteLight system from ByteLight of Boston, Massachusetts. In embodiments using a ByteLight system, a typical display screen of the typical smart phone device can be used as a light sensor or light receiver to receive and process data encoded into the light from the ByteLight light sources.

In other embodiments, the location detection system 116 includes a series of low energy radio beacons (e.g., Bluetooth low energy beacons) at known positions throughout the space and that each encode data in the emitted radio signal that identifies the beacon (and thus, the location of the beacon). As a given motorized transport unit 102 moves through the space, low energy receivers at the motorized transport unit 102, on the movable item container 104 and/or at the user interface unit 114 receive the radio signal and can decode the data. This data is sent back to the central computer system 106 which can determine the position of the motorized transport unit 102 by the location encoded in the radio signal it receives, since it can relate the location data to a mapping of the low energy radio beacons to locations at the facility 101. Generally, such low energy radio systems are known and commercially available. In embodiments using a Bluetooth low energy radio system, a typical Bluetooth radio of a typical smart phone device can be used as a receiver to receive and process data encoded into the Bluetooth low energy radio signals from the Bluetooth low energy beacons.

In still other embodiments, the location detection system 116 includes a series of audio beacons at known positions throughout the space and that each encode data in the emitted audio signal that identifies the beacon (and thus, the location of the beacon). As a given motorized transport unit 102 moves through the space, microphones at the motorized transport unit 102, on the movable item container 104 and/or at the user interface unit 114 receive the audio signal and can decode the data. This data is sent back to the central computer system 106 which can determine the position of the motorized transport unit 102 by the location encoded in the audio signal it receives, since it can relate the location data to a mapping of the audio beacons to locations at the facility 101. Generally, such audio beacon systems are known and commercially available. In embodiments using an audio beacon system, a typical microphone of a typical smart phone device can be used as a receiver to receive and process data encoded into the audio signals from the audio beacon.

Also optionally, the central computer system 106 can operably couple to one or more user interface computers 128 (comprising, for example, a display and a user input interface such as a keyboard, touch screen, and/or cursor-movement device). Such a user interface computer 128 can permit, for example, a worker (e.g., an associate, analyst, etc.) at the retail or shopping facility 101 to monitor the operations of the central computer system 106 and/or to attend to any of a variety of administrative, configuration or evaluation tasks as may correspond to the programming and operation of the central computer system 106. Such user interface computers 128 may be at or remote from the location of the facility 101 and may access one or more the databases 126.

In some embodiments, the system 100 includes at least one motorized transport unit (MTU) storage unit or dispenser 120 at various locations in the shopping facility 101. The dispenser 120 provides for storage of motorized transport units 102 that are ready to be assigned to customers and/or workers. In some embodiments, the dispenser 120 takes the form of a cylinder within which motorized transports units 102 are stacked and released through the bottom of the dispenser 120. Further details of such embodiments are provided further below. In some embodiments, the dispenser 120 may be fixed in location or may be mobile and capable of transporting itself to a given location or utilizing a motorized transport unit 102 to transport the dispenser 120, then dispense one or more motorized transport units 102.

In some embodiments, the system 100 includes at least one motorized transport unit (MTU) docking station 122. These docking stations 122 provide locations where motorized transport units 102 can travel and connect to. For example, the motorized transport units 102 may be stored and charged at the docking station 122 for later use, and/or may be serviced at the docking station 122.

In accordance with some embodiments, a given motorized transport unit 102 detachably connects to a movable item container 104 and is configured to move the movable item container 104 through the shopping facility space under control of the central computer system 106 and/or the user interface unit 114. For example, a motorized transport unit 102 can move to a position underneath a movable item container 104 (such as a shopping cart, a rocket cart, a flatbed cart, or any other mobile basket or platform), align itself with the movable item container 104 (e.g., using sensors) and then raise itself to engage an undersurface of the movable item container 104 and lift a portion of the movable item container 104. Once the motorized transport unit is cooperating with the movable item container 104 (e.g., lifting a portion of the movable item container), the motorized transport unit 102 can continue to move throughout the facility space 101 taking the movable item container 104 with it. In some examples, the motorized transport unit 102 takes the form of the motorized transport unit 202 of FIGS. 2A-3B as it engages and detachably connects to a given movable item container 104. It is understood that in other embodiments, the motorized transport unit 102 may not lift a portion of the movable item container 104, but that it removably latches to, connects to or otherwise attaches to a portion of the movable item container 104 such that the movable item container 104 can be moved by the motorized transport unit 102. For example, the motorized transport unit 102 can connect to a given movable item container using a hook, a mating connector, a magnet, and so on.

In addition to detachably coupling to movable item containers 104 (such as shopping carts), in some embodiments, motorized transport units 102 can move to and engage or connect to an item display module 130 and/or an item storage unit or locker 132. For example, an item display module 130 may take the form of a mobile display rack or shelving unit configured to house and display certain items for sale. It may be desired to position the display module 130 at various locations within the shopping facility 101 at various times. Thus, one or more motorized transport units 102 may move (as controlled by the central computer system 106) underneath the item display module 130, extend upward to lift the module 130 and then move it to the desired location. A storage locker 132 may be a storage device where items for purchase are collected and placed therein for a customer and/or worker to later retrieve. In some embodiments, one or more motorized transport units 102 may be used to move the storage locker to a desired location in the shopping facility 101. Similar to how a motorized transport unit engages a movable item container 104 or item display module 130, one or more motorized transport units 102 may move (as controlled by the central computer system 106) underneath the storage locker 132, extend upward to lift the locker 132 and then move it to the desired location.

Figure 2A:
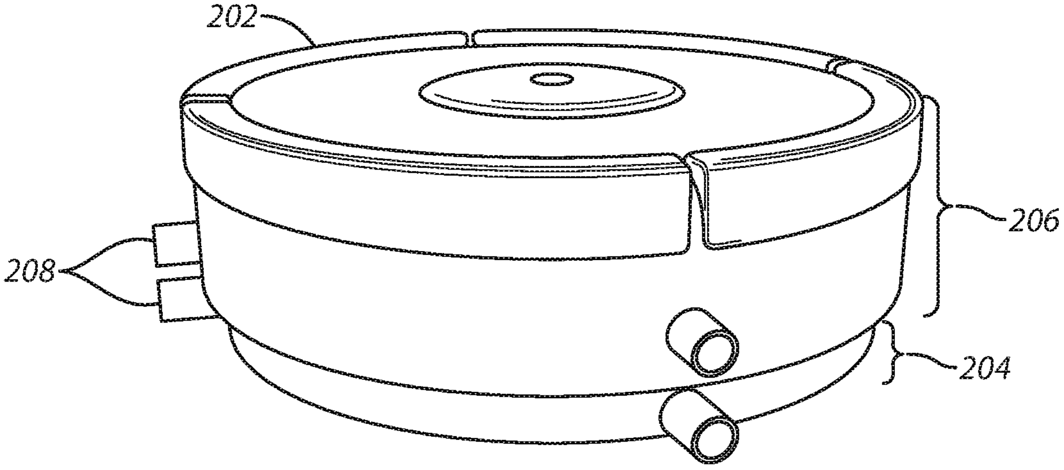
FIGS. 2A and 2B are illustrations of a motorized transport unit of the system of FIG. 1 in a retracted orientation and an extended orientation in accordance with some embodiments.
Figure 2B:
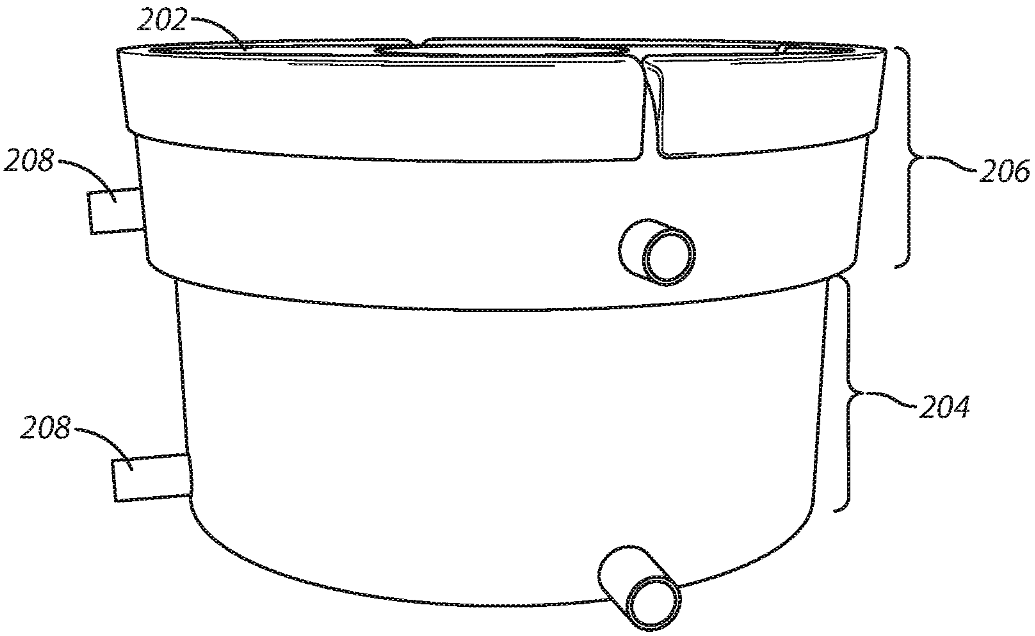

FIGS. 2A and 2B illustrate some embodiments of a motorized transport unit 202, similar to the motorized transport unit 102 shown in the system of FIG. 1. In this embodiment, the motorized transport unit 202 takes the form of a disc-shaped robotic device having motorized wheels (not shown), a lower body portion 204 and an upper body portion 206 that fits over at least part of the lower body portion 204. It is noted that in other embodiments, the motorized transport unit may have other shapes and/or configurations, and is not limited to disc-shaped. For example, the motorized transport unit may be cubic, octagonal, triangular, or other shapes, and may be dependent on a movable item container with which the motorized transport unit is intended to cooperate. Also included are guide members 208. In FIG. 2A, the motorized transport unit 202 is shown in a retracted position in which the upper body portion 206 fits over the lower body portion 204 such that the motorized transport unit 202 is in its lowest profile orientation which is generally the preferred orientation for movement when it is unattached to a movable item container 104 for example. In FIG. 2B, the motorized transport unit 202 is shown in an extended position in which the upper body portion 206 is moved upward relative to the lower body portion 204 such that the motorized transport unit 202 is in its highest profile orientation for movement when it is lifting and attaching to a movable item container 104 for example. The mechanism within the motorized transport unit 202 is designed to provide sufficient lifting force to lift the weight of the upper body portion 206 and other objects to be lifted by the motorized transport unit 202, such as movable item containers 104 and items placed within the movable item container, item display modules 130 and items supported by the item display module, and storage lockers 132 and items placed within the storage locker. The guide members 208 are embodied as pegs or shafts that extend horizontally from the both the upper body portion 206 and the lower body portion 204. In some embodiments, these guide members 208 assist docking the motorized transport unit 202 to a docking station 122 or a dispenser 120. In some embodiments, the lower body portion 204 and the upper body portion are capable to moving independently of each other. For example, the upper body portion 206 may be raised and/or rotated relative to the lower body portion 204. That is, one or both of the upper body portion 206 and the lower body portion 204 may move toward/away from the other or rotated relative to the other. In some embodiments, in order to raise the upper body portion 206 relative to the lower body portion 204, the motorized transport unit 202 includes an internal lifting system (e.g., including one or more electric actuators or rotary drives or motors). Numerous examples of such motorized lifting and rotating systems are known in the art. Accordingly, further elaboration in these regards is not provided here for the sake of brevity.

Figure 3B:
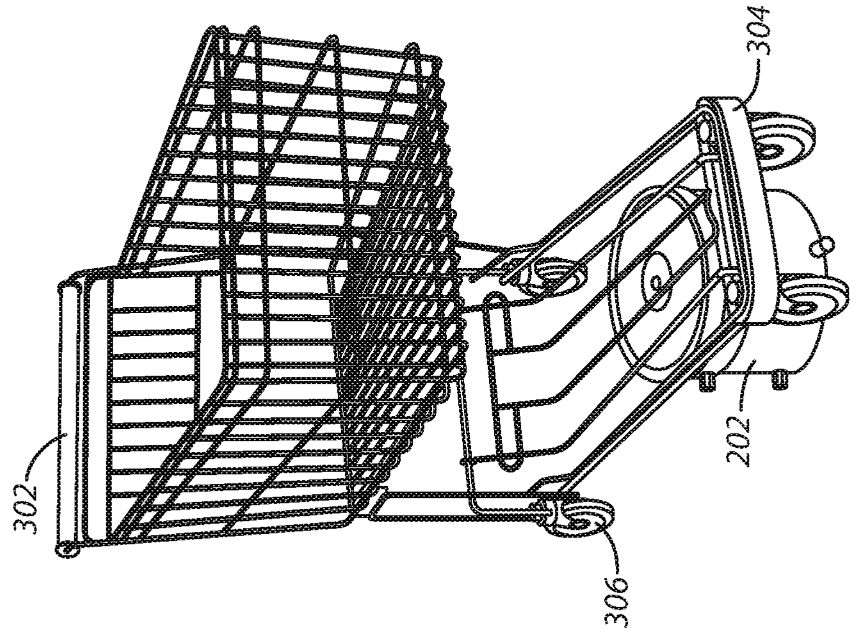
FIGS. 3A and 3B are illustrations of the motorized transport unit of FIGS. 2A and 2B detachably coupling to a movable item container, such as a shopping cart, in accordance with some embodiments.
Figure 3A:
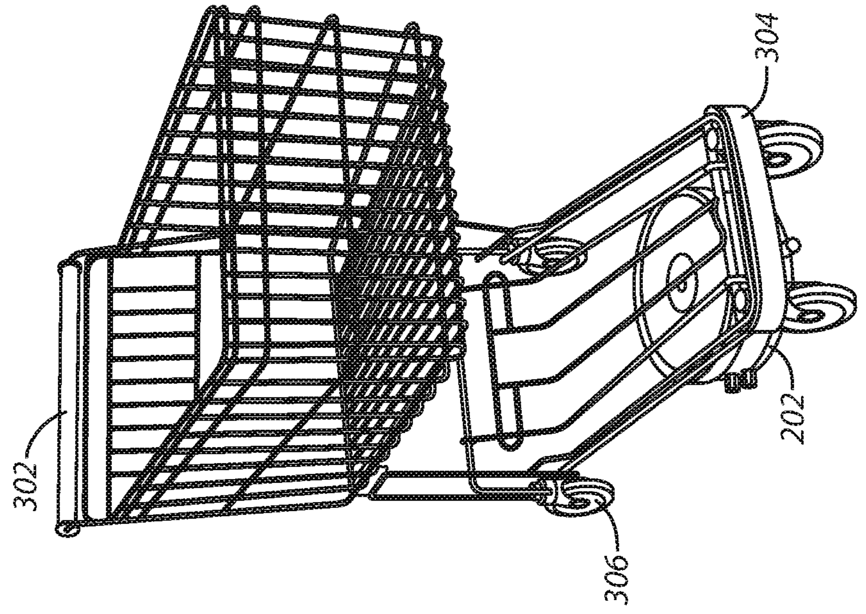

FIGS. 3A and 3B illustrate some embodiments of the motorized transport unit 202 detachably engaging a movable item container embodied as a shopping cart 302. In FIG. 3A, the motorized transport unit 202 is in the orientation of FIG. 2A such that it is retracted and able to move in position underneath a portion of the shopping cart 302. Once the motorized transport unit 202 is in position (e.g., using sensors), as illustrated in FIG. 3B, the motorized transport unit 202 is moved to the extended position of FIG. 2B such that the front portion 304 of the shopping cart is lifted off of the ground by the motorized transport unit 202, with the wheels 306 at the rear of the shopping cart 302 remaining on the ground. In this orientation, the motorized transport unit 202 is able to move the shopping cart 302 throughout the shopping facility. It is noted that in these embodiments, the motorized transport unit 202 does not bear the weight of the entire cart 302 since the rear wheels 306 rest on the floor. It is understood that in some embodiments, the motorized transport unit 202 may be configured to detachably engage other types of movable item containers, such as rocket carts, flatbed carts or other mobile baskets or platforms.

Figure 4:
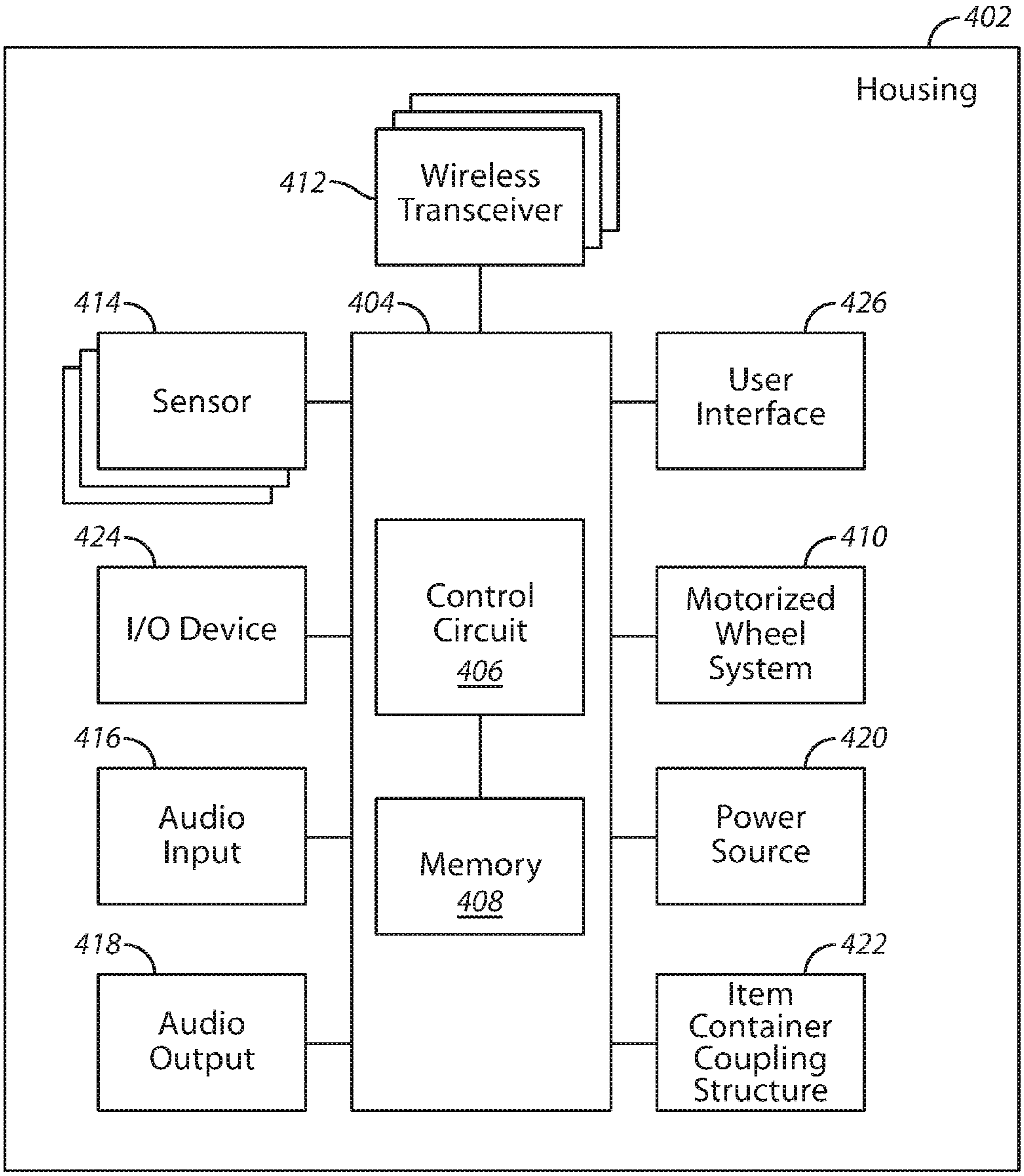
FIG. 4 comprises a block diagram of a motorized transport unit as configured in accordance with various embodiments of these teachings.

FIG. 4 presents a more detailed example of some embodiments of the motorized transport unit 102 of FIG. 1. In this example, the motorized transport unit 102 has a housing 402 that contains (partially or fully) or at least supports and carries a number of components. These components include a control unit 404 comprising a control circuit 406 that, like the control circuit 108 of the central computer system 106, controls the general operations of the motorized transport unit 102. Accordingly, the control unit 404 also includes a memory 408 coupled to the control circuit 406 and that stores, for example, operating instructions and/or useful data.

The control circuit 406 operably couples to a motorized wheel system 410. This motorized wheel system 410 functions as a locomotion system to permit the motorized transport unit 102 to move within the aforementioned retail or shopping facility 101 (thus, the motorized wheel system 410 may more generically be referred to as a locomotion system). Generally speaking, this motorized wheel system 410 will include at least one drive wheel (i.e., a wheel that rotates (around a horizontal axis) under power to thereby cause the motorized transport unit 102 to move through interaction with, for example, the floor of the shopping facility 101). The motorized wheel system 410 can include any number of rotating wheels and/or other floor-contacting mechanisms as may be desired and/or appropriate to the application setting.

The motorized wheel system 410 also includes a steering mechanism of choice. One simple example in these regards comprises one or more of the aforementioned wheels that can swivel about a vertical axis to thereby cause the moving motorized transport unit 102 to turn as well.

Numerous examples of motorized wheel systems are known in the art. Accordingly, further elaboration in these regards is not provided here for the sake of brevity save to note that the aforementioned control circuit 406 is configured to control the various operating states of the motorized wheel system 410 to thereby control when and how the motorized wheel system 410 operates.

In this illustrative example, the control circuit 406 also operably couples to at least one wireless transceiver 412 that operates according to any known wireless protocol. This wireless transceiver 412 can comprise, for example, a Wi-Fi-compatible and/or Bluetooth-compatible transceiver that can communicate with the aforementioned central computer system 106 via the aforementioned wireless network 124 of the shopping facility 101. So configured the control circuit 406 of the motorized transport unit 102 can provide information to the central computer system 106 and can receive information and/or instructions from the central computer system 106. As one simple example in these regards, the control circuit 406 can receive instructions from the central computer system 106 regarding movement of the motorized transport unit 102.

These teachings will accommodate using any of a wide variety of wireless technologies as desired and/or as may be appropriate in a given application setting. These teachings will also accommodate employing two or more different wireless transceivers 412 if desired.

The control circuit 406 also couples to one or more on-board sensors 414. These teachings will accommodate a wide variety of sensor technologies and form factors. By one approach at least one such sensor 414 can comprise a light sensor or light receiver. When the aforementioned location detection system 116 comprises a plurality of light emitters disposed at particular locations within the shopping facility 101, such a light sensor can provide information that the control circuit 406 and/or the central computer system 106 employs to determine a present location and/or orientation of the motorized transport unit 102.

As another example, such a sensor 414 can comprise a distance measurement unit configured to detect a distance between the motorized transport unit 102 and one or more objects or surfaces around the motorized transport unit 102 (such as an object that lies in a projected path of movement for the motorized transport unit 102 through the shopping facility 101). These teachings will accommodate any of a variety of distance measurement units including optical units and sound/ultrasound units. In one example, a sensor 414 comprises a laser distance sensor device capable of determining a distance to objects in proximity to the sensor. In some embodiments, a sensor 414 comprises an optical based scanning device to sense and read optical patterns in proximity to the sensor, such as bar codes variously located on structures in the shopping facility 101. In some embodiments, a sensor 414 comprises a radio frequency identification (RFID) tag reader capable of reading RFID tags in proximity to the sensor. Such sensors may be useful to determine proximity to nearby objects, avoid collisions, orient the motorized transport unit at a proper alignment orientation to engage a movable item container, and so on.

The foregoing examples are intended to be illustrative and are not intended to convey an exhaustive listing of all possible sensors. Instead, it will be understood that these teachings will accommodate sensing any of a wide variety of circumstances or phenomena to support the operating functionality of the motorized transport unit 102 in a given application setting.

By one optional approach an audio input 416 (such as a microphone) and/or an audio output 418 (such as a speaker) can also operably couple to the control circuit 406. So configured the control circuit 406 can provide a variety of audible sounds to thereby communicate with a user of the motorized transport unit 102, other persons in the vicinity of the motorized transport unit 102, or even other motorized transport units 102 in the area. These audible sounds can include any of a variety of tones and other non-verbal sounds. These audible sounds can also include, in lieu of the foregoing or in combination therewith, pre-recorded or synthesized speech.

The audio input 416, in turn, provides a mechanism whereby, for example, a user provides verbal input to the control circuit 406. That verbal input can comprise, for example, instructions, inquiries, or information. So configured, a user can provide, for example, a question to the motorized transport unit 102 (such as, "Where are the towels?"). The control circuit 406 can cause that verbalized question to be transmitted to the central computer system 106 via the motorized transport unit's wireless transceiver 412. The central computer system 106 can process that verbal input to recognize the speech content and to then determine an appropriate response. That response might comprise, for example, transmitting back to the motorized transport unit 102 specific instructions regarding how to move the motorized transport unit 102 (via the aforementioned motorized wheel system 410) to the location in the shopping facility 101 where the towels are displayed.

In this example the motorized transport unit 102 includes a rechargeable power source 420 such as one or more batteries. The power provided by the rechargeable power source 420 can be made available to whichever components of the motorized transport unit 102 require electrical energy. By one approach the motorized transport unit 102 includes a plug or other electrically conductive interface that the control circuit 406 can utilize to automatically connect to an external source of electrical energy to thereby recharge the rechargeable power source 420.

By one approach the motorized transport unit 102 comprises an integral part of a movable item container 104 such as a grocery cart. As used herein, this reference to "integral" will be understood to refer to a non-temporary combination and joinder that is sufficiently complete so as to consider the combined elements to be as one. Such a joinder can be facilitated in a number of ways including by securing the motorized transport unit housing 402 to the item container using bolts or other threaded fasteners as versus, for example, a clip.

These teachings will also accommodate selectively and temporarily attaching the motorized transport unit 102 to an item container 104. In such a case the motorized transport unit 102 can include a movable item container coupling structure 422. By one approach this movable item container coupling structure 422 operably couples to a control circuit 202 to thereby permit the latter to control, for example, the latched and unlatched states of the movable item container coupling structure 422. So configured, by one approach the control circuit 406 can automatically and selectively move the motorized transport unit 102 (via the motorized wheel system 410) towards a particular item container until the movable item container coupling structure 422 can engage the item container to thereby temporarily physically couple the motorized transport unit 102 to the item container. So latched, the motorized transport unit 102 can then cause the item container to move with the motorized transport unit 102. In embodiments such as illustrated in FIGS. 2A-3B, the movable item container coupling structure 422 includes a lifting system (e.g., including an electric drive or motor) to cause a portion of the body or housing 402 to engage and lift a portion of the item container off of the ground such that the motorized transport unit 102 can carry a portion of the item container. In other embodiments, the movable transport unit latches to a portion of the movable item container without lifting a portion thereof off of the ground.

In either case, by combining the motorized transport unit 102 with an item container, and by controlling movement of the motorized transport unit 102 via the aforementioned central computer system 106, these teachings will facilitate a wide variety of useful ways to assist both customers and associates in a shopping facility setting. For example, the motorized transport unit 102 can be configured to follow a particular customer as they shop within the shopping facility 101. The customer can then place items they intend to purchase into the item container that is associated with the motorized transport unit 102.

In some embodiments, the motorized transport unit 102 includes an input/output (I/O) device 424 that is coupled to the control circuit 406. The I/O device 424 allows an external device to couple to the control unit 404. The function and purpose of connecting devices will depend on the application. In some examples, devices connecting to the I/O device 424 may add functionality to the control unit 404, allow the exporting of data from the control unit 404, allow the diagnosing of the motorized transport unit 102, and so on.

In some embodiments, the motorized transport unit 102 includes a user interface 426 including for example, user inputs and/or user outputs or displays depending on the intended interaction with the user. For example, user inputs could include any input device such as buttons, knobs, switches, touch sensitive surfaces or display screens, and so on. Example user outputs include lights, display screens, and so on. The user interface 426 may work together with or separate from any user interface implemented at a user interface unit 114 (such as a smart phone or tablet device).

The control unit 404 includes a memory 408 coupled to the control circuit 406 and that stores, for example, operating instructions and/or useful data. The control circuit 406 can comprise a fixed-purpose hard-wired platform or can comprise a partially or wholly programmable platform. These architectural options are well known and understood in the art and require no further description here. This control circuit 406 is configured (for example, by using corresponding programming stored in the memory 408 as will be well understood by those skilled in the art) to carry out one or more of the steps, actions, and/or functions described herein. The memory 408 may be integral to the control circuit 406 or can be physically discrete (in whole or in part) from the control circuit 406 as desired. This memory 408 can also be local with respect to the control circuit 406 (where, for example, both share a common circuit board, chassis, power supply, and/or housing) or can be partially or wholly remote with respect to the control circuit 406. This memory 408 can serve, for example, to non-transitorily store the computer instructions that, when executed by the control circuit 406, cause the control circuit 406 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

It is noted that not all components illustrated in FIG. 4 are included in all embodiments of the motorized transport unit 102. That is, some components may be optional depending on the implementation.

Figure 5:
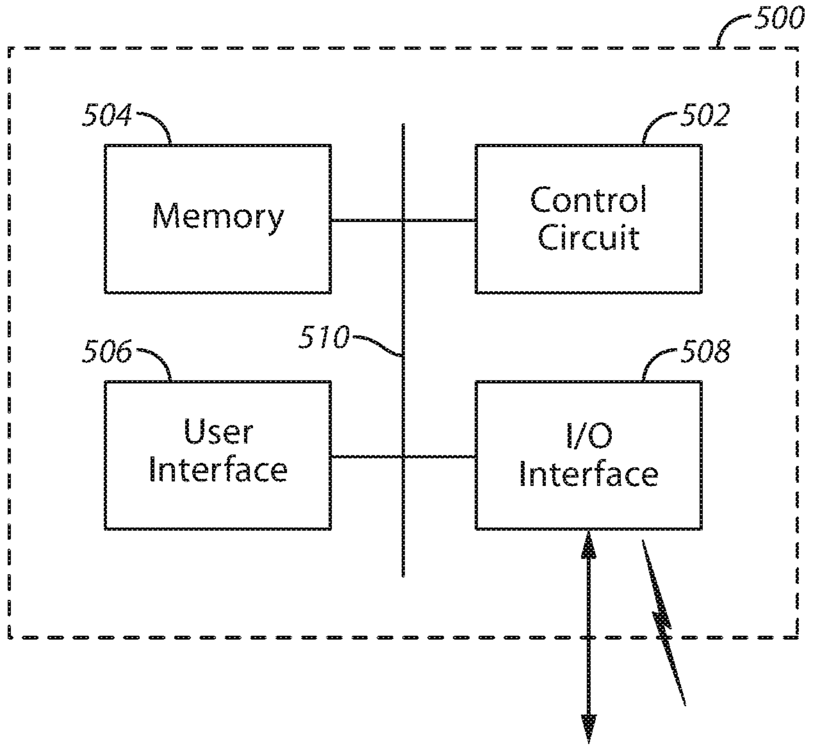
FIG. 5 comprises a block diagram of a computer device as configured in accordance with various embodiments of these teachings.

FIG. 5 illustrates a functional block diagram that may generally represent any number of various electronic components of the system 100 that are computer type devices. The computer device 500 includes a control circuit 502, a memory 504, a user interface 506 and an input/output (I/O) interface 508 providing any type of wired and/or wireless connectivity to the computer device 500, all coupled to a communication bus 510 to allow data and signaling to pass therebetween. Generally, the control circuit 502 and the memory 504 may be referred to as a control unit. The control circuit 502, the memory 504, the user interface 506 and the I/O interface 508 may be any of the devices described herein or as understood in the art. The functionality of the computer device 500 will depend on the programming stored in the memory 504. The computer device 500 may represent a high level diagram for one or more of the central computer system 106, the motorized transport unit 102, the user interface unit 114, the location detection system 116, the user interface computer 128, the MTU docking station 122 and the MTU dispenser 120, or any other device or component in the system that is implemented as a computer device.

Additional Features Overview

Referring generally to FIGS. 1-5, the shopping assistance system 100 may implement one or more of several different features depending on the configuration of the system and its components. The following provides a brief description of several additional features that could be implemented by the system. One or more of these features could also be implemented in other systems separate from embodiments of the system. This is not meant to be an exhaustive description of all features and not meant to be an exhaustive description of the details any one of the features. Further details with regards to one or more features beyond this overview may be provided herein.

Tagalong Steering: This feature allows a given motorized transport unit 102 to lead or follow a user (e.g., a customer and/or a worker) throughout the shopping facility 101. For example, the central computer system 106 uses the location detection system 116 to determine the location of the motorized transport unit 102. For example, LED smart lights (e.g., the ByteLight system) of the location detection system 116 transmit a location number to smart devices which are with the customer (e.g., user interface units 114), and/or on the item container 104/motorized transport unit 102. The central computer system 106 receives the LED location numbers received by the smart devices through the wireless network 124. Using this information, in some embodiments, the central computer system 106 uses a grid placed upon a 2D CAD map and 3D point cloud model (e.g., from the databases 126) to direct, track, and plot paths for the other devices. Using the grid, the motorized transport unit 102 can drive a movable item container 104 in a straight path rather than zigzagging around the facility. As the user moves from one grid to another, the motorized transport unit 102 drives the container 104 from one grid to the other. In some embodiments, as the user moves towards the motorized transport unit, it stays still until the customer moves beyond an adjoining grid.

Detecting Objects: In some embodiments, motorized transport units 102 detect objects through several sensors mounted on motorized transport unit 102, through independent cameras (e.g., video cameras 118), through sensors of a corresponding movable item container 104, and through communications with the central computer system 106. In some embodiments, with semi-autonomous capabilities, the motorized transport unit 102 will attempt to avoid obstacles, and if unable to avoid, it will notify the central computer system 106 of an exception condition. In some embodiments, using sensors 414 (such as distance measurement units, e.g., laser or other optical-based distance measurement sensors), the motorized transport unit 102 detects obstacles in its path, and will move to avoid, or stop until the obstacle is clear.

Visual Remote Steering: This feature enables movement and/or operation of a motorized transport unit 102 to be controlled by a user on-site, off-site, or anywhere in the world. This is due to the architecture of some embodiments where the central computer system 106 outputs the control signals to the motorized transport unit 102. These controls signals could have originated at any device in communication with the central computer system 106. For example, the movement signals sent to the motorized transport unit 102 may be movement instructions determined by the central computer system 106; commands received at a user interface unit 114 from a user; and commands received at the central computer system 106 from a remote user not located at the shopping facility space.

Determining Location: Similar to that described above, this feature enables the central computer system 106 to determine the location of devices in the shopping facility 101. For example, the central computer system 106 maps received LED light transmissions, Bluetooth low energy radio signals or audio signals (or other received signals encoded with location data) to a 2D map of the shopping facility. Objects within the area of the shopping facility are also mapped and associated with those transmissions. Using this information, the central computer system 106 can determine the location of devices such as motorized transport units.

Digital Physical Map Integration: In some embodiments, the system 100 is capable of integrating 2D and 3D maps of the shopping facility with physical locations of objects and workers. Once the central computer system 106 maps all objects to specific locations using algorithms, measurements and LED geo-location, for example, grids are applied which sections off the maps into access ways and blocked sections. Motorized transport units 102 use these grids for navigation and recognition. In some cases, grids are applied to 2D horizontal maps along with 3D models. In some cases, grids start at a higher unit level and then can be broken down into smaller units of measure by the central computer system 106 when needed to provide more accuracy.

Calling a Motorized Transport Unit: This feature provides multiple methods to request and schedule a motorized transport unit 102 for assistance in the shopping facility. In some embodiments, users can request use of a motorized transport unit 102 through the user interface unit 114. The central computer system 106 can check to see if there is an available motorized transport unit. Once assigned to a given user, other users will not be able to control the already assigned transport unit. Workers, such as store associates, may also reserve multiple motorized transport units in order to accomplish a coordinated large job.

Locker Delivery: In some embodiments, one or more motorized transport units 102 may be used to pick, pack, and deliver items to a particular storage locker 132. The motorized transport units 102 can couple to and move the storage locker to a desired location. In some embodiments, once delivered, the requestor will be notified that the items are ready to be picked up, and will be provided the locker location and locker security code key.

Route Optimization: In some embodiments, the central computer system automatically generates a travel route for one or more motorized transport units through the shopping facility space. In some embodiments, this route is based on one or more of a user provided list of items entered by the user via a user interface unit 114; user selected route preferences entered by the user via the user interface unit 114; user profile data received from a user information database (e.g., from one of databases 126); and product availability information from a retail inventory database (e.g., from one of databases 126). In some cases, the route intends to minimize the time it takes to get through the facility, and in some cases, may route the shopper to the least busy checkout area. Frequently, there will be multiple possible optimum routes. The route chosen may take the user by things the user is more likely to purchase (in case they forgot something), and away from things they are not likely to buy (to avoid embarrassment). That is, routing a customer through sporting goods, women's lingerie, baby food, or feminine products, who has never purchased such products based on past customer behavior would be non-productive, and potentially embarrassing to the customer. In some cases, a route may be determined from multiple possible routes based on past shopping behavior, e.g., if the customer typically buys a cold Diet Coke product, children's shoes or power tools, this information would be used to add weight to the best alternative routes, and determine the route accordingly.

Store Facing Features: In some embodiments, these features enable functions to support workers in performing store functions. For example, the system can assist workers to know what products and items are on the shelves and which ones need attention. For example, using 3D scanning and point cloud measurements, the central computer system can determine where products are supposed to be, enabling workers to be alerted to facing or zoning of issues along with potential inventory issues.

Phone Home: This feature allows users in a shopping facility 101 to be able to contact remote users who are not at the shopping facility 101 and include them in the shopping experience. For example, the user interface unit 114 may allow the user to place a voice call, a video call, or send a text message. With video call capabilities, a remote person can virtually accompany an in-store shopper, visually sharing the shopping experience while seeing and talking with the shopper. One or more remote shoppers may join the experience.

Returns: In some embodiments, the central computer system 106 can task a motorized transport unit 102 to keep the returns area clear of returned merchandise. For example, the transport unit may be instructed to move a cart from the returns area to a different department or area. Such commands may be initiated from video analytics (the central computer system analyzing camera footage showing a cart full), from an associate command (digital or verbal), or on a schedule, as other priority tasks allow. The motorized transport unit 102 can first bring an empty cart to the returns area, prior to removing a full one.

Bring a Container: One or more motorized transport units can retrieve a movable item container 104 (such as a shopping cart) to use. For example, upon a customer or worker request, the motorized transport unit 102 can reposition one or more item containers 104 from one location to another. In some cases, the system instructs the motorized transport unit where to obtain an empty item container for use. For example, the system can recognize an empty and idle item container that has been abandoned or instruct that one be retrieved from a cart storage area. In some cases, the call to retrieve an item container may be initiated through a call button placed throughout the facility, or through the interface of a user interface unit 114.

Respond to Voice Commands: In some cases, control of a given motorized transport unit is implemented through the acceptance of voice commands. For example, the user may speak voice commands to the motorized transport unit 102 itself and/or to the user interface unit 114. In some embodiments, a voice print is used to authorize to use of a motorized transport unit 102 to allow voice commands from single user at a time.

Retrieve Abandoned Item Containers: This feature allows the central computer system to track movement of movable item containers in and around the area of the shopping facility 101, including both the sale floor areas and the back-room areas. For example, using visual recognition through store cameras 118 or through user interface units 114, the central computer system 106 can identify abandoned and out-of-place movable item containers. In some cases, each movable item container has a transmitter or smart device which will send a unique identifier to facilitate tracking or other tasks and its position using LED geo-location identification. Using LED geo-location identification with the Determining Location feature through smart devices on each cart, the central computer system 106 can determine the length of time a movable item container 104 is stationary.

Stocker Assistance: This feature allows the central computer system to track movement of merchandise flow into and around the back-room areas. For example, using visual recognition and captured images, the central computer system 106 can determine if carts are loaded or not for moving merchandise between the back room areas and the sale floor areas. Tasks or alerts may be sent to workers to assign tasks.

Self-Docking: Motorized transport units 102 will run low or out of power when used. Before this happens, the motorized transport units 102 need to recharge to stay in service. According to this feature, motorized transport units 102 will self-dock and recharge (e.g., at a MTU docking station 122) to stay at maximum efficiency, when not in use. When use is completed, the motorized transport unit 102 will return to a docking station 122. In some cases, if the power is running low during use, a replacement motorized transport unit can be assigned to move into position and replace the motorized transport unit with low power. The transition from one unit to the next can be seamless to the user.

Item Container Retrieval: With this feature, the central computer system 106 can cause multiple motorized transport units 102 to retrieve abandoned item containers from exterior areas such as parking lots. For example, multiple motorized transport units are loaded into a movable dispenser, e.g., the motorized transport units are vertically stacked in the dispenser. The dispenser is moved to the exterior area and the transport units are dispensed. Based on video analytics, it is determined which item containers 104 are abandoned and for how long. A transport unit will attach to an abandoned cart and return it to a storage bay.

Motorized Transport Unit Dispenser: This feature provides the movable dispenser that contains and moves a group of motorized transport units to a given area (e.g., an exterior area such as a parking lot) to be dispensed for use. For example, motorized transport units can be moved to the parking lot to retrieve abandoned item containers 104. In some cases, the interior of the dispenser includes helically wound guide rails that mate with the guide member 208 to allow the motorized transport units to be guided to a position to be dispensed.

Specialized Module Retrieval: This feature allows the system 100 to track movement of merchandise flow into and around the sales floor areas and the back-room areas including special modules that may be needed to move to the sales floor. For example, using video analytics, the system can determine if a modular unit it loaded or empty. Such modular units may house items that are of seasonal or temporary use on the sales floor. For example, when it is raining, it is useful to move a module unit displaying umbrellas from a back room area (or a lesser accessed area of the sales floor) to a desired area of the sales floor area.

Authentication: This feature uses a voice imprint with an attention code/word to authenticate a user to a given motorized transport unit. One motorized transport unit can be swapped for another using this authentication. For example, a token is used during the session with the user. The token is a unique identifier for the session which is dropped once the session is ended. A logical token may be a session id used by the application of the user interface unit 114 to establish the session id when user logs on and when deciding to do use the system 100. In some embodiments, communications throughout the session are encrypted using SSL or other methods at transport level.

Further Details of Some Embodiments

In accordance with some embodiments, further details are now provided for one or more of these and other features.

Various embodiments of systems and methods for bringing a shopping container to a customer in a shopping space are now described. In a broad sense and in accordance with some embodiments, a system is described for bringing a shopping container to a customer in a shopping space and comprises a plurality of sensors, a plurality of motorized transport units; and a control circuit communicatively coupled to the plurality of sensors and the plurality of motorized transport units. In some embodiments, the control circuit is configured to: receive a shopping container request from a user interface device associated with the customer; determine at least one available shopping container among a plurality of shopping containers based on data collected by the plurality of sensors, the at least one available shopping container being empty and not used by another customer; select an available shopping container from the at least one available shopping container based at least on a location information of the user interface device; select a motorized transport unit from among the plurality of motorized transport units to transport the available shopping container; and provide instructions to the motorized transport unit to bring the available shopping container to the customer.

A large number of retail store customers are destination shoppers who enter a store intending to purchase only a few items that can be carried in their arms. If a customer should find himself/herself in need of a shopping container (e.g., a moveable item container 104 such as described herein, such as a shopping cart or basket), a motorized transport unit (MTU) (such as any of the MTUs 102, 202, 402 described herein) can be tasked to retrieve one for him/her. This will save shopping time if the customer is pressed for time or is unable to locate or grab a container. For some customers, this capability would allow them to buy more merchandise if they are unwilling to backtrack to the front of the store to get a container, as the MTU would bring one to them. Additionally, an associate can issue a task assignment to an MTU to move an attachable movable item container from one location to another.

In some embodiments, an MTU's customer service capabilities include bringing out a shopping container (e.g., cart, basket, or special cart) to someone that needs one (customer, member, associate, colleague or supplier), then either leave the container, or assist the user in pulling or moving/transporting the container as required. Given this customer or associate request task, the MTU can re-position one or more containers, or other retrievable objects, from one location to another. In some embodiments, the MTU and the object to be moved may be fitted with a special connection "arm" that will allow the MTU to hook on, pull around a load, and later disconnect. The MTU may be configured to recognize if the shopping container is configured with a connector and maneuver in order to attach himself. Multiple MTUs can work together to fetch multiple shopping containers as part of one request.

In some embodiments, with no additional instruction, an MTU may be configured to know where to go to grab a cart or apparatus that has been requested. The MTU (and/or the central computer system 106) may be able to recognize an empty and idle shopping container that can be used. In some embodiments, the MTU (and/or the CCS 106) may recognize the correct type of shopping container as requested. If the shopping container type is not specified, an MTU may select a container type based on other contextual clues such as the category nearest the customer's location or previous requests by the same user. In some embodiments, the MTU may pull a shopping container from the container storage area (e.g., a cart corral), or attach to a loose shopping container.

In some embodiments, it is expected that the MTU will have ongoing low priority tasks. Once a task is completed, the MTU will continue to perform other tasks to which it is assigned. For example, the MTU may be tasked to look for abandoned shopping containers and return them to the front of the store (within his designated area). When freed from a prior task, an MTU will roam the surrounding area searching for abandoned shopping containers to retrieve, while listening for requests from the next customer or associate.

In some embodiments, an MTU "catches up" with the customer once a shopping container has been selected, and bring it to where the container was requested. A button may be placed throughout the store to request a shopping container. Alternatively, a smart phone app will allow the customer to summons a container. This app will communicate through cellular, Wi-Fi, or Bluetooth and relay the customer location to a central computer system so an assigned MTU can catch up. Speaking a command to an MTU may be a third method of requesting this action.

When a customer makes a "bring me a container" request, in some embodiments, an MTU will re-position one or more containers from one location to another. In some embodiments, each MTU includes an individual name badge, and will accept commands when the name on the badge is called.

Figure 6:
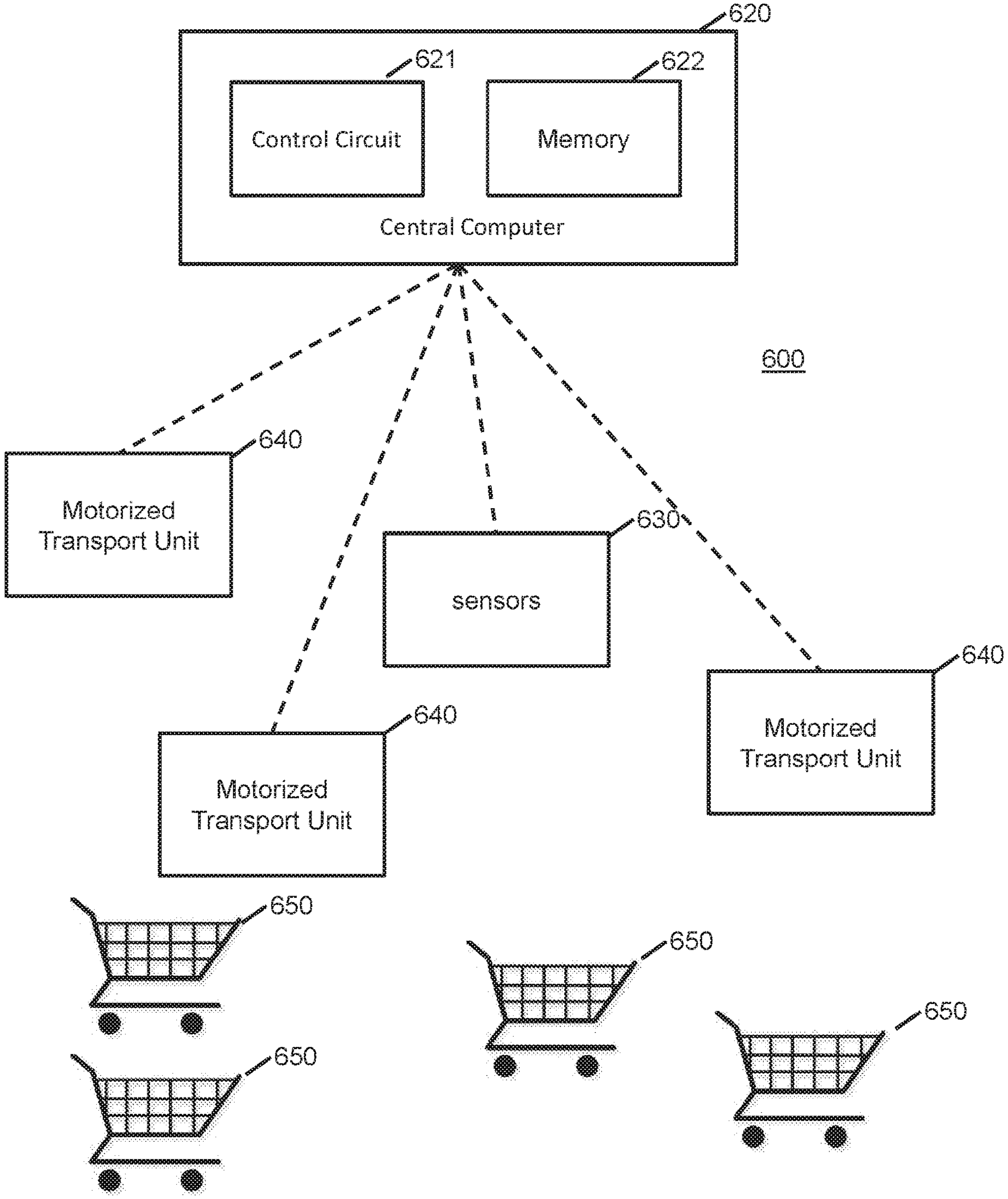
FIG. 6 comprises a block diagram of a system for bringing a shopping container to a customer in accordance with various embodiments of these teachings.

FIG. 6 illustrates a block diagram of an exemplary shopping facility assistance system 600, similar to that of FIG. 1, as configured in accordance with various embodiments of these teachings. The shopping facility assistance system 600 includes a central computer system 620, a set of sensors 630, and a number of motorized transport units 640 (MTUs 640) each configured to attach to and transport movable item containers 650 (also referred to as shopping containers). The shopping facility assistance system 600 may include or be implemented at least partially with one or more components shown in FIGS. 1, 4, and 5 or may be more generically implemented outside of the embodiments of FIGS. 1, 4 and 5.

The central computer system 620 includes a control circuit 621 and a memory 622, and may be generally referred to as a processor-based device. In some embodiments, the central computer system 620 may be implemented to include one or more of the central computer system 106 and/or the computer device 500 described above. For example, the functionalities of the central computer system 620 described herein may be implemented as a software module in the central computer system 106.

The central computer system 620 has stored on its memory 622, a set of computer readable instructions that is executable by the control circuit 621 to cause the control circuit 621 to instruct an MTU 640 to bring an available movable item container 650 to a customer in a shopping space. The central computer system 620 may also be configured to determine the locations of MTUs 640 and movable items containers 650, and determine which movable item containers 650 are available for customer use based on sensor data. In some embodiments, the central computer system 620 may be located inside of and serve a specific shopping space. In some embodiments, the central computer system 620 may be at least partially implemented on a remote or cloud-based server that provides instructions to MTUs in one or more shopping spaces.

The central computer system 620 is communicatively coupled to a set of sensors 630. Sensors 630 may include one or more of optical sensors, image sensors, proximity sensors, the location detection system 116, the video camera system 118, and sensors on MTUs 120 described with reference to FIG. 1 above. Generally, the sensors 630 are configured to provide the central computer system 620 information to determine whether one or more of the movable item containers 650 are available. For example, the sensors 630 may be a set of cameras for providing images of the movable item containers 650 to the central computer system 620. The central computer system 620 may analyze the images captured by the cameras and determine how long each movable item container 650 has been idle and whether the movable item container currently holds any item/s. The cameras may be stationary cameras mounted in the shopping space and/or mounted on or integrated with the MTUs and/or user interface devices. In some embodiments, the sensors 116 may include one or more sensors attached to a movable item container 650. Sensors attached to movable item containers 650 may include gyroscope and/or location sensor for detecting an idle time of the container and weight sensors and/or cameras for determining whether any items have been placed into the container. In some embodiments, movable item containers 650 include sensors for receiving smart LED light transmissions useful to determine the location of the movable item containers 650. In some embodiments, the sensors 630 may comprise one or more sensors for determining the locations of MTUs 640. The sensors 630 may communicate with the central computer system through any wired or wireless communication means such as described herein.

Each motorized transport unit 640 may be the MTU 102 described in FIG. 1, the MTU shown in FIGS. 2A-3B, and/or the MTU 402 described in FIG. 4, for example. Generally, an MTU 640 may be a motorized device configured to transport a movable item container or shopping container through a shopping space according to instructions received from a central computer system 620. In some embodiments, the MTU 402 may include other input and output devices such as speaker and microphone for communicating with a customer.

The movable item containers 650 may be any conventional shopping carts, shopping baskets, flatbed carts, etc., or may be containers specifically configured to couple with the MTUs 640. Movable item containers 650 used in the shopping floor by customers may be generally referred to as shopping containers. While shopping carts are illustrated in FIG. 6, in some embodiments, the system may be configured to transport different types of shopping containers such as shopping carts of different sizes, shopping baskets, flatbed carts, shopping carts with child seats, child-friendly shopping trolleys, etc. The central computer system 620 may be configured to select a movable item container 650 based on a customer's requested type of shopping container.

Figure 7:
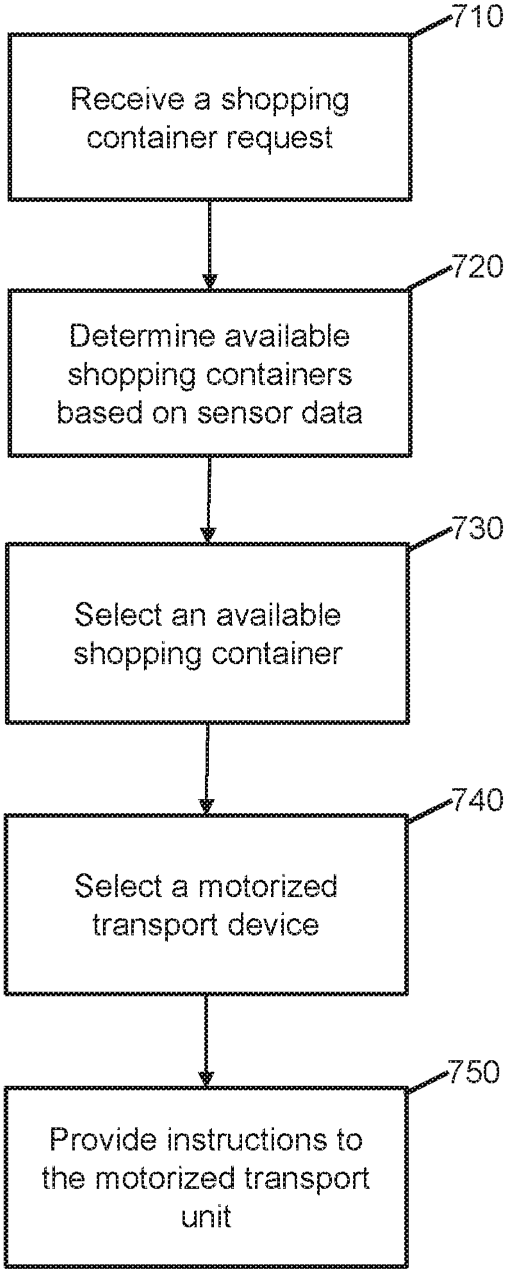
FIG. 7 comprises a flow diagram of a process for bringing a shopping container to a customer in accordance with various embodiments of these teachings.

FIG. 7 shows a flow diagram of a process for bringing an available shopping container to a customer in accordance with various embodiments of these teachings. The steps shown in FIG. 7 may be performed by one or more of the central computer system 620 in FIG. 6, the central computer system 106 in FIG. 1, and the computer device 500 in FIG. 5, for example. In some embodiments, the steps are performed by a processor-based device executing a set of computer readable instructions stored on a memory device. In some embodiments, one or more of the steps may also be performed by a software program, such as an "APP," running on a user interface device. Generally, the steps shown in FIG. 7 are performed by a control circuit of a processor-based device.

In step 710, the control circuit receives a shopping container request. A shopping container request may be made via a user interface device such as user interface unit 114, which may be a customer's personal device or a store-owned mobile or stationary device configured to communicate with a central computer system. The user interface unit may include a software or hardware button to request a shopping container. In some embodiments, the request may further include a request for a specific type of shopping container. For example, a customer may request for shopping carts of different sizes, shopping baskets, flatbed carts, shopping carts with child seats, child-friendly shopping trolleys, etc. The user interface unit may display the different available options to the user. In some embodiments, a shopping container request may also be a command spoken. For example, the customer may say to an MTU unit or a user device "bring me a container." In some embodiments, when the shopping container is requested, the system also determines a location of the requesting customer and/or device. For example, the user interface device may pick up smart encoded LED light transmissions as described herein or other location information and provide that information to the system along with the shopping container request. In some embodiments, a request may be made through a device installed at a fixed location, such as a pole, in the shopping space, and the system may determine the location of the requesting device based on the device's identifying information. In some embodiment, the customer may specify a destination location for the shopping container. For example, the customer may request to have a shopping container to be brought to pole #12, regardless of the customer's current location.

In step 720, the control circuit determines a plurality of available shopping containers based on sensor data. Generally, an available shopping container is a shopping container that is empty and not used by another customer. In some embodiments, a central computer system may monitor a plurality of shopping containers in a shopping space for their availability. The central computer system may determine whether a shopping container is available based on how long the shopping container has been idle and/or whether the shopping container is currently holding any item/s based on sensor data. In some embodiments, a shopping container may also be determined to be available if it is in a certain area. For example, containers in the shopping cart return area, shopping cart retrieval area, shopping basket stand, etc. may be determined to be available regardless of its idle time. In some embodiments, a shopping container may be determined to be available based on its location and whether it is empty, without considering its idle time. For example, in the parking lot areas, any shopping container that is empty may be considered to be available regardless how long the container has been idle. In some embodiments, the idle time threshold may be set differently for different areas of the store. For example, the idle time threshold for areas around the restroom and the deli counter may be set longer than those in other areas. In some embodiments, the system may further determine a container holding items to be abandoned if a longer idle threshold has passed (e.g. 20 minutes). In such case, the system may instruct the MTU and/or an associate to empty the shopping container to make the container available for other customers.

In some embodiments, the central computer analyzes images captured by a camera system to determine how long each shopping container has remained at the same location and/or whether the shopping container is empty. The system may determine whether the shopping container is empty by comparing captured images of the container with stored images of empty containers. Such captured and stored images may be taken from one or more angles (for example, side views, top down views, etc.). The system may also calculate the area of visible wire mesh in the images of the container to determine if the container is holding any item. In some embodiment, when the system detects an object in the images that matches a wire mesh pattern, that object is evaluated to determine the horizontal size of the object based on its distance from the camera using geometric algorithm. The system then analyzes the object to determine if there are objects within the wire mesh. If objects are detected, the container is removed from the possibility of being empty. In some embodiments, the system may use information from sensors attached to shopping containers. For example, a shopping container may have attached to it, a weight sensor and/or a movement sensor such as a gyroscope and location sensors that provide availability data to the central system.

In some embodiments, the system may constantly keep track of the state of each shopping container in the shopping space. For example, the system may keep a log of the empty/fill state of each container and the idle time of each container, and periodically mark each tracked shopping container as being either being in-use, available, or abandoned. The tracked status of each shopping container may be stored in a shopping container tracking database. In such embodiments, in step 720, the system may retrieve the stored availability information from the shopping container tracking database.

In some embodiments, the availability determination is performed on-the-fly. For example, when the system receives a request from a customer, the system may first determine the closest shopping container to the customer that has no movement for at least a set amount of time (e.g. 10 minutes). The movement of the shopping containers may be determine based a camera system and/or the data received by smart LED sensors attached to the shopping containers. Once an idle shopping container is found, the system retrieves images of the area around the shopping container captured with mounted video cameras in the shopping space to find an object matching the shopping container (such as a wire mesh cart). When the shopping container is identified in the camera image, the system then determines whether there are objects in the shopping container using image analysis. In some embodiments, the system may use previously captured images of the areas to determine whether an identified empty shopping container has been idle for at least a set amount of time. If a shopping container is determined to be not available, then the next closest shopping container may be analyzed by the system for its availability.

In step 730, the control circuit selects an available shopping container from among the available shopping containers determined in step 720. The available shopping container may be selected based on the location of the customer and/or the request user interface device. In some embodiments, the available shopping container that is closest to the customer may be selected. In some embodiments, the available shopping container that can be brought to the customer in the shortest amount of time may be selected. The time it takes for a shopping container to be brought to a customer may be estimated based on one or more of the customer's location, the customer's projected path of travel, the location of the shopping container, the location of the MTU, length of the path of travel, congestion conditions of the path of travel, etc. For example, if the closest MTU has an available shopping container nearby, that shopping container may be selected over an available container just one aisle over from the customer, since the total travel time for the MTU would be shorter. In some embodiments, the system may select a specific type of container from the available containers based on one or more of user request, user demographic information, stored user shopping habit, user location, etc.

In step 740, a motorized transport unit is selected. The motorized transport unit may be selected from a plurality of MTUs to transport the selected shopping container to the user. In some embodiments, steps 730 and 740 are performed sequentially, that is, a shopping container is selected first and then an MTU is selected. For example, the system may select an MTU that is closest to the shopping container to transport the shopping container. In other embodiments, step 740 may be performed in conjunction with step 730. For example, the system may select a shopping container and MTU combination that can deliver a shopping container to a customer in the shortest amount of time. In some embodiments, if an MTU is already assigned to the customer, the assigned MTU may be selected in step 730. In some embodiments, the selected MTU is the MTU that receives a verbal command from a customer.

In step 730, the control circuit provides instructions to the MTU selected in step 740 to bring the available shopping container selected in step 730 to the requesting customer. The instructions may include a current location of the shopping container and/or the customer. In some embodiments, the instructions may include route guidance to the shopping container and then to the customer. In some embodiments, the system may keep track of the current location of the customer and update the instruction to the MTU accordingly such that the MTU is able to "catch up" with the customer if the customer continues to move after making the request in step 710.

Based on the instructions provided in step 750, the MTU selected in step 740 would travel to the shopping container selected in step 730, attached itself to the shopping container, and then transport the shopping container to the current location of the customer and/or requesting device. After the MTU arrives at the customer's locations, depending on customer's selection, the MTU may leave the shopping container with the customer and be available to perform other tasks, or the MTU may become assigned to the customer and escort the customer while transporting the attached shopping container during the customer's shopping trip.

In some embodiments, apparatuses and methods are provided herein useful to bringing a shopping container to a customer in a shopping space. In some embodiments, a system for bringing a shopping container to a customer in a shopping space comprises a plurality of sensors, a plurality of motorized transport units, and a control circuit communicatively coupled to the plurality of sensors and the plurality of motorized transport units. The control circuit being configured to: receive a shopping container request from a user interface device associated with the customer, determine at least one available shopping container among a plurality of shopping containers based on data collected by the plurality of sensors, the at least one available shopping container being empty and not used by another customer, select an available shopping container from the at least one available shopping container based at least on a location information of the user interface device, select a motorized transport unit from among the plurality of motorized transport units to transport the available shopping container, and provide instructions to the motorized transport unit to bring the available shopping container to the customer.

In some embodiments, a method for bringing a shopping container to a customer in a shopping space comprises receiving, at a control circuit, a shopping container request from a user interface device associated with the customer, determining, by the control circuit, at least one available shopping container among a plurality of shopping containers based on data collected by a plurality of sensors communicatively coupled to the control circuit, the at least one available shopping container being empty and not used by another customer, selecting, by the control circuit, an available shopping container from the at least one available shopping container based at least on a location information of the user interface device, selecting, by the control circuit, a motorized transport unit from among a plurality of motorized transport units communicatively coupled to the control circuit to transport the available shopping container, and providing, by the control circuit, instructions from the control circuit to the motorized transport unit to bring the available shopping container to the customer.

In some embodiments an apparatus for providing a shopping container for a customer in a shopping space comprises a non-transitory storage medium storing a set of computer readable instructions, and a control circuit configured to execute the set of computer readable instructions which causes to the control circuit to: receive a shopping container request from a user interface device associated with the customer, determine at least one available shopping container among a plurality of shopping containers based on data collected by a plurality of sensors communicatively coupled to the control circuit, the at least one available shopping container being empty and not used by another customer, select an available shopping container from the at least one available shopping container based at least on a location information of the user interface device, select a motorized transport unit from among a plurality of motorized transport units communicatively coupled to the control circuit to transport the shopping container, and provide instructions to the motorized transport unit to bring the available shopping container to the customer.

In accordance with some embodiments, further details are now provided for one or more of these and other features and in particular shopping facility assistance systems, devices, and methods to support retrieval of a mobile item container.

By one approach the aforementioned central computer system is configured to identify an unattended mobile item container in the shopping facility parking lot. The central computer system then directs a particular one of the aforementioned plurality of motorized transport units through the shopping facility parking lot to the unattended mobile item container and causes that motorized transport unit to physically attach to the unattended mobile item container. The central computer system then directs that motorized transport unit through the shopping facility parking lot with the attached unattended mobile item container to a mobile item container receiving area.

By one approach the central computer system identifies a candidate mobile item container in the shopping facility parking lot, at least in part, based on video information of the shopping facility parking lot. By another approach, in lieu of the foregoing or in combination therewith, one or more of the available motorized transport units includes at least one external-environment sensor. The central computer system is then configured to identify a mobile item container in the shopping facility parking lot as being unattended, at least in part, based on external-environment sensor information provided by such a motorized transport unit. The central computer system can identify a mobile item container as being an unattended mobile item container as a function, at least in part, of whether the mobile item container contains any items.

These teachings are highly flexible in practice and will accommodate a wide variety of modifications and embellishments. As one example of flexibility, by one approach the central computer system is configured to have the motorized transport unit return the unattended mobile item container to a shopping cart corral located in the shopping facility parking lot. By another approach, the central computer system is configured to have the motorized transport unit return the unattended mobile item container to a shopping cart bay located in the shopping facility.

As an example of a modification that these teachings will readily accommodate, the central computer system can be configured to assess a risk of causing physical damage associated with, for example, having the motorized transport unit approach the unattended mobile item container, attach to the unattended mobile item container, and or move the unattended mobile item container. That physical damage can correspond, for example, to damage to a vehicle, damage to the unattended mobile item container, and/or damage to the motorized transport unit itself.

So configured, unattended mobile item containers can be readily and quickly identified and returned safely to an appropriate holding and/or staging area. Suitably employed, these teachings can greatly mitigate the problems associated with unattended mobile item containers without necessitating a concurrent undue dedication of human resources.

Figure 8:
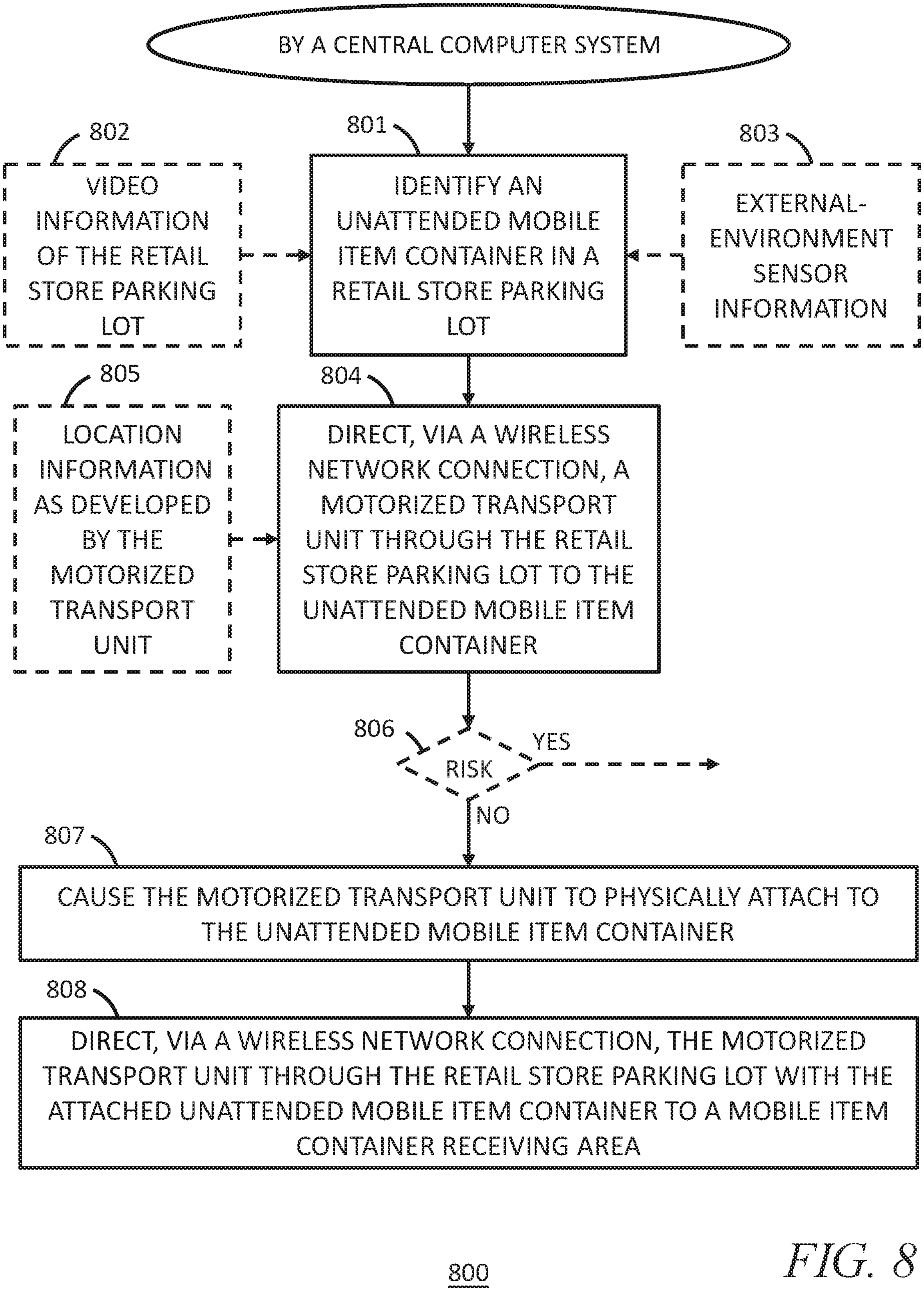
FIG. 8 comprises a flow diagram as configured in accordance with various embodiments of these teachings.

FIG. 8 presents an illustrative process 800 that accords with many of these teachings. This process 800 can be carried out by the central computer system 106 described above. For the sake of an illustrative example, this description will presume the mobile item container to be a standard wheeled shopping cart. It will be understood, however, that the specifics corresponding to such an example are not intended to suggest any particular limitations with respect to the scope of these teachings.

Figure 9:
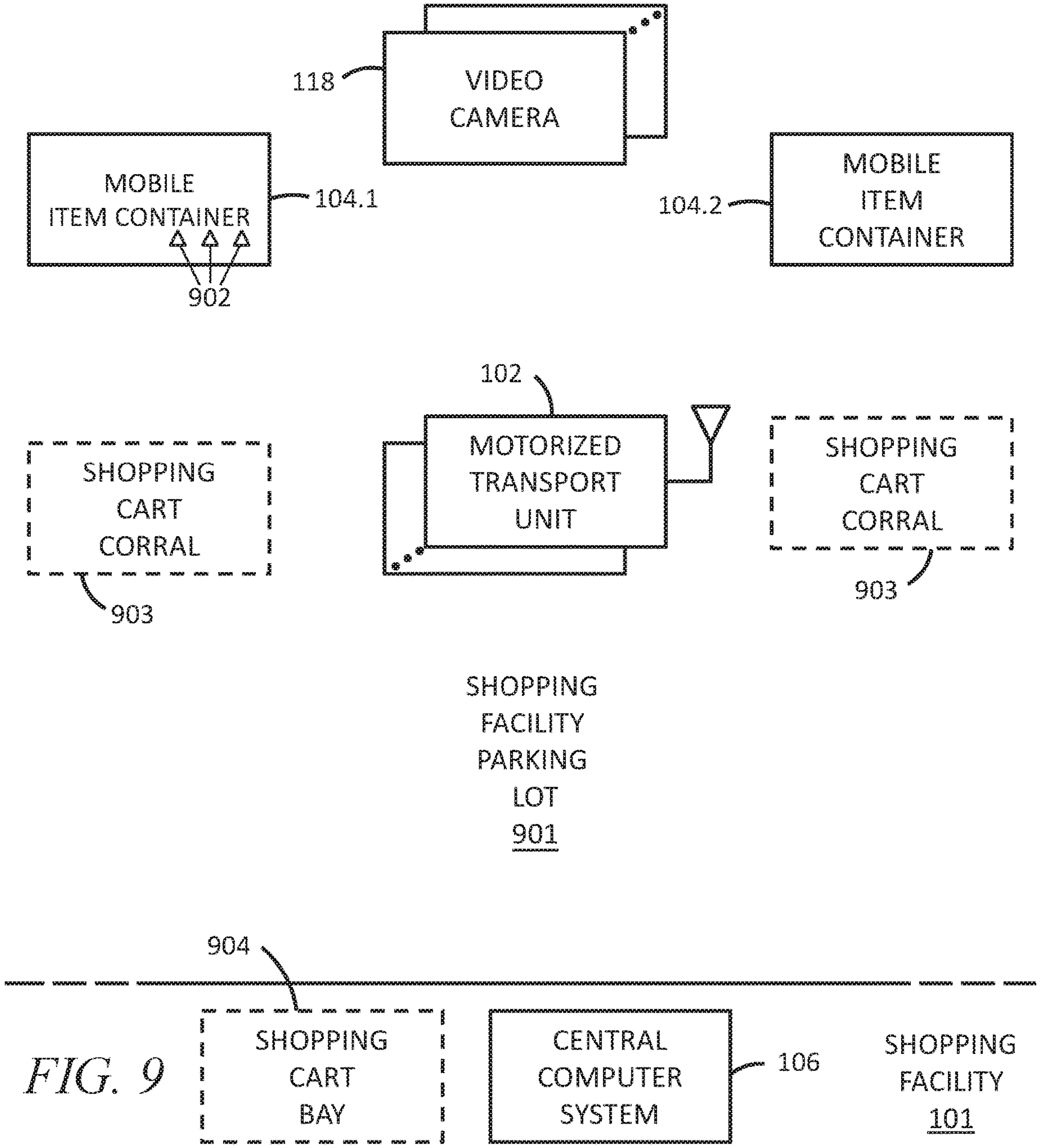
FIG. 9 comprises a block diagram, schematic view as configured in accordance with various embodiments of these teachings.

Referring to both FIG. 8 and FIG. 9, at block 801 the central computer system 106 identifies an unattended mobile item container in a shopping facility parking lot 901. As presented in FIG. 9, this shopping facility parking lot 901 is directly adjacent and external to a corresponding shopping facility 101. This shopping facility parking lot 901 may be paved or unpaved as desired and may be lined to indicate travel lanes and/or parking spaces or not as desired. This shopping facility parking lot 901 may be wholly dedicated to providing parking spaces for customers visiting the shopping facility 101. By another approach, this shopping facility parking lot 901 may be shared with other shopping facilities.

By one optional approach, the central computer system 106 identifies unattended mobile item containers in the shopping facility parking lot 901, at least in part, based on video information 802 of the shopping facility parking lot 901. That video information 802 can be provided, for example, by video cameras 118 that are positioned such that at least a part of the captured field of view includes at least some part of the shopping facility parking lot 901. In such a case the central computer system 106 can have access to image processing and/or pattern-matching programs that facilitate identifying a particular object in a field of view as comprising a mobile item container 104. Such image processing and pattern matching comprises a known area of prior art endeavor. As the present teachings are not particularly sensitive to any particular selections in these regards, further elaboration is not provided here regarding such techniques.

By another approach, used in combination with the foregoing or in lieu thereof, the central computer system 106 identifies unattended mobile item containers 104 in the retail store parking lot 901, at least in part, based on external-environment sensor information 803 provided by the aforementioned location detection system 116, video cameras 118, or one or more of the plurality of motorized transport units 102. Such external-environment sensor information 803 can be developed, for example, by an onboard sensor 414 as described above that specifically serves in these regards. As one simple example in these regards, the mobile item containers 104 may be equipped with RFID tags or other close-range transponders or transmitters that the aforementioned on-board sensor 414 can detect and provide to the central computer system 106 as the aforementioned external-environment sensor information 803.

By one approach the central computer system 106 identifies whether a mobile item container 104 is unattended as a function, at least in part, of whether the mobile item container 104 contains any items. Using this approach, the mobile item container denoted by reference numeral 104.1 would not be identified as being unattended because this mobile item container contains three items 902. Conversely, the mobile item container denoted by reference numeral 104.2 does not contain any items and hence qualifies as likely being unattended.

These teachings will accommodate taking other criteria into account as well when determining whether a given mobile item container constitutes an unattended mobile item container. As one example in these regards, it may not only be required that the mobile item container be devoid of items but also that that state have persisted for at least a predetermined period of time (such as 30 seconds, one minute, five minutes, or some other duration of choice) without the movable item container having moved.

Upon identifying an unattended mobile item container 104.2 in the shopping facility parking lot 901, at block 804 the central computer system 106 directs a motorized transport 102 (using, for example, the aforementioned wireless network connection or some other communicative channel of choice) through the shopping facility parking lot 901 to the unattended mobile item container 104.2. By one approach the central computer system 106 simply provides a destination to this motorized transport unit 102. By another approach, the central computer system 106 provides step-by-step movement instructions to the motorized transport unit 102 to thereby guide the motorized transport unit 102 to the location of the unattended mobile item container 104.2.

As noted above the motorized transport unit 102 may have any of a variety of sensors 414. By one approach at least one of the sensors 414 is configured to develop location information using externally-sourced navigation information. As one example in these regards, since the shopping facility parking lot 901 is likely (but not necessarily) substantially uncovered, the motorized transport unit 102 may include a sensor 414 comprising, at least in part, a global positioning system receiver. So configured, by one optional approach the motorized transport unit provides that location information 805 to the central computer system 106 and the central computer system 106 then directs the motorized transport unit 102 through the shopping facility parking lot 901 to the unattended mobile item container 104.2 by, at least in part, using that location information 805.

By one approach these teachings will facilitate having the central computer system 106 direct the motorized transport unit 102 to the unattended mobile item container 104.2 via path segments that are intended and determined to avoid likely collisions between the motorized transport unit 102 and other objects in the shopping facility parking lot 901. These teachings will also accommodate halting the assigned motorized transport unit 102 when changing circumstances in the shopping facility parking lot 901 present an undue obstacle. In such a case the central computer system 106 can either wait for the pathway to clear or the central computer system 106 can direct the motorized transport unit 102 using a detour. By yet another alternative approach the central computer system 106 can reassign this task to another motorized transport unit 102 that will not likely face the same circumstance of concern.

As the motorized transport unit 102 approaches the unattended mobile item container 104.2, by one optional approach and as illustrated at block 806, the central computer system 106 can assess whether there is any risk of causing physical damage (for example, to a vehicle that is parked in the shopping facility parking lot 901, to the unattended mobile item container 104.2 itself, or to the motorized transport unit 102 itself) when approaching the unattended mobile item container 104.2, when attaching to the unattended mobile item container 104.2, and/or when moving the unattended mobile item container 104.2 after being attached thereto. Such a risk assessment can be based, for example, upon an assessment of the relative dimensions of various objects in the vicinity of the unattended mobile item container 104.2, movement limitations as correspond to the motorized transport unit 102 and/or the unattended mobile item container 104.2 (such as a relevant turning radius), prevailing relevant weather conditions such as a direction and velocity of present wind, and so forth.

These teachings will accommodate any of a variety of responses upon determining a credible risk in these regards. For example, by one approach, the central computer system 106 can simply maintain the motorized transport unit 102 in a waiting state to await more favorable retrieval conditions. By another approach the central computer system 106 can abort this task and re-task the motorized transport unit 102. In such a case the central computer system 106 can also alert a human associate such that the human associate can then retrieve the unattended mobile item container 104.2 with presumably reduced risk of any corresponding physical damage.

Presuming no more than an acceptable risk, at block 807 this process 800 then provides for causing the motorized transport unit 102 to physically attach to the unattended mobile item container 104.2 as described above. Once attached, and per block 808, the central computer system 106 then directs, again via the wireless network connection, the motorized transport unit 102 through the shopping facility parking lot 901 with the attached unattended mobile item container 104.2 to an appropriate mobile item container receiving area. These teachings are quite flexible in these regards. By one approach the mobile item container receiving area comprises a shopping cart corral 903 disposed in the shopping facility parking lot 901. By another approach, the mobile item container receiving area comprises a shopping cart bay 904 located in (or at least partially within) the shopping facility 101 itself.

Upon reaching the designated mobile item container receiving area the motorized transport unit 102 then detaches itself from the unattended mobile item container 104.2. The motorized transport unit 102 then leaves the mobile item container receiving area for another destination, leaving the unattended mobile item container 104.2 in the mobile item container receiving area.

So configured, unattended mobile item containers can be reliably identified and removed to safer, more useful areas in an automated and efficient manner. As noted above these teachings will accommodate a variety of modifications as desired. As one example in these regards, when the central computer system 106 identifies two unattended mobile item containers 104 that are nested one in the other in the shopping facility parking lot 901, the central computer system 106 can direct at least two motorized transport units 102 through the shopping facility parking lot 901 to the two nested unattended mobile item containers 104 and cause both of these motorized transport units 102 to attach to the nested unattended mobile item containers 104.3 the central computer system 106 can then direct both of these motorized transport units through the shopping facility parking lot 901 with the attached nested unattended mobile item containers 104 to the aforementioned mobile item container receiving area.

In some embodiments, a central computer system identifies an unattended mobile item container in a shopping facility parking lot. The central computer system then directs a motorized transport unit through the retail store parking lot to the unattended mobile item container and causes that motorized transport unit to physically attach to the unattended mobile item container. The central computer system then directs that motorized transport unit through the retail store parking lot with the attached unattended mobile item container to a mobile item container receiving area.

In some embodiments, a shopping facility assistance system comprises: a plurality of motorized transport units configured to move through a shopping facility parking lot, a central computer system having a network interface such that the central computer system wirelessly communicates with the plurality of motorized transport units and wherein the central computer system is configured to: identify an unattended mobile item container in the shopping facility parking lot, direct a particular one of the plurality of motorized transport units through the shopping facility parking lot to the unattended mobile item container, cause the particular one of the plurality of motorized transport units to physically attach to the unattended mobile item container, and direct, via a wireless network connection, the particular one of the plurality of motorized transport units through the shopping facility parking lot with the attached unattended mobile item container to a mobile item container receiving area.

In some embodiments, the mobile item container comprises a wheeled shopping cart. In some embodiments, the central computer system is configured to identify the unattended mobile item container in the shopping facility parking lot, at least in part, based on video information of the shopping facility parking lot. In some embodiments, at least some of the plurality of motorized transport units include at least one external-environment sensor and wherein the central computer system is further configured to identify the unattended mobile item container in the shopping facility parking lot, at least in part, based on external-environment sensor information provided by at least one of the plurality of motorized transport units. In some embodiments, the central computer system is configured to identify a mobile item container as being an unattended mobile item container as a function, at least in part, of whether the mobile item container contains any items. In some embodiments, each of the plurality of motorized transport units is configured to develop location information using externally-sourced navigation information. In some embodiments, the central computer system is configured to direct the particular one of the plurality of motorized transport units through the shopping facility parking lot to the unattended mobile item container by using, at least in part, the location information as developed by the particular one of the plurality of motorized transport units. In some embodiments, the mobile item container receiving area comprises one of: a shopping cart corral located in the shopping facility parking lot and a shopping cart bay located in the shopping facility. In some embodiments, at least one of the particular one of the plurality of motorized transport units and the central computer system is configured to assess a risk of causing physical damage associated with at least one of: approaching the unattended mobile item container, attaching to the unattended mobile item container, and moving the unattended mobile item container. In some embodiments, the physical damage comprises at least one of: damage to a vehicle, damage to the unattended mobile item container, damage to the particular one of the motorized transport units. In some embodiments, the central computer system is further configured to: identify at least two nested unattended mobile item containers in the shopping facility parking lot, direct at least two of the plurality of motorized transport units through the shopping facility parking lot to the two nested unattended mobile item containers, cause both of the at least two of the plurality of motorized transport units to attach to the two nested unattended mobile item containers, direct the at least two of the plurality of motorized transport units through the shopping facility parking lot with the attached two nested unattended mobile item containers to a mobile item container receiving area.

In some embodiments, a method comprises, by a central computer system: identifying an unattended mobile item container in a shopping facility parking lot, directing, via a wireless network connection, a motorized transport unit through the shopping facility parking lot to the unattended mobile item container, causing the motorized transport unit to physically attach to the unattended mobile item container, directing, via a wireless network connection, the motorized transport unit through the shopping facility parking lot with the attached unattended mobile item container to a mobile item container receiving area.

In some embodiments, the central computer system is configured to identify the unattended mobile item container in the shopping facility parking lot by, at least in part, using video information of the shopping facility parking lot. In some embodiments, the motorized transport unit includes at least one external-environment sensor and wherein the central computer system is further configured to identify the unattended mobile item container in the shopping facility parking lot by, at least in part, using external-environment sensor information provided by the motorized transport unit. In some embodiments, the central computer system is configured to identify a mobile item container as being an unattended mobile item container by, at least in part, determining whether the mobile item container contains any items. In some embodiments, the motorized transport unit is configured to develop location information using externally-sourced navigation information. In some embodiments, the central computer system is configured to direct the motorized transport unit through the shopping facility parking lot to the unattended mobile item container by, at least in part, using the location information as developed by the motorized transport unit. In some embodiments, the mobile item container receiving area comprises one of: a shopping cart corral located in the shopping facility parking lot; and a shopping cart bay located in the shopping facility. In some embodiments, at least one of the motorized transport unit and the central computer system is configured to assess a risk of causing physical damage associated with at least one of: approaching the unattended mobile item container, attaching to the unattended mobile item container, and moving the unattended mobile item container. In some embodiments, the physical damage comprises at least one of: damage to a vehicle, damage to the unattended mobile item container, and damage to the particular one of the motorized transport units.

In accordance with some embodiments, further details are now provided for one or more of these and other features. A system and method determining item availability in a shopping space are provided herein.

It is important for a customer to be able to find an item they wish to purchase in a shopping space. Some items may be expected to always be in-stock, most items may be expected to be out of stock infrequently, and seasonal merchandise may be expected to be out of stock at a particular point in time. Since an MTU system may have access to item inventory information, the system may locate various items in the store and validate that the inventory count matches what is actually on the shelf. If the item cannot be found on the sales floor, a customer will often ask an associate or leave the store without making the purchase. This creates additional work for an associate (as associates may not know where the item is himself) and can cost the customer valuable shopping time. It also can leave the customer unsatisfied with their shopping experience. The customer may go to a competitor location in order to find the item they are looking for. Since an MTU system may continually monitor the inventory, the system can realize when an item is out-of-tolerance with the records and will notify relevant management to potentially correct the inventory metrics in order to avoid future out-of-stock situations.

During a special event (e.g. promotions, sales), an MTU system can be made aware of all the special event item inventory locations and help direct the customer to the item. Additionally, an MTU can notify the customer when an item is out of stock and indicate when the item will be back in stock and/or call a receiving associate to fill the shelf with items in the storage area.

An MTU may include count-it capabilities which may include visually counting merchandise, looking up the inventory expected to be on hand, and providing alerts and corrections when discrepancies exist. An MTU with visual and voice recognition capabilities may be configured to perform this function. An MTU can be tasked to count an item or a grouping of items that can be visually recognized without moving the merchandise. By watching sales and receiving, an MTU system may determine the optimum time to count the inventory to provide the highest level of accuracy. For example, peak selling timeframes or just after a load of merchandise has been received may not be the ideal time to count items. The MTU may schedule to count items after a selling rush when items are likely to be at the lowest stock level. An MTU may be configured to always be searching for an "out of stock" situation and ensure that orders are placed to replenish the product as soon as possible.

In some embodiments, an MTU can be called (or acts as a store telephone operator) to answer inventory questions. Example, a customer may ask "do you have A-brand smartphones?" An MTU may be configured to answer: "Yes, we have the lowest price for the A-brand smartphone. It's one dollar ninety-five with a two-year contract. You can find it in the Electronics department." After locating an item, the MTU may be configured to suggest a different item (based on customer knowledge) and suggest purchasing "cross-sell" item(s). For example, the MTU may say "you may also want to check out our large assortment of smartphone cases just behind the electronics counter." If the item requested is not in-stock, an MTU may provide information concerning when the next shipment will arrive at the store.

An MTU system with item counting capabilities can function to maintain more accurate inventory information due to inventory shrink and reduce the occurrence of empty shelves. The system may visually recognize an out-of-stock situation, track inventory of an item at multiple display locations (e.g. modular and feature locations), and identify inventory discrepancies. The system may also assist customers in locating items to free up associates to perform other tasks. The system may further provide analytic information to determine items that the store may want to add to the inventory, items that need additional inventory, items that may need to be relocated, items to features, and an optimum time to count inventory. The analytic information may also be used to predict a future out-of-stock situation and change replenishment settings to avoid out-of-stock situations. The system may also provide customers with alternate purchase methods such as buying from another store and buying on-line.

Figure 10:
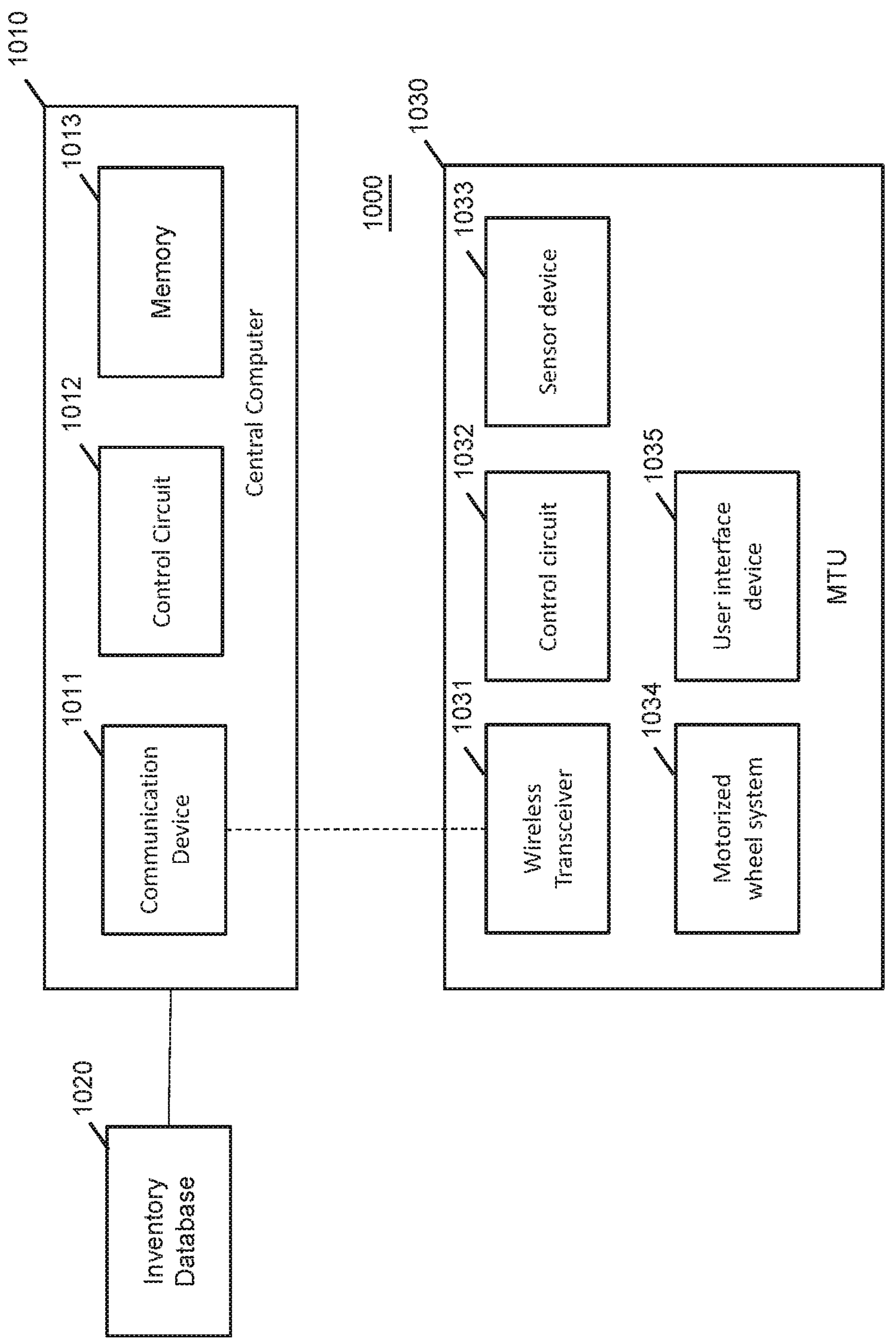
FIG. 10 comprises a block diagram of a system for determining item availability in accordance with some embodiments.

FIG. 10 illustrates a block diagram of a system 1000 for determining item availability as configured in accordance with various embodiments of these teachings. The system 1000 includes a central computer system 1010, an inventory database 1020, and an MTU 1030. The system is configured to determine whether an item is out of stock according to the inventory database 1020 and determine whether an item is available for purchase on the shopping floor based on information gathered by the MTU 1030. In some embodiments, the system is further configured to provide an "item out of stock" and/or an item unavailable response to a customer via the MTU 1030 and/or a user device. The system 1000 may include or may be implemented at least partially with one or more components shown in FIGS. 1, 4, and 5 or may be more generically implemented outside of the system described with reference to FIGS. 1, 4 and 5.

The central computer system 1010 includes a control circuit 1012, a memory 1013, and a communication device 1011. The central computer system 1010 may generally be referred to as one or more of a processor-based device, a computing device, a server, and the like. In some embodiments, the central computer system 1010 may be implemented with one or more of the central computer system 106 and/or the computer device 500 described above. For example, the functionalities of the central computer system 1010 described herein may be implemented as one or more software and/or hardware modules in the central computer system 106.

The central computer system 1010 has stored on its memory 1013, a set of computer readable instructions that is executable by the control circuit 1012 to cause the control circuit 1012 to determine whether an item is in stock based on the inventory database 1020 and determine whether an item is available for purchase based on information collected by the MTU 1030. The memory 1013 may comprise volatile and/or non-volatile computer readable memory storage device. The central computer system 1010 may receive sensor data from the MTU 1030 via the communication device 1011 and/or may provide instructions to perform one or more tasks to the MTU 1030 via the communication device 1011. The central computer system 1010 may also be configured to receive a request for one or more items for purchase via the communication device 1011. Embodiments of the functions of the central computer system 1010 in a system for restoring store condition is described in more detail herein with reference to FIGS. 11-12 below.

The MTU 1030 may be the MTU 102 described in FIG. 1, the MTU shown in FIGS. 2A-3B, and/or the MTU described in FIG. 4. Generally, an MTU may be a motorized device having a control circuit 1032, a wireless transceiver 1031, a sensor device 1033, a motorized wheel system 1034, and a user interface device 1035. The MTU 102 may generally be configured to travel in a shopping space and perform one or more tasks according to instructions received from a central computer system 1010.

The control circuit 1032 of the MTU 1030 may be configured to receive an item request from a customer via the user interface device 1035. The MTU 1030 may forward the item request to the central computer system 1010 via the wireless transceiver 1031 to determine whether the item is in-stock based on the inventory database. In some embodiments, an item request may be received directly by the central computer system via a user interface device separate from the MTU 1030. For example, a customer may enter an item request via a portable user device and/or an in-store kiosk. The control circuit 1032 may also be configured to receive an item display location from the central computer system 1010 via the wireless transceiver 1031, cause the motorized wheel system 1034 to travel to the display area of the requested item, and use the sensor device 1033 to detect whether the item is available in the display space based on instructions received from the central computer system 1010. In some embodiments, the control circuit 1012 may be further configured to provide an "item out of stock" and/or an item unavailable response to the customer via the user interface device 1035 based on instructions received from the central computer system 1010.

The wireless transceiver 1031 may be any wireless communication transceiver such as Wi-Fi transceiver, Bluetooth transceiver, a local network transceiver, and the like. The motorized wheel system 1034 may include and/or be similar to the motorized wheel system 410 described herein. The user interface device 1035 may include one or more of a display screen, a touch screen, a speaker, a voice sensor, an optical sensor, and the like. Generally, the user interface device 1035 may include any input/output device configured to provide information to and receive input from users.

The sensor device 1033 may include one or more of an image sensor, an optical machine readable code reader (e.g. barcode reader), a radio frequency identification (RFID) reader, a temperature sensor, etc. In some embodiments, the sensor device 1033 may include one or more of the sensors on MTUs 102 described with reference to FIG. 1 above. The sensor device 1033 may be configured to collect one or more of an image of the display space, a three-dimensional scan of the display space, a barcode scan, a radio frequency identification (RFID) scan, an environmental temperature of the display space, etc.

The inventory database 1020 may be a non-transitory memory storage that stores one or more inventory information of a plurality of items. The inventory database 1020 may be coupled to the central computer system 1010 through one or more of local, remote, cloud-based, wired, and wireless connections. In some embodiments, the inventory database may be at least partially implemented on one or more of the memory 1013, the database 126, the memory 110, the memory 408, and the memory 504 described herein. The inventory database may have stored upon it a plurality of item identifiers (product name, product type, barcode, RFID tag, etc.) and an estimated quantity of each item in the store inventory. For example, an inventory entry may be created when a new item is added to the store, and the inventory count may be incremented when a shipment is received and decremented when items are sold or lost.

Figure 11:
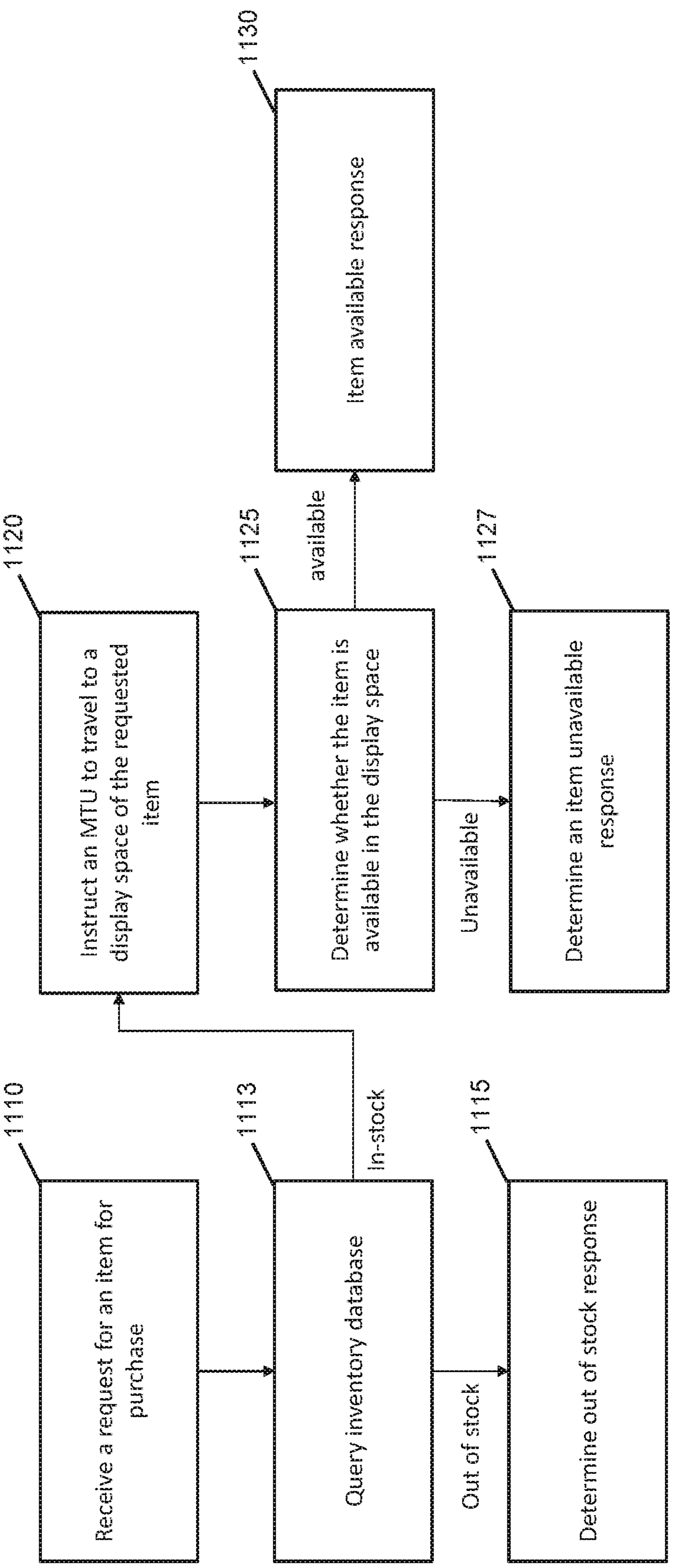
FIG. 11 comprises a flow diagram of a method for determining item availability in accordance with some embodiments.

FIG. 11 shows a flow diagram of a method for determining item availability in a shopping space in accordance with various embodiments of these teachings. The steps shown in FIG. 11 may be performed by one or more of the central computer system 1010 in FIG. 10, the central computer system 106 in FIG. 1, and the computer device 500 in FIG. 5, for example. In some embodiments, at least some steps in FIG. 11 may be performed by a control circuit on an MTU and/or a user device. In some embodiments, the steps are performed by one or more processor-based device executing a set of computer readable instructions stored on memory device(s).

In step 1110, the system receives a request for an item for purchase from a customer. In some embodiments, the request for the item for purchase comprises one or more of: a verbal command issued to the motorized transport unit, a shopping list entered at a user interface device, and an item selected through the user interface device. For example, a customer may say to an MTU "where can I find some scissors?" or "do you have A-brand peanut butter?" In some embodiments, the user may enter a list of items they wish to purchase prior or during their visit to the store. The shopping list may be used by an MTU to escort the customer through the shopping space on a system determined route. The system may consider each item entered into the shopping list as a request for an item in step 1110. In some embodiments, steps 1110 and 1115 may be performed prior to determining a route for the customer. In some embodiments, steps 1120 and 1130 may be performed prior or during the customer's shopping trip. In some embodiments, the item request may be for an item type or item category (e.g. olive oil, dill pickles, etc.) and/or a specific product (e.g. A-brand canned tuna, half-gallon B-brand organic milk, etc.).

In step 1113, the system queries an inventory database to determine whether the item requested in step 710 is in stock. The inventory database may have stored upon it a plurality of item identifiers (product name, product type, barcode, RFID tag, etc.) and an estimated quantity of each item in the store inventory. The recorded quantity in the inventory database may be based on monitoring, receiving, and sales of each item. In some embodiments, if the item request in step 1110 identifies an item type or category that includes multiple unique items, the system may check the in-stock status of each item matching the type or category. For example, if the item request specifics C-brand toilet paper, the system may query the inventory for all variants of C-brand toilet paper (e.g. 2-ply, 4-ply, 12-count, 24-count, etc.).

If the requested item is out of stock according to the inventory database, in step 1115, the system determines an out of stock response to present to the customer. In some embodiments, the out of stock response may be selected from one or more of: recommending an alternative item, providing an alternative store location, and providing an online purchase user interface. For example, if 12 oz. D-brand BBQ flavored chips are out of stock, the system may recommend one or more items of different packaging (e.g. family-size), a different variant (e.g. low fat, low sodium, ranch flavored etc.) a different brand (e.g. E-brand), and/or a substitute item (e.g. corn chips). In another example, the system may query the inventory of other nearby stores and suggest an alternate store location that the customer can purchase the requested item. In yet another example, the system may determine whether the item is available for purchase online and present the user with an option to purchase the item online (e.g. send a link to the product, add the product to the user's online shopping cart). In some embodiments, the system may select from one or more of the out of stock responses based on one or more of the customer's shopping history, item type, item availability in another store, distance to the alternate store, item availability for online purchase, etc. For example, if the customer is looking for organic milk, and the store has no organic milk in stock, the system may suggest a nearby store to the customer as the out-of-stock response. In another example, if the customer had purchased various brands of the same type of product in the past, indicating no particular brand royalty, the system may suggest an alternative brand. In some embodiments, the out of stock response may be presented to the customer via one or more of an MTU or user interface unit that received the request for an item for purchase in step 1110 and/or an MTU escorting the customer.

In some embodiments, if the item request identifies an item type or category that includes multiple unique items, the out of stock response may be presented only if all items in the type or category are out of stock. In some embodiments, if one or more items in the type or category are in stock, the system may present each in-stock item as a purchase option to the customer. The selected item for purchase may be used as the requested item in step 1120.

If the requested item is in stock according to the inventory database in step 1113, in step 1120 the system instructs an MTU to travel to a display space corresponding with the requested item. The display space may include the display module, shelf, case, bin, etc. that presents the requested item for purchase by customers. In some embodiments, the system may identify the display space corresponding to the requested item based on one or more of the inventory database and a store layout map. In some embodiments, an item may be displayed at two or more locations in a shopping space. The system may select one of the display spaces based on one or more of customer location, MTU location, expected display quantity, etc. The MTU instructed in step 1120 may the MTU that received the item request and/or an MTU that has been assigned to escort the requesting customer, or a separate MTU that was on initially on stand-by or assigned to another task. The system may instruct the MTU to travel to the display space according to the MTU navigation and maneuvering means described herein including using the geolocation beacons sensor on the MTU to determine the location of the MTU within the shopping space.

In step 1125 the system determines whether the item is available in the display space based on information captured by one or more sensors of the MTU. Due to shrinkage, damage, lost, and misplacement, items that are indicated as being in-stock in the inventory database may not always be available for purchase on the sales floor. The MTU instructed in step 1120 may include one or more of an optical sensor, an image sensor, a radio frequency identification (RFID) scanner, an optical code scanner, a temperature sensor, etc. The information captured by the one or more sensors of the MTU comprises one or more of an image of the display space, a three-dimensional scan of the display space, a barcode scan, an RFID scan, and an environmental temperature of the display space. The system may determine whether the item is available in the display space is based one or more of a presence of the item, an appearance of the item, an expiration date of the item, an appearance of the display area, and a storage environment of the item. In some embodiments, the system may capture an image of the display space using an image sensor on the MTU to determine whether the item is in the display space. In some embodiments, the system may scan for RFID tags around the area of the display space to determine whether a requested item is in the display space. In some embodiments, the MTU may scan for a visible or invisible expiration date code/stamp on the requested item. Even if the item is present, the system may determine that the item is unavailable because it is past its expiration date. In some embodiments, the MTU may use a temperature sensor to measure a temperature in or around the display area. Even if the item is present, the system may determine that the item is unavailable because the storage condition is out of tolerance (e.g. storage temperature is too high for ice cream). In some embodiments, the system may analyze an image of the product in the display area to determine whether the product is damaged (e.g. contains dents or stains). If only damaged products are in the display area, the system may determine that no items are available for purchase in the display area. In some embodiments, if one or more items are detected to be expired or damaged, or the storage condition is found to be out of tolerance, the system may generate a task for an MTU and/or a store associate to remove the item(s) and/or address the issue.

If the requested item is not available in the display space in step 1125, the system may determine an item unavailable response in step 1127. In some embodiments, the item unavailable response comprises querying a back storage area for the item for purchase. If the item for purchase is available in the back storage area, the system may notify the customer and generate a task instruction for an MTU and/or a store associate to retrieve the item from the back storage area. In some embodiments, the item unavailable response comprises determining whether the item for purchase is displayed in an alternative display space. If the item is displayed in another display area, the system may instruct the MTU to travel to the alternative display space and the process may return to step 1120. In some embodiments, the item unavailable response comprises one or more of recommending an alternative item, providing an alternative store location, and providing an online purchase user interface. In some embodiments, the item unavailable response may include the same or similar responses as the out of stock response described with reference to step 1115 herein. In some embodiments, the item unavailable response may be presented to the customer via one or more of the MTU instructed in step 1120, an MTU or user interface unit that received the request for an item for purchase in step 1110, and/or an MTU escorting the customer. In some embodiments, if the item is unavailable, the information may be relayed to the inventory system to update inventory information. In some embodiments, if the item is not available in the display space, the system may generate a restock task instruction to an MTU and/or a store associate. For example, the task may include bringing items out form the back room to place on the shelves and/or to order more items from the supplier.

If the item is available for purchase in the display space, in step 1130, the system may present an item available response to the customer. An item available response may include one or more of, altering the customer that the item is available for purchase, offering to retrieve the item for the customer, suggesting cross-sell item(s), and offering checkout options. In some embodiments, the item available response may be to return to step 1110 with the next item on the customer's shopping list as the requested item.

Figure 12:
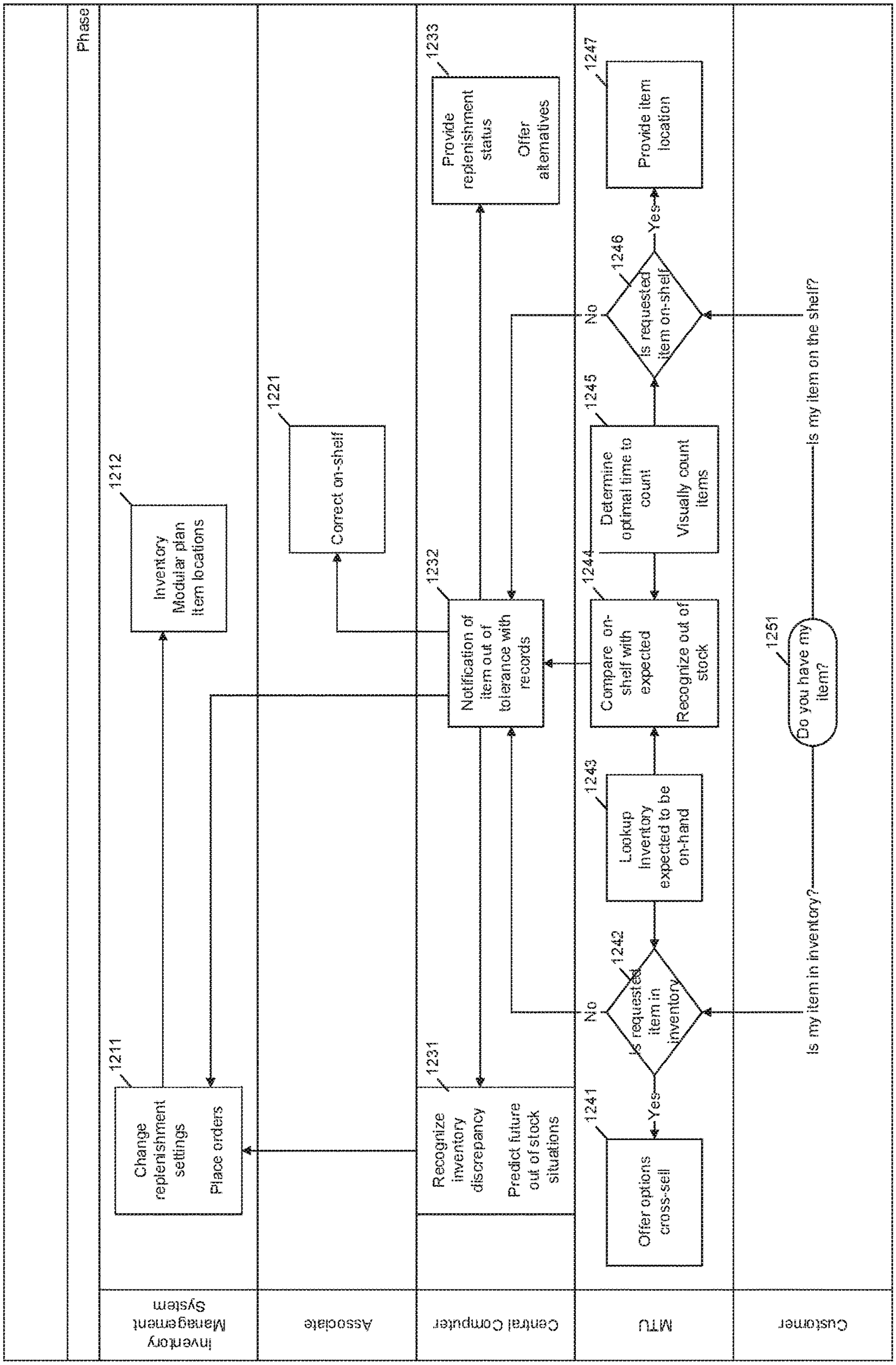
FIG. 12 comprises a flow diagram of a process for determining item availability in accordance with some embodiments.

FIG. 12 is an illustration of a process for monitoring for modular compliance with MTUs. In some embodiments, the steps in FIG. 12 may be implemented by one or more components of the systems shown in FIG. 1 and FIG. 10. In some embodiments, the central computer and the MTU in FIG. 12 share "intelligence" in that they are in constant communication and data sharing. Therefore, one or more steps described to be performed by the MTU may be performed by the central computer and vice versa.

In step 1251, the customer makes a request for an item by asking the system "do you have my item?" via one or more of an MTU, a user interface device, a portable user device, and a store associate. In step 1242, the MTU checks whether the requested item is in stock based on the inventory. The MTU may determine whether the requested item is in the inventory by looking up inventory that is expected to be on-hand in step 1243. If the item is in stock, in step 1241, the MTU may further offer cross-sell options, such as recommending alternate and/or complementary items. In step 1246, the MTU determines whether the requested item is on the shelf in the shopping space. The determination in step 1246 may be based on visually counting items in step 1245. In some embodiments, the MTU also determines an optimal time to count items in step 1245. The optimal time may correspond to a time that the stock is likely to be low such as, for example, right after a selling rush. If the item is available on the shelf, the MTU provides item location to the customer in step 1247.

In step 1244, the MTU system compares on-shelf availability with the expected availability of the item and determines whether the item is actually out of stock. The information determined in steps 1242, 1246, and 1244 may be used to determine whether the item availability is out of tolerance with the inventor records by the central computer in step 1232. For example, whether the on-shelf availability matches the inventory record. In step 1231, the central computer recognizes inventory discrepancy based on the out of tolerance situation identified in step 1232. The inventory discrepancy information may also be used to predict future out of stock situations in step 1231. For example, a percentage of likely shrink or lost may be determined for the product and applied to further inventory calculations. In step 1211, the inventory management system uses the information determined in steps 1231 and 1232 to change replenishment settings and place orders for items accordingly. The inventory management system may further modify inventory modular plan and item locations in step 1212.

In step 1221, the notification in step 1232 may cause a task to be generated for a store associate to correct the on-shelf unavailability of the item. In step 1233, the central computer system may provide replenishment status (e.g. "a shipment of organic milk will arrive tomorrow") or offer an alternative item or purchase option to the customer.

In some embodiments, apparatuses and methods are provided herein useful for determining item availability in a shopping space. In some embodiments, a computer-implemented method for determining item availability in a shopping space comprises receiving, at a control circuit, a request for an item for purchase from a customer, querying, by the control circuit, an inventory database to determine whether the item for purchase is in stock, in an event that the item for purchase is not in stock according to the inventory database: determining, at the control circuit, an out of stock response to present to the customer; in an event that the item for purchase is in stock according to the inventory database: instructing, by the control circuit, a motorized transport unit to travel to a display space in the shopping space corresponding to the item for the purchase; determining, at the control circuit, whether the item is available in the display space based on information captured by one or more sensors of the motorized transport unit; and in an event that the item for purchase is not available in the display space: determining, at the control circuit, an item unavailable response to present to the customer.

In some embodiments, the request for the item for purchase comprises one or more of: a verbal command issued to the motorized transport unit, a shopping list entered at a user interface device, and an item selected through the user interface device. In some embodiments, the out of stock response comprises one or more of: recommending an alternative item, providing an alternative store location, and providing an online purchase user interface. In some embodiments, the information captured by the one or more sensors of the motorized transport unit comprises one or more: an image of the display space, a three-dimensional scan of the display space, a barcode scan, a radio frequency identification (RFID) scan, and an environmental temperature of the display space. In some embodiments, the determining of whether the item is available in the display space is based one or more of: a presence of the item, an appearance of the item, an expiration date of the item, an appearance of the display space, and a storage environment of the item. In some embodiments, the item unavailable response comprises querying a back storage area for the item for purchase. In some embodiments, in an event that the item for purchase is available in the back storage area, generating, at the control circuit, a task instruction to retrieve the item from the back storage area. In some embodiments, the item unavailable response comprises determining, at the control circuit, whether the item for purchase is displayed in an alternative display space and instructing the motorized transport unit to travel to the alternative display space. In some embodiments, the item unavailable response comprises one or more of recommending an alternative item, providing an alternative store location, and providing an online purchase user interface. In some embodiments, in the event that the item is not available in the display space, generating a restock task instruction.

In some embodiments, a system for determining item availability in a shopping space comprise: a communication device configured to communicate with a motorized transport unit, an inventory database storing inventory information of a plurality of items available for purchase in the shopping space, and a control circuit coupled to the communication device and the inventory database. The control circuit being configured to: receive a request for an item for purchase from a customer, query the inventory database to determine whether the item for purchase is in stock, in an event that the item for purchase is not in stock according to the inventory database: determine an out of stock response to present to the customer, in an event that the item for purchase is in stock according to the inventory database: instruct the motorized transport unit to travel to a display space in the shopping space corresponding to the item, determine whether the item is available in the display space based on information captured by one or more sensors of the motorized transport unit, and in an event that the item is not available in the display space: determine an item unavailable response to present to the customer.

In some embodiments, the request for the item for purchase comprises one or more of: a verbal command issued to the motorized transport unit, a shopping list entered at a user interface device, and an item selected through the user interface device. In some embodiments, the out of stock response comprises one or more of: recommending an alternative item, providing an alternative store location, and providing an online purchase user interface. In some embodiments, the information captured by the one or more sensors of the motorized transport unit comprises one or more: an image of the display space, a three dimensional scan of the display space, a barcode scan, a radio frequency identification (RFID) scan, an appearance of the item for purchase, and an environmental temperature of the display space. In some embodiments, the item is available in the display space is determined based one or more of: a presence of the item, an appearance of the item, an expiration date of the item, an appearance of the display space, and a storage environment of the item. In some embodiments, the item unavailable response comprises: querying a back storage area for the item for purchase. In some embodiments, in an event that the item for purchase is available in the back storage area, the control circuit further generates a task instruction to retrieve the item from the back storage area. In some embodiments, the item unavailable response comprises: determining whether the item for purchase is displayed in an alternative display space and instructing the motorized transport unit to travel to the alternative display space. In some embodiments, the item unavailable response comprises: one or more of recommending an alternative item, providing an alternative store location, and providing an online purchase user interface. In some embodiments, in the event that the item is not available in the display space, the control circuit further generates a restock task instruction.

In some embodiments, an apparatus for determining item availability in a shopping space comprises: a wireless transceiver configured to communicate with a central computer system, a motorized wheel system, a user interface device, a sensor, a control circuit coupled to the wireless transceiver, the motorized wheel system, the user interface unit, and the sensor. The control circuit being configured to: receive a request for an item for purchase from a customer via the user interface device, forward the request for the item to the central computer system, in an event that the item for purchase is not in stock according to an inventory database coupled to the central computer system: present an out of stock response from the central computer system to the customer via the user interface device, in an event that the item for purchase is in stock according to the inventory database: travel to a display space in the shopping space corresponding to the item in the shopping space using the motorized wheel system, collect information relating whether the item is available in the display space using the sensor, transmit the data to the central computer system, and present an item unavailable response to the customer via the user interface device in an event that the item is not available in the display space: travel to a display space in the shopping space corresponding to the item in the shopping space using the motorized wheel system, collect information relating whether the item is available in the display space using the sensor, transmit the information to the central computer system, and present an item unavailable response to the customer via the user interface device in an event that the item is not available in the display space.

In accordance with some embodiments, systems, apparatuses, processes and methods are provided herein that allow the motorized transport units to travel through the shopping facility while limiting congestion, in reduced time, while limiting potential conflicts and/or contact with customer, and other such advantage by providing alternate travel routes that are typically not available to at least customers.

Some embodiments provide an elevated track system that provides alternate tracks on and/or through which the motorized transport units can travel. The elevated track system can include tracks that are positioned such that the tracks do not interfere with movement of customers through the sales floor. In some implementations, some or all of the tracks of the track system can include tracks that are positioned elevated above a sales floor, and typically above shelves, modulars, racks and products distributed over at least a portion of the sales floor of a shopping facility. Additionally or alternatively, the track system may include one or more tracks that are below typical flooring (such as the sales floor), routed through sub-levels below a sales floor (e.g., basements, parking structures, etc.), inside structures (e.g., walls, shelving, between shelves, and the like), and/or other areas or space of the shopping facility, such as space that is typically not used or underutilized.

Figure 13:
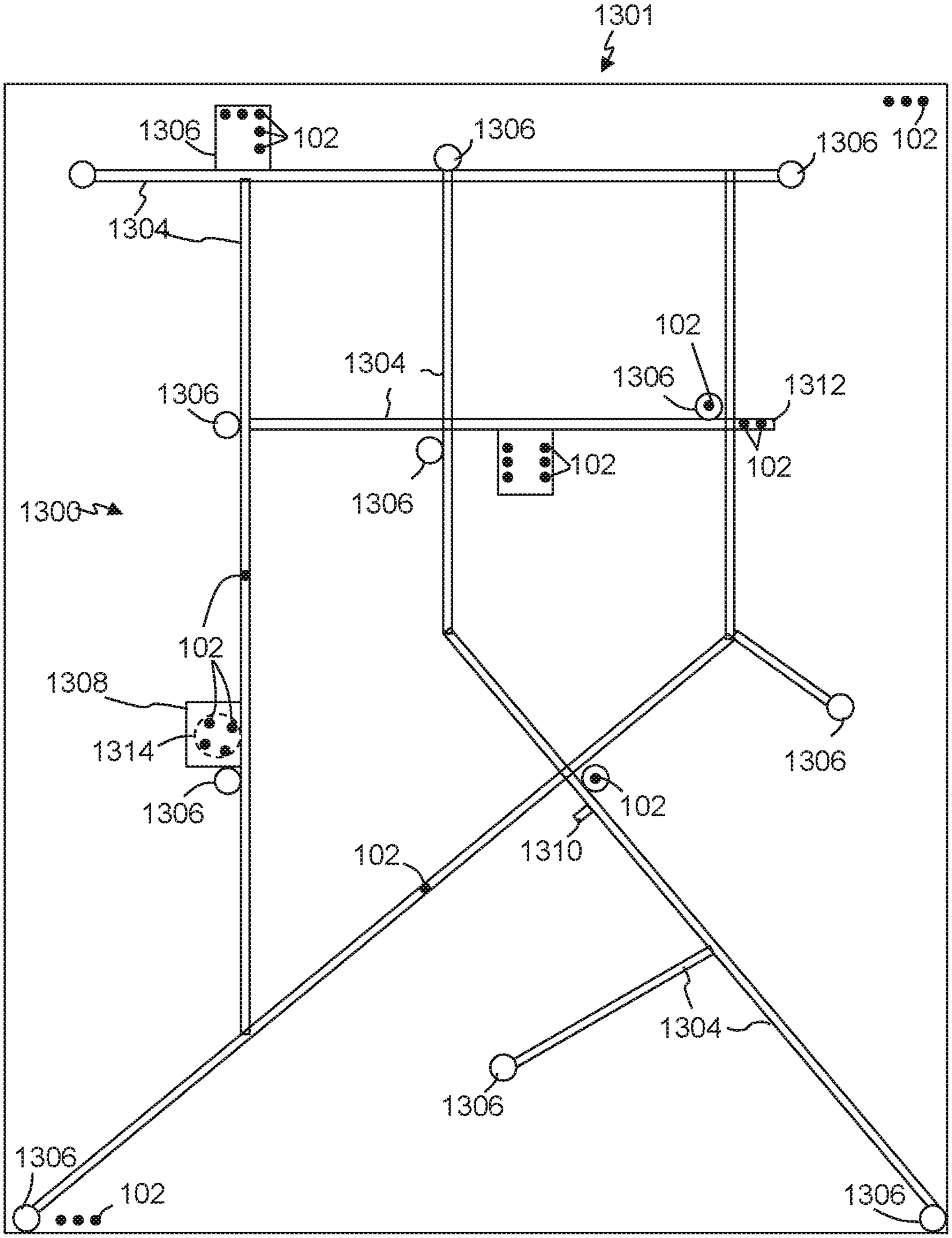
FIG. 13 shows a simplified overhead view of an exemplary elevated track system within a shopping facility, in accordance with some embodiments.

FIG. 13 shows a simplified overhead view of an exemplary elevated track system 1300 within a shopping facility 1301, in accordance with some embodiments. The elevated track system includes one or more tracks 1304, routes, avenues, tubes, ducts, and other such structures (and typically a series of track) that traverse across areas of the shopping facility, and one or more chutes 1306, ramps, hoists, elevators, and/or other such access nodes, which are typically distributed across the shopping facility. In some embodiments, one or more of the tracks 1304 are elevated above the shelves and other product support structures of the shopping facility. Further, one or more of the tracks may be above a drop down ceiling such that those one or more tracks are not visible from the floor. One or more tracks can be interconnected to establish a network of tracks that can be accessed by multiple motorized transport units allowing the motorized transport units to quickly and easily traverse areas of the shopping facility.

Figure 14:
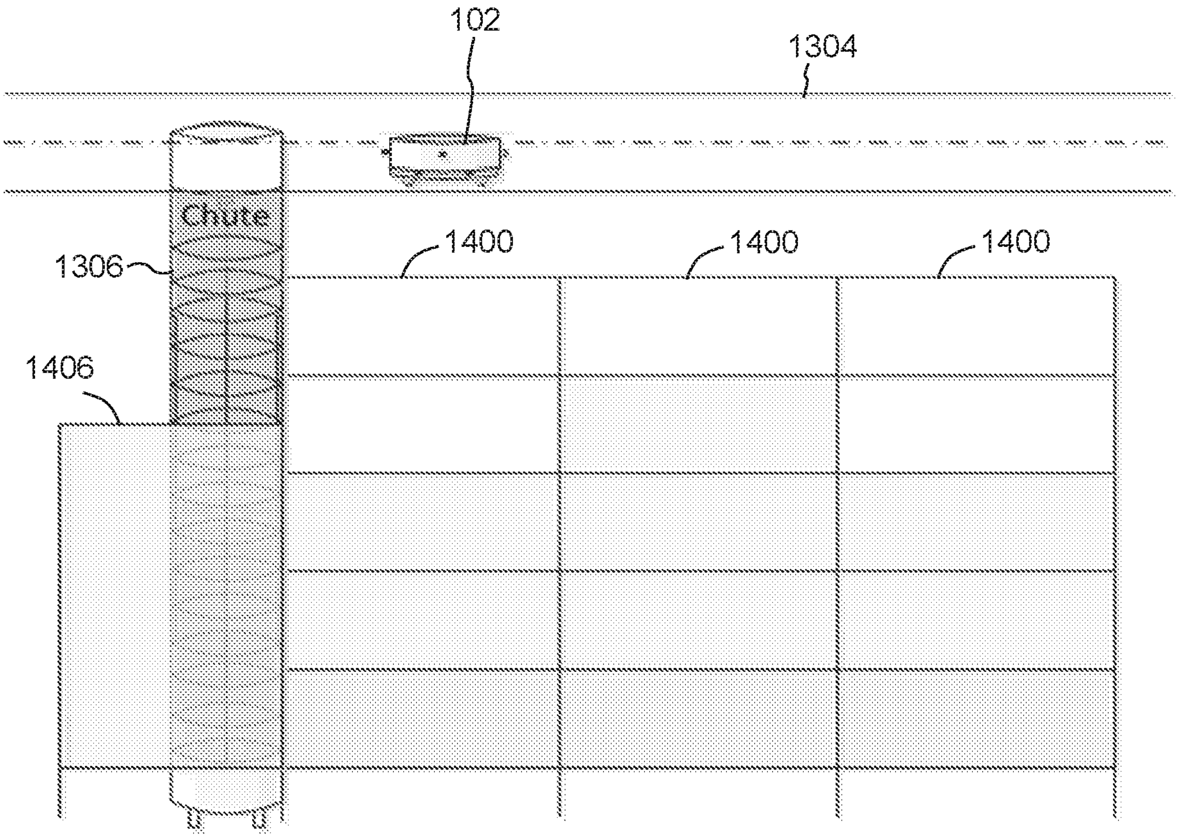
FIG. 14 illustrates some embodiments of an exemplary elevated track of an elevated track system positioned above one or more shelving units, modulars, and other such product support units.

FIG. 14 illustrates some embodiments of an exemplary elevated track 1304 of an elevated track system positioned above one or more shelving units 1400, modulars, and other such product support units. In this example, a chute 1306 is further illustrated as being cooperated with the elevated track 1304 and extending between the elevated track and the sales floor. Referring to at least FIGS. 13 and 14, the central computer system can take advantage of the elevated track system to move motorized transport units through the shopping facility to areas where one or more tasks are to be performed.

The chutes 1306 allow the motorized transport units to access and exit the elevated track system 1300. As such, the one or more chutes can be strategically positioned throughout the shopping facility to allow the motorized transport units to easily and quickly access the elevated track system. The positioning of the chutes can further reduce the distance motorized transport units have to travel through the shopping facility to gain access to the elevated track system, which in part reduces traffic in the shopping facility and can improve deployment of the motorized transport units. In some instances, one or more chutes are positioned proximate areas where it is anticipated a relatively large number of motorized transport unit tasks are expected and/or where motorized transport units are to be direct (e.g., near a shopping cart bay where customer retrieve carts, near docking stations, near equipment with which the motorized transport units are configured to cooperate in performing one or more tasks, and other such areas). The chutes are each cooperated with one or more of the tracks and configured to provide a passage for one or more of the motorized transport units between the series of elevated tracks and the floor.

As illustrated in FIG. 14, in some embodiments, a chute 1306 may be positioned at least partially within a shelving unit, end cap 1406 (illustrated as partially transparent), or other structure. This allows the chute to be positioned in areas of the shopping facility and taking advantage of the area that is already occupied by the end cap or shelving structure. This can further limit the use of floor space for the chute that can be utilized for other purposes. Similarly, one or more chutes may be located in areas that are not readily usable, such as in corners or other such areas. In some embodiments, the chutes and the cooperated shelving structure and/or end cap 1406 can allow a motorized transport unit to travel under the end cap or shelving unit, through a door in the end cap or shelving unit, and/or allow the motorized transport unit to access and exit the chute. In other implementations, the chutes are not enclosed in a structure allowing motorized transport units ready access to the chutes. Some implementations include doors or other barriers that open in response to a motorized transport unit request and/or instructions from the central computer system. The door prevents children or others from playing with the chutes or otherwise interfering with the use of the chutes.

The chutes can be substantially any relevant structure that can allow the motorized transport units to move between the floor and the elevated track system. In some implementations, one or more chutes are configured such that the motorized transport units move themselves up and down the chutes. For example, one or more channels or tracks can be included one or more and typically at least two channels formed therein to receive corresponding parts of each motorized transport unit that passes through the at least one chute. For example, in some embodiments, the motorized transport units include one or more guide members 208, pegs, hooks, latches, etc., that can cooperate with channels of a chute. By extending and retracting the motorized transport units can move themselves up and down the chutes. Such movement is further described in U.S. Provisional Application No. 132/175,182, filed Jun. 12, 2015, entitled Method and Apparatus for Transporting a Plurality of Stacked Motorized Transport Units, which is incorporated herein by reference in its entirety. Chutes can be configured in a vertical orientation, angled, helical, switch-back, or other configurations. Similarly, chutes can include ramps that allow the motorized transport units to drive themselves up and down. The chutes may have a circular cross-section, a square cross-section or other shape. Chutes, in some embodiments, may include compressed air cushioning, or other cushioning. The cushioning may allow motorized transport units to travel down the chutes at faster rates than they travel up.

In some embodiments, one or more chutes may additionally or alternatively include one or more lift systems that move the motorized transport units between the elevated track system and the floor, or help the motorized transport units in moving between the track system and the floor. For example, a chute can include an elevator or dumbwaiter system, a cable system that is cooperated with a motor, one or more conveyors (e.g., that move along a vertical wall and with which the guide members engage), and other such lift systems. For example, the cable system, in some implementations, can include one or more latches, hooks, magnets, other such coupling structure, or a combination of two or more of such structures. When activated the cable system (or other lift system) can raise or lower the motorized transport unit. The lift system can be controlled by the central computers system and/or activated by the motorized transport unit once in position (e.g., by extending to press a switch, lever, etc.).

One or more transfer systems may be included with the chute and/or cooperated with the chutes to help move the motorized transport unit between the chute and the track. For example, a platform may be moved under the motorized transport unit upon reaching a top of the chute allowing the motorized transport unit to move out of the chute, and similarly be activated when the motorized transport unit attempts to use the chute to exit the elevated track system. An arm may be configured to swing to engage the motorized transport unit and move the motorized transport unit between the track and the chute. A false or movable floor may be cooperated with the chute that is activated when the motorized transport unit is moving between the chute and the track. In other implementations, the motorized transport unit may cooperate with a channel or other structure that allows the motorized transport unit to slide out of the chute. Other systems may be used to move the motorized transport unit between the chute and the track system. The transfer system may be activated by the motorized transport unit (e.g., upon approaching the chute when exiting the track system, pushing a button or moving a lever upon reaching or approaching the top of a chute, etc.), activated by the chute (e.g., based on timing), or may be activated by the central computer system (e.g., based on tracking a location of the motorized transport unit, receiving a communication from an motorized transport unit requesting transfer, etc.).

The tracks 1304 are configured to allow the motorized transport units to travel along the tracks at desired speeds, and often at maximum speed because there is no concern of interfering with customers or bumping into carts or other devices on the floor. Further, in some implementations, the central computer system tracks the motorized transport units and can avoid collisions between motorized transport units. In some embodiments, one or more tracks or portions of one or more tracks may be configured to allow a first motorized transport unit traveling on the elevated track to pass a second motorized transport unit traveling on the same elevated track. In some implementations, the track has sufficient width or a portion of a track may have sufficient width to provide effectively two or more lanes, which can be used for opposite directions allowing motorized transport units to pass each other going opposite directs, and/or allow a faster motorized transport unit to pass a slower motorized transport unit traveling in the same direction. One or more track can alternatively or additionally be configured with at least a section that has one or more levels allowing motorized transport units to pass each other (whether traveling in opposite or the same direction). One or more ramps may cooperate different tracks and/or different levels of a track.

The track system may further include diverter sections, merge areas (e.g., roundabouts, intersections, etc.), multiple lanes (e.g., in high traffic areas), and the like. Multiple lane sections may reduce to a single lane for relatively low traffic areas, areas of limited space, etc. Further, the track system and individual tracks can have inclines, declines and the like (e.g., when there are areas where there is no drop ceiling). One or more of the tracks and/or portions of one or more tracks may be suspended from a roof, support beams, joists, and/or other such structure. Additionally or alternatively, one or more tracks and/or portions of one or more tracks may be supported by beams, joists and/or other such structures. Some embodiments may additionally include tracks and/or chutes that lead to outside areas of the shopping facility (e.g., loading areas, parking structure, parking lots, etc.).

The tracks may be made from substantially any relevant materials that can support the weight of the motorized transport units intended to utilize the elevated track system. In some implementations, one or more tracks and/or portions of tracks may further include conveyors that move the motorized transport units over those portions of the tracks. In some embodiments, portions of the track system include vibration and/or noise dampening components (e.g., rubber washers, cushioning, rubber on the tracks, insulation dampening, and the like). Further, wind disturbance based on movement of motorized transport units may be taken into consideration (e.g., with wind guards, tunnels, etc.). In some implementations, one or more tracks can include gutters or other dirt catches to prevent dirt build-up and/or dirt from dropping down from the tracks. Further, one or more vacuum systems or other cleaning systems may cooperate with and be driven by one or more motorized transport units to clean the tracks and other parts of the track system. Additionally, some implementations include additional safety features to limit or prevent things falling from the track system (e.g., netting, tarps and the like under tracks that extend across areas people are walking.

One or more sensors, cameras, monitoring equipment, and the like can be cooperated with the elevated track system that can provide the central computer system with information about the elevated track system and the motorized transport units on and traveling along the track system. Such sensors can include distance sensors, RFID sensors, light sources of the location detection system 116, and/or other such sensors. The sensor information is provided to the central computer system to allow the central computer system to track motorized transport units, track the operation of the track system, detect potential problems and the like. Further, the motorized transport units can communicate sensor data detected by sensors of the motorized transport units can be communicated from the motorized transport units to the central computer system providing the central computer system with more information about the state of operation of one or more motorized transport units and the track system.

Figure 15:
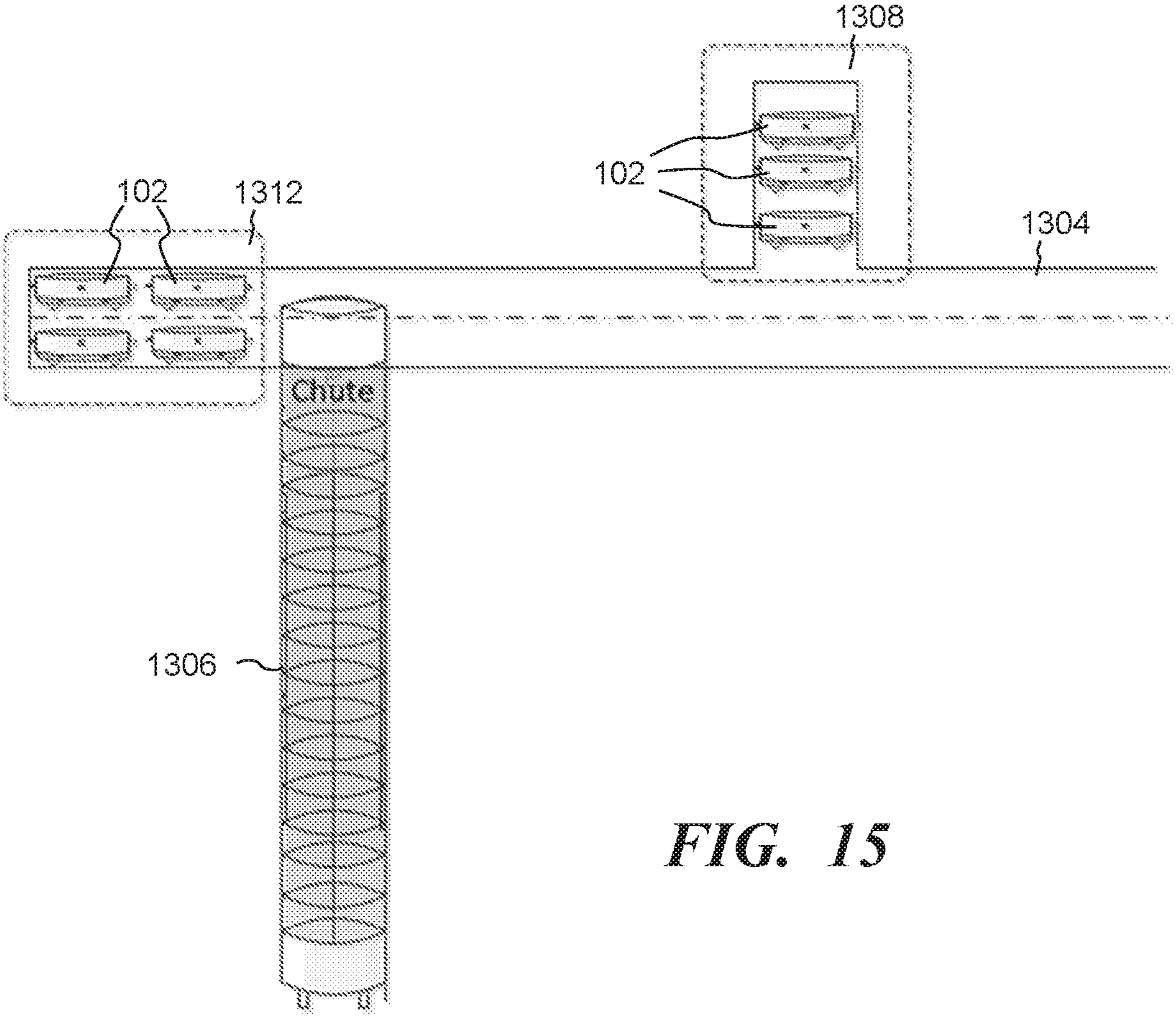
FIG. 15 illustrates some embodiments of a portion of an exemplary elevated track of an elevated track system that include one or more staging areas.

FIG. 15 illustrates some embodiments of a portion of an exemplary elevated track 1304 of an elevated track system 1300 that include one or more staging areas 1308. Referring to at least FIGS. 13 and 15, in some embodiments, the track system 1300 may be configured to maintain motorized transport units on the track system while motorized transport units are idle and awaiting to be directed to perform a task by the central control system. As such, in some configurations of the elevated track system includes one or more staging areas 1308, which can include T-junctions 1310, extensions 1312, launch pads, other such areas, or a combination of two or more of such areas. The staging areas 1308 cooperate with and extend from one or more tracks, and are configured to receive one or more motorized transport units 102 that are idle and/or awaiting instructions from the central computer system. The central computer system can direct the motorized transport unit to move into the staging area. Again, the staging areas allow the one or more motorized transport units to be maintained in the elevated track system without interfering with one or more other motorized transport units as they travel along the series of elevated tracks. The motorized transport units are directed by the central computer system to move from the track to the staging area so that the tracks are freed up to allow other motorized transport units to travel along the tracks. Similarly, in some embodiments, one or more motorized transport units may be positioned or staged within a chute 1306, such as on the shopping floor and in the chute as an additional staging area while the motorized transport unit is idle. This allows the motorized transport unit to be out of the way until deployed to perform or assist with a task. The motorized transport unit can be moved out from the chute when another motorized transport unit needs to use the chute.

The staging areas can be positioned at substantially any location within the elevated track system. Often the staging areas are strategically positioned in areas where relatively large numbers of motorized transport unit tasks are expected, near chutes, or other such locations. In some embodiments, one or more of the elevated staging areas can include one or more charging stations each configured to electrically couple with any one of the multiple motorized transport units and charge a rechargeable battery of the coupled motorized transport unit.

The use of the staging areas may be controlled by the central computer system based on a first-in-first-out schedule, based on capabilities of the motorized transport units in the staging area and one or more tasks to be performed, based on stored power levels of the motorized transport units, other such factors, or a combination of two or more of such factors. A staging area, in some implementations, may include a conveyor, rotating platform 1314, or other such mechanism for moving the motorized transport units through the staging area. When charging stations are incorporated with such staging areas, the charging stations and/or electrical coupling to the charging station may travel with the conveyor, rotating table, or the like.

In some implementations, a staging area may be configured to allow motorized transport units to move itself into the staging area. Additionally or alternatively, the staging area may vertically stack two or more motorized transport units. For example, a staging area may be configured similarly to a dispensing unit as described in U.S. Provisional Application No. 132/175,182, which is incorporated herein by reference in its entirety.

Again, the central computer controls the movements of the motorized transport units, including directing the motorized transport units to enter or leave the elevated track system, as well as routing the motorized transport units through the elevated track system. In some embodiments, the central computer system communicates routing instructions to the multiple motorized transport units directing the one or more motorized transport units along one or more tracks of the series of elevated tracks in moving to respective desired destinations within the shopping facility. Further, the central computer system typically tracks locations of each of the multiple motorized transport units, and cooperatively coordinates the movements of the multiple motorized transport units as they travel along the series of elevated tracks, chutes, and the sales floor. In controlling movement of one or more motorized transport units, the central computer system, in some instances, identifies a location where a motorized transport unit is desired to perform a task, and identifies a relevant motorized transport unit, of the multiple motorized transport units, intended to be directed to the identified location to perform the task. Based on a location of the identified motorized transport unit and the location of the task, the central computer system can determine routing instructions that include directions along one or more of the elevated tracks of the series of elevated tracks that the motorized transport unit is to follow in moving to the identified location of the task. The routing instructions can then be communicated to the motorized transport unit to cause the motorized transport unit to implement the instructions in moving itself along the elevated track system and shopping facility to reach the task location. Again, by utilizing the track system, the motorized transport unit typically can move through the shopping facility quicker (including being parked in a staging area that may be proximate the task location), while reducing traffic on the sales floor.

The track system provides a system to in part support customer service at a shopping facility. The central computer system can identify locations where motorized transport units are desired to perform respective tasks, and identify one or more motorized transport units that can be directed to the one or more identified locations to perform the tasks. Based on the location of a motorized transport unit and the location where the task is to be initiated, the central computer system can further determine routing instructions that include directions along one or more tracks of the series of elevated tracks distributed over at least a portion of the sales floor of the shopping facility such that the tracks do not interfere with customers movement through the sales floor. The central computers system can cause the routing instructions to be communicated to the one or more motorized transport units. In implementing the routing instructions, the motorized transport unit may travel over at least a portion of one or more tracks in moving to the identified location of the task.

Figure 16:
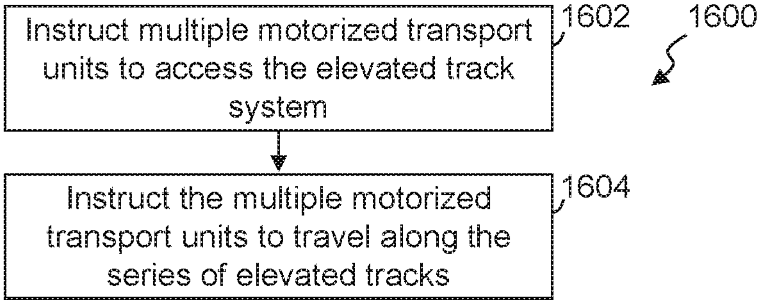
FIG. 16 illustrates a simplified flow diagram of an exemplary process of routing motorized transport units through a shopping facility, in accordance with some embodiments.

FIG. 16 illustrates a simplified flow diagram of an exemplary process 1600 of routing motorized transport units through a shopping facility, which can include utilizing the elevated track system 1300 when relevant, in accordance with some embodiments. In step 1602, the central computer system instructs multiple motorized transport units to access the elevated track system 1300. In some embodiments, the instructions to the multiple motorized transport units can include instructing the multiple motorized transport units to access at least one of one or more chutes that are each cooperated with one of the elevated tracks. Again, each of the one or more chutes provides a passage for one or more of the motorized transport units between the series of elevated tracks and the sales floor. As described above, in some embodiments, one or more chutes may be vertical chutes, while in other implementations one or more chutes may be angled (e.g., including one or more ramps, which may include a spiral configuration, switch backs, be a straight ramp, or other configuration). Further, in some embodiments one of the one or more chutes are vertical chutes with at least two channels formed therein to receive a corresponding part of each motorized transport unit that passes through the at least one chute.

In step 1604, further instructions are issued directing the multiple motorized transport units to travel along the series of elevated tracks in traversing at least portions of the shopping facility. In some instances, the instruction to the multiple motorized transport units to travel along the series of elevated tracks may cause two or more motorized transport units to pass each other on a single track. Accordingly, the routing instructions may include instructing at least a first and second motorized transport units to travel along at least a first elevated track having a width such that the first motorized transport unit traveling on the first elevated track passes the second motorized transport unit traveling on the first elevated track.

In some instances, the central computer system may issue instructions to one or more of the multiple motorized transport units to enter and/or exit one or more staging areas of the elevated track system that extends from a track of the series of elevated tracks. Again, the staging areas are configured to receive one or more motorized transport units that are idle and awaiting instructions from the central computer system and allow the one or more motorized transport units to be maintained in the elevated track system without interfering with one or more other motorized transport units as they travel along at least the one track of the series of elevated tracks. One or more of the motorized transport units may further be instructed to electrically couple with a charging station cooperated with a staging area and configured to electrically couple with any one of the multiple motorized transport units and charge a rechargeable battery of the coupled motorized transport unit.

The central computer system can take advantage of the elevated track system and communicate routing instructions to the multiple motorized transport units directing one or more motorized transport units along one or more tracks of the series of elevated tracks in moving to respective desired destinations within the shopping facility. The locations of each of the multiple motorized transport units can be tracked by the central computer system. Using the location information, the central computer system can further cooperatively coordinate the movements of the multiple motorized transport units as they travel along the series of elevated tracks and the sales floor. Further, the central computer system can identify a location where a motorized transport unit is desired to perform a task. A first motorized transport unit, of the multiple motorized transport units, can be identified that is intended to be directed to the identified location to perform the task. Routing instructions can be determined by the central computer system that include directions along one or more elevated tracks of the series of elevated tracks that the first motorized transport unit is to follow in moving to the identified location of the task. These routing instructions can then be communicated to the first motorized transport unit to cause the first motorized transport unit to implement the instructions and move along at least a portion of the elevated track system to reach the task location.

The dispatching of one or more motorized transport units may be delayed causing them to be ineffective and inefficient due to distances to be traveled, human traffic within a shopping facility, the speed of travel through a shopping facility, and other such conditions. Similarly, the stocking of shelves with pallets and other objects placed in potential routes of travel through a sales floor may also present a blocked aisle causing an inefficient route to be used to complete an activity. The track system, however, can include one or more tracks, which may be positioned overhead, with one or more chutes cooperated with the tracks to enable motorized transport units to quickly move from one part of a shopping facility to the other. The chutes can extend from a track (and often through a ceiling) to the floor. In some implementations the chute is configured such that a bottom of the chute is a few inches above the top of a motorized transport unit and/or include an opening, door or the like through which the motorized transport unit can exit. The motorized transport unit can enter the track system from a chute. When rising up the chute, in some instances, the motorized transport unit uses a twisting and lock hydraulics to climb through the chute (e.g., using one or more channels). The tracks can run, in some instances, in the rafters of the facility. The track system can include one or more dispensing bays and/or staging areas at the front and/or back of the shopping facility, or anywhere as needed and where space is available. Staging areas can also be included at ground level, such as proximate one or more chutes in a back storage area of the shopping facility.

The track system allows motorized transport units to quickly be transported without interfering with customers. As the shopping facility may need multiple places to quickly deploy a motorized transport unit, chutes may be placed anywhere in the shopping facility. One or more tracks may be configured and positioned to allow the motorized transport units to travel in either direction at the same time. Further, multiple chutes can be positioned adjacent to each other and/or a single chute can be configured with multiple passages to allow one motorized transport unit to go up as one motorized transport unit goes down.

The track system, in part, provides speedway type tracks that assist with motorized transport units moving quickly from one part of a shopping facility to another. It further enables quick response times of motorized transport units to and from customer requests and other tasks. For example, when one or more motorized transport units are needed to collect or clean up movable item containers (e.g., at a front of the shopping facility and/or in a parking lot), and the motorized transport units are located in the backroom, the motorized transport units can be directed to use the track system to quickly get to the front of the shopping facility to perform this task. The tracking system enables motorized transport units to move around the shopping facility effectively without hindering traffic on the sales floor. Along with this the track system also improves estimated time of arrivals on customer assistance. This will enable customers to request motorized transport units via mobile device, help button, by asking an associate, and the like, and have the motorized transport unit at their side in a relatively short time (e.g., a matter of seconds in some instances). Further, the track system also assists with keeping the sales floor clear of multiple motorized transport units traveling to and from tasks. This can further reduce or solve a problem of overcrowding the sales floor with multiple motorized transport units. The track system can allow and/or transport motorized transport units, and/or special motorized transport units, and in some instances, equipment utilized by the motorized transport units (e.g., cleaning systems, ground treatment systems, cart retrieval motorized transport units, motorized transport units with enhanced power capabilities, etc.).

As described above, the chutes cooperate with one or more tracks and allow motorized transport units to move between the ground and the track system. Chutes may be embedded alongside or within other sales floor components such as select displays, end cap units, racks, shelving, and the like. Additionally or alternatively, chutes may be positioned in places that are under-utilized.

In some implementations, one or more tracks and chutes can be designed to be capable of accommodating various drone models or associated loads such as small lockers, some types of movable item containers, cleaning devices and/or systems, and other such systems. For example, one or more tracks to a lawn and garden patio area of a shopping facility can be configured to accommodate a sweeper drone. Further, some embodiments include staging areas and/or rapid deployment launch pads that are deployed throughout the track system allowing decentralized storage of available motorized transport units. This can improve three-dimensional space optimization minimizing time from request to arrival. The staging areas can, in some implementations, include one or more extended segments of track located either at an endpoint or at a strategically placed “T” junction”. One or more charging stations may further be available at these staging locations to maintain readiness.

In some embodiments, apparatuses and methods are provided herein useful to allow motorized transport units to traverse at least portions of a shopping facility. In some embodiments, a track system comprises: an elevated track system comprising a series of elevated tracks that are positioned elevated above a sales floor and products distributed over at least a portion of the sales floor of a shopping facility, and configured such that multiple motorized transport units travel along the series of elevated tracks in traversing at least portions of the shopping facility.

In some embodiments, one or more chutes each cooperated with one of the elevated tracks and configured to provide a passage for one or more of the motorized transport units between the series of elevated tracks and the sales floor. In some embodiments, at least one of the one or more chutes comprise vertical chutes with at least two channels formed therein to receive a corresponding part of each motorized transport unit that passes through the at least one chute. In some embodiments, at least a first elevated track is configured to allow a first motorized transport unit traveling on the first elevated track to pass a second motorized transport unit traveling on the first elevated track. In some embodiments, the elevated track system further comprises one or more staging areas extending from a first track of the series of elevated tracks and configured to receive one or more motorized transport units that are idle and awaiting instructions from the central computer system and allowing the one or more motorized transport units to be maintained in the elevated track system without interfering with one or more other motorized transport units as they travel along at least the first track of the series of elevated tracks. In some embodiments, at least one of the one or more elevated staging areas comprises one or more charging stations each configured to electrically couple with any one of the multiple motorized transport units and charge a rechargeable battery of the coupled motorized transport unit. In some embodiments, a central computer system of the shopping facility configured to communicate routing instructions to the multiple motorized transport units directing the one or more motorized transport units along one or more tracks of the series of elevated tracks in moving to respective desired destinations within the shopping facility. In some embodiments, the central computer system further comprises: a control circuit coupled with the transceiver; and a memory coupled to the control circuit and storing computer instructions that when executed by the control circuit cause the control circuit to perform the steps of: track locations of each of the multiple motorized transport units, and cooperatively coordinate the movements of the multiple motorized transport units as they travel along the series of elevated tracks and the sales floor. In some embodiments, the control circuit in executing the computer instructions is further configured to: identify a location where a motorized transport unit is desired to perform a task, identify a first motorized transport unit, of the multiple motorized transport units, intended to be directed to the identified location to perform the task, determine first routing instructions that include directions along one or more elevated tracks of the series of elevated tracks that the first motorized transport unit is to follow in moving to the identified location, and communicate the first routing instructions to the first motorized transport unit.

In some embodiments, a method of routing motorized transport units through a shopping facility comprises: by a central computer system: instructing multiple motorized transport units to access an elevated track system comprising a series of elevated tracks that are positioned elevated above a sales floor and products distributed over at least a portion of the sales floor of a shopping facility; and instructing the multiple motorized transport units to travel along the series of elevated tracks in traversing at least portions of the shopping facility.

In some embodiments, the instructing the multiple motorized transport units to access the elevated track system comprises instructing the multiple motorized transport units to access at least one of one or more chutes each cooperated with one of the elevated tracks, wherein each of the one or more chutes provides a passage for one or more of the motorized transport units between the series of elevated tracks and the sales floor. In some embodiments, at least one of the one or more chutes comprise vertical chutes with at least two channels formed therein to receive a corresponding part of each motorized transport unit that passes through the at least one chute. In some embodiments, wherein the instructing the multiple motorized transport units to travel along the series of elevated tracks comprises instructing at least first and second motorized transport units to travel along at least a first elevated track having a width such that the first motorized transport unit traveling on the first elevated track passes the second motorized transport unit traveling on the first elevated track. In some embodiments, the system further performs instructing one or more of the multiple motorized transport units to enter one or more staging areas of the elevated track system that extends from a first track of the series of elevated tracks, wherein the one or more staging areas are configured to receive one or more motorized transport units that are idle and awaiting instructions from the central computer system and allow the one or more motorized transport units to be maintained in the elevated track system without interfering with one or more other motorized transport units as they travel along at least the first track of the series of elevated tracks. In some embodiments, the system further performs instructing at least a first motorized transport unit to electrically couple with a first charging station wherein at least one of the one or more elevated staging areas comprises one or more charging stations each configured to electrically couple with any one of the multiple motorized transport units and charge a rechargeable battery of the coupled motorized transport unit In some embodiments, the system further performs communicating routing instructions to the multiple motorized transport units directing the one or more motorized transport units along one or more tracks of the series of elevated tracks in moving to respective desired destinations within the shopping facility. In some embodiments, the system further performs tracking locations of each of the multiple motorized transport units, and cooperatively coordinating the movements of the multiple motorized transport units as they travel along the series of elevated tracks and the sales floor. In some embodiments, the system further performs identifying a location where a motorized transport unit is desired to perform a task, identifying a first motorized transport unit, of the multiple motorized transport units, intended to be directed to the identified location to perform the task, determining first routing instructions that include directions along one or more elevated tracks of the series of elevated tracks that the first motorized transport unit is to follow in moving to the identified location, and communicating the first routing instructions to the first motorized transport unit.

In accordance with some embodiments, further details are now provided for one or more of these and other features. For example, generally speaking, pursuant to various embodiments, systems, apparatuses, processes and methods are provided herein that allow for addressing incorrectly placed items.

The central computer system 106 is configured to receive sensor data, and based on the sensor data identify over time items that are incorrectly located and/or misplaced. Further, the central computer system may categorize and/or identify the items. Based on the categorization and/or identification, the central computer system can determine how to address these items. In some instances, for example, the central computer system may communicate instructions to cause the item to be retrieved and transported to one of multiple predefined locations. Some embodiments provide systems that utilize a plurality of the motorized transport units 102. As described above, each motorized transport unit is configured to perform multiple different tasks at a retail shopping facility. The central computer system 106 is further configured take advantage of these multiple motorized transport units in other ways while the motorized transport units are performing one or more other assigned tasks. In some applications, the central computer system instructs motorized transport units to implement one or more different tasks relative to the retail shopping facility. The motorized transport units can further be instructed to capture data corresponding to conditions surrounding the motorized transport unit while performing these assigned tasks. The central computer system receives this data as input data, analyzes the input data, and detects and categorizes each item of multiple items that are determined to be incorrectly placed within the retail shopping facility according to one of multiple different predefined categories.

Again, the motorized transport units are configured to perform numerous different of tasks, such as but not limited to, moving a movable item container, implement scans of products, detect location information, delivery products, retrieve one or more products, retrieve one or more movable item containers, interface with customers, shelf facing detection, item identification, trash retrieval, other such tasks or combinations of such tasks. Further, the motorized transport units include multiple sensors 414. These sensors may include one or more of distance measurement sensors, cameras, a light sensors, optical based scanning devices, RFID code readers, weight sensor, ultrasonic sensors, temperature sensor, metal detector, three-dimensional scanners, audio sensors, motion sensors, travel distance sensors, inertial sensors, other such sensors, and typically a combination of two or more of such sensors. When active, each of the sensors can capture sensor data. The sensors can be activated by instructions from the central computer system, based on predefined code being implemented by the control circuit 406, or the like. For example, one or more cameras on a motorized transport unit can capture images (e.g., still and/or video images). The sensor data (e.g., images) can be communicated to the central computer system 106, which can store, archive and/or utilize the input data received from the motorized transport units.

In some applications, the central computer system instructs motorized transport units to each implement at least one of the multiple different tasks relative to the retail shopping facility. While the motorized transport units are performing these assigned tasks, each motorized transport unit can capture data corresponding to conditions surrounding the motorized transport unit and communicate that data to the central computer system. For example, the motorized transport unit can capture still and/or video data and communicate that data to the central computer system that can perform or cause an external system to perform image and/or video processing on some or all of the image data.

The central computer system receives the detected data as input data. Typically, this input data is received over time from the various different motorized transport units as they operate to implement the various tasks assigned over time to the different motorized transport units. Further, input data may be received, in some instances, from other sensors (e.g., shopping facility cameras, shelf sensors, etc.). The central computer system analyzes the input data that was detected and provided (e.g., by the motorized transport units while the motorized transport units perform at least one of the tasks and/or other sensors). Based on the analysis of the input data, the central computer system can, typically over time, detect multiple different items that are incorrectly placed within the retail shopping facility. Further, in some instances, the central computer system can categorize each of some or all of the detected incorrectly placed items according to one of multiple different predefined categories.

The central computer system categorizes in accordance with one of multiple different categories. Any number of predefined categorizes can be specified. For example, items may be categorized as merchandize sold by the shopping facility, customer property, a recyclable waste item, a non-recycle waste item, a hazardous or special handling waste item (e.g., battery, cleaning supply, paint, item that contains lead, other such items that may be identified based on regulatory data (e.g., EPA data), or other such items), a spill, shopping facility property (e.g., movable item container, pallet jack, pallet, etc.), or other such categories.

In some embodiments, the predefined categories are used in directing how the detected incorrectly placed items are to be addressed. For example, a motorized transport unit may be instructed to retrieve the item and take it to one of multiple different predefined locations based on how the item is categorized, a worker at the shopping facility may be alerted to retrieve an item, an item may be left where it is detected, or other such actions. In some instances, the central computer system can determine for each of the detected items, based on the categorization of the items, a location of multiple predefined different potential locations of the retail shopping facility the categorized item is to be taken. An instruction can be communicated, relative to each of the categorized items, to cause the categorized item to be taken to the determined location. The instruction may be communicated to one or more motorized transport units, of the plurality of motorized transport units, to retrieve the item and transport the item through at least a portion of the retail shopping facility to the determined location.

In some instances, the motorized transport unit may include an extendible arm or other such system that can be activated to pick up the item. In other instances, the motorized transport unit may include a scope or lift that can be slide under at least a portion of the item to pick up the item. Similarly, a motorized transport unit may include a brush or plow system that can be used to push the item. Still other motorized transport units may include other mechanisms that can be used to transport an item, and the central computer system may select a motorized transport unit based on the mechanism that the motorized transport unit includes and/or that can be cooperated with a motorized transport unit. In some implementations, the central computer system accesses and/or maintains one or more databases, indexes, arrays, spreadsheets or the like that identify each available motorized transport unit and characteristics and/or functionality that can be performed by each motorized transport unit. Referencing this index, the central computer system can select a motorized transport unit, typically in accordance with a categorization of the detected item and/or an intended location where the item is to be taken.

The motorized transport unit may be activated, and/or be instructed by the central computer system to activate, one or more sensors based on a detection of an item to obtain additional data that can be used to categorize and/or identify the item. Similarly, the motorized transport unit and/or the central computer system may instruct the motorized transport unit to move to a different orientation and/or move around the item in attempts to accurately categorize and/or identify the item. In some instances, the central computer system may detect an item is incorrectly placed, and as part of the categorization the central computer system can communicate one or more instructions to a motorized transport unit to weigh the detected item. For example, an instruction may be issued to cause the motorized transport unit to pick up an item with an extendible arm that is cooperated with a weight sensor to detect a weight of an item, issue an instruction to cause the motorized transport unit to move the item onto a scale (e.g., a scale on the motorized transport unit or a separate scale), or other such actions to determine a weight. The determined weight of the item can be communicated to the central computer system, which can categorize the item based in part on the weight of the item. For example, an item may be a wallet, and in categorizing the wallet as an item being sold by the shopping facility or a customer's wallet, the central computer system can consider the weight (e.g., typically a customer's wallet includes contents that would cause it to weigh more than an empty wallet being sold by the shopping facility). Similarly, a plastic bottle may be detected and the weight can be used to determine whether it may be a product sold by the shopping facility or a bottle that has already been open and thus not to be sold by the shopping facility (e.g., which may result in categorizing the item as a recyclable item, non-recyclable waste, or the like). Additionally or alternatively, the motorized transport unit may include an ultrasonic sensor that can be used, for example, to determine whether there is something inside an item or whether the item is empty (e.g., whether a water bottle has fluid in it).

As a further example, the central computer system in categorizing items can determine that an item is not a retail item being offered for sale by the retail shopping facility. This determination may be based on failing to identify the item, detecting an identifier of the item and determining that the identifier does not correspond with an item being sold at the shopping facility, identifying the item is consistent with an item sold but that the item is damaged, consumed, partially consumed or the like, identifying that the item is presumed to be owned by a customer, and/or other such determinations. In some instances, the central computer system can determine that an item is presumed to be owned by a customer and accordingly should not be discarded. Based on this determination, the central computer system may further determine that the item is to be taken to a predefined lost and found location. An instruction can be communicated to a motorized transport unit and/or a worker to retrieve the item and take the item to the lost and found location.

Other sensors may additionally or alternatively be activated to help categorize and/or identify a detected item. For example, a motorized transport unit may include a scanner that can be used to scan an identifier of an item (e.g., a barcode scanner, an RFID detector, imaging system to capture an image of a barcode, text recognition from an image, etc.). Accordingly, the central computer system may activate one or more sensors of the motorized transport unit to acquire input data that can be used by the central computer system in categorizing and/or identifying an item.

In some embodiments, the central computer system obtains and uses further sensor data from sources other than one or more of the motorized transport units, and can additionally or alternatively use that further sensor data in detecting, categorizing, and/or identifying items. The further sensor data may be obtained from one or more sensors of the shopping facility, fixed cameras at the shopping facility, shelf sensor data (e.g., weight sensor, light detector, etc.), worker input, customer input (e.g., from a customer smartphone), and/or other such sensor data. The further sensor data can be used by the central computer system to detect items that are incorrectly placed, identify items and/or categorize items. For example, the central computer system may receive image data captured by one or more cameras each fixed at a location within the retail shopping facility. The central computer system can perform image processing and/or direct an image processing system to perform image processing of the image data. One or more items can be detected as being incorrectly placed based on the image processing of the image data. In some instances, the central computer system may detect an item based on the further sensor data, and instruct a motorized transport unit to travel to the location of the item and obtain additional sensor data corresponding to the detected item.

The detection of an incorrectly placed item can, in some instances, include determining that an item is not in a place where an item is expected. Often, the central computer system includes a shopping facility mapping, images of multiple portions of the shopping facility, two-dimensional (2D) and/or three-dimensional (3D) scans of some or all of the shopping facility and/or products, and other such information. This mapping and/or scan data can be updated as items are moved and/or products are placed in feature locations (e.g., end caps are added, adjusted, removed, etc.). Image data from the motorized transport units, fixed cameras, customers' smart devices, workers' user interface units, and/or other such imaging data can be image processed and compared to mappings, scans and/or images of what is expected. For example, an item laying in an aisle or walkway can be detected as inconsistent with what is expected (e.g., based on an image comparison with a reference image). Further, the image data may be sufficient to identify the item (e.g., based on text capture, comparison with a reference 3D scan of a product, image comparison with reference images of products, or the like). Additionally and/or alternatively, one or more motorized transport units may be instructed to obtain additional information about the detected incorrectly placed item.

As described above and further below, the additional data may include weight information, additional images from one or more different angles, bar code scan, and the like. In some applications, the central computer system receives this information and attempts to identify the item. In those instances where the item is recognized, that item may be associated with a particular category based on the identification. The particular categorization can further take additional input data into consideration. For example, the item may be identified as corresponding to a product sold at the shopping facility, but because of a change of dimensions from reference dimensions of the identified item (e.g., smashed, dented, etc.) and/or based on a weight difference from a reference weight of the identified item, the incorrectly placed item may be designated as waste, and in some instances may further be associated with a sub-category (e.g., recyclable, non-recyclable, hazardous, etc.). For example, a motorized transport unit may be instructed to use an ultrasonic sensor (e.g., determine whether there is something inside the item), a metal detector (e.g., determining whether the object should be categorized as recyclable waste), weight sensor, and/or other such sensors.

In those instances, where the item cannot be identified, the item may be categorized based on an appearance of the item, based on a weight of the item, or other such information. For example, the item may not be recognizable, but can be categorized as waste based on characteristics of the item (e.g., flattened, dirty, crumpled, weight less than a threshold, weight less than a threshold corresponding to dimensions of the item, etc.). The categorization may, in some instances, include identifying the detected item, being unable to identify the item, and/or determining that the item does not correspond to multiple predefined items.

Once categorized, the central computer system can determine how the item is to be addressed. This can include leaving the item where it was identified, transporting the item to a predefined area corresponding to the categorization, or the like. In some instances, for example, the central computer system may contact a shopping facility worker to retrieve the item (e.g., communication to a user interface unit 114 with information specifying where the item is located within the shopping facility, instructions regarding what the worker may need to assist the worker in retrieving the item (e.g., shopping cart, mop, etc.), a priority level, and/or other such information) and transport the item to one of multiple different predefined locations. In other instances, the central computer system may communicate instructions to one or more motorized transport units to cause the one or more motorized transport units to retrieve the detected item and transport the item to one of multiple different predefined locations.

As introduced above, in other instances, one or more shopping facility workers and/or motorized transport units may be instructed to leave the detected item. The central computer system may determine that a detected incorrectly placed item has not been at a location where the item was detected for more than a threshold period of time, and communicate an instruction to leave the first item at the location. In some embodiments, the central computer system determines whether to even consider leaving the item and/or identifies the threshold period of time based on the categorization of the item. When a threshold period of time is associated with a category or sub-category, the central computer system can confirm that the detected item has been at the location for the threshold period of time before instructing that the item be retrieved.

Similarly, the central computer system may consider other factors in determining whether an item is to be retrieved, whether to leave the item, or take other action. For example, the central computer system may determine that a movable item container is within a threshold distance of the item, that a customer is within a threshold distance of the item, whether a shopping facility worker is within a threshold distance of the item, whether one or more shopping facility workers are working or are scheduled to be working within a threshold distance of the item, whether a worker was at or within a threshold distance of the location within a threshold time period before detecting the item (e.g., because the worker may have placed the item at the location), whether a notification is received that the item is intended to be at the location, and/or other such factors. In some instances, for example, the central computer system may receive sensor data and/or additional sensor data and identify based on the additional sensor data that a customer is within a first threshold distance of the detected incorrectly placed item. The central computer system can communicate an instruction, based on the categorization of the first item and when the customer is within the first threshold distance of the first item, instructing that the item is to be left at a location where the item is detected. The central computer system can continue to track the input data relative to the detected item and subsequently issue other commands based on changes of conditions (e.g., the customer moves beyond the threshold distance, the item is at the location for more than a threshold time, etc.).

Similarly, in some instances, the central computer system, upon detecting that a customer is at the location, may instruct a motorized transport unit to approach the customer to ask whether the item belongs to the customer. The inquiry may be through an audio communication, an audible alert with displayed text, other such communication, or combination of two or more of such communications. In some instances, the customer may be known (e.g., based on detecting the customer's user interface unit, facial recognition, customer registering upon entering the shopping facility, a motorized transport unit associated with the customer, etc.), and the central computer system may directly communicate with the customer's user interface unit and/or a motorized transport unit associated with the customer. As another example, the central computer system may use additional sensor data to detect that a worker is within a threshold distance of the item, and the central computer system may communicate with the worker (e.g., a user interface unit 114, a motorized transport unit, etc.) to ask the worker whether the item should be left or retrieved.

Figure 17:
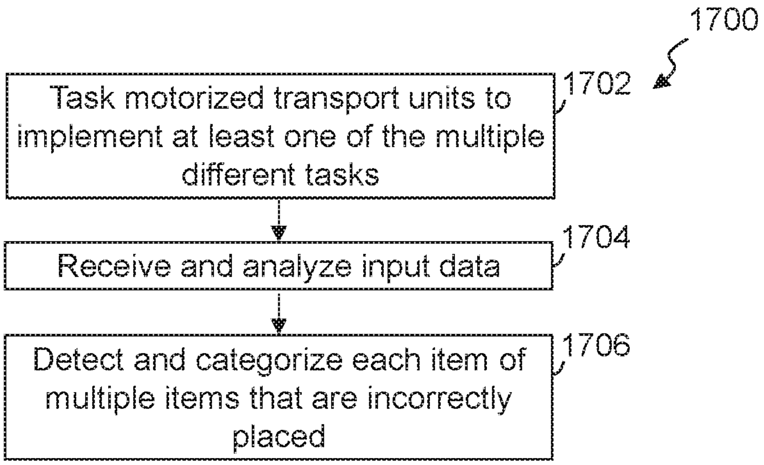
FIG. 17 illustrates a simplified flow diagram of an exemplary process of addressing and/or categorizing incorrectly placed items, in accordance with some embodiments.

FIG. 17 illustrates a simplified flow diagram of an exemplary process 1700 of addressing and/or categorizing incorrectly placed items, in accordance with some embodiments. In step 1702, motorized transport units are tasked by the central computer system to implement at least one of the multiple different tasks relative to the retail shopping facility. Again, the motorized transport units are configured to implement numerous different tasks, and the central computer system can communicate commands to cause one or more of the motorized transport units to complete the task. For example, identified items may be categorized, in some instances, as one of merchandize sold by the shopping facility, customer property, a recyclable waste item, non-recyclable waste, hazardous waste, unknown item, worker property, product being stocked, other such categories, and in some instances a combination of two or more of such categories.

In step 1704, the central computer system receives and analyzes input data detected and provided by at least one or more of the motorized transport units while the motorized transport units perform the one or more tasks. In step 1706, the central computer system detects and categorizes each item of multiple items that are incorrectly placed within the retail shopping facility according to one of multiple different predefined categories.

In some instances, the process determines whether an action should be taken regarding the categorized item. As described above, in some instances the central computer system may not take action and/or may not direct an action to be performed (e.g., a customer is within a threshold distance, a worker is within a threshold distance, work is scheduled to be performed and/or is being performed within a threshold distance of the item, and other such conditions). In many instances, however, the central computer system will associate the detected item with a category, and based on that categorization cause one or more actions to be implemented. For example, the central computer system may determine for each detected and categorized item that an item is to be transported to one of multiple predefined different potential locations of the retail shopping facility based on the categorization of the item. One or more instructions can be communicated, relative to each of the categorized items, to cause the categorized item to be taken to the corresponding determined location. This communication may include, for example, one or more instructions communicated to a motorized transport unit, one or more instructions communicated to a user interface unit of a worker, communicated to a display system that displays the instruction that would be visible to one or more workers, other such communication, or combination of such communication. For example, one or more instructions can be communicated to a motorized transport unit to retrieve the item and transport the item through at least a portion of the retail shopping facility to the determined location.

Some embodiments, in categorizing an item, determines that a detected item is not a retail item being offered for sale by the retail shopping facility, and further determine that the item is presumed to be owned by a customer and should not be discarded. Based on this categorization, the central computer system may in some instances determine that the item is to be taken to a lost and found location.

Additional sensor data may be evaluated by the central computer system and/or other processing circuitry in at least categorizing detected items. In some instances, for example, the central computer system receives image data captured by at least one camera fixed at a location within the retail shopping facility. The central computer system can cause image processing of the image data and detect, based on the image processing, that an item is incorrectly placed. Other sensor data may be obtained, such as weight, ultrasound, text capture, RFID data, bar code data, and/or other such information. In some implementations, the central computer system activates one or more systems to capture sensor data. For example, the central computer system may communicate instructions to a motorized transport unit to pick up and weigh a detected item. A communication can be received from the motorized transport unit specifying a weight of the item. The central computer system can use this weight information in categorizing the item (e.g., comparison with one or more reference weights that are associated with one or more products). For example, the central computer system may determine that the item corresponds to a specific known product sold by the shopping facility, and can determine whether the item should be considered waste based on a difference between a reference weight of the known product and the detected weight. The weight may be provided by a weight sensor on the motorized transport unit, a scale on which a motorized transport unit or worker place an item, or other such source.

Further, in some instances, it may be determined that a detected item has not been at a location where the item was detected for more than a threshold period of time. Accordingly, instructions can be communicated to leave the first item at the location based on the categorization of the item and in response to determining that the first item has not been at the location where it was detected for more than the threshold period of time. Similarly, the central computer system may receive additional sensor data and identify, based on the additional sensor data, that a customer is within a threshold distance of an item determined to be incorrectly placed. One or more instructions can be communicated, based on the categorization of the item and when the customer is within the threshold distance of the item, instructing that the first item is to be left at a location where the first item is detected.

Shopping facility workers frequently see items that are in incorrect locations. Sometimes workers may retrieve and route these items to appropriate locations. Workers, however, are unable to look all the time, take the time to assess items customers may or may not properly handle, so incorrect items are placed on shelves, left to clutter spaces, or incorrectly disposed. These incorrectly or abandoned items potentially reduce sales, add to shrink, result in personal losses, and other adverse results. Some embodiments, in part, take advantage of the motorized transport units that travel through shopping facilities while performing other assigned tasks to obtain sensor data that can be used to detect items that may be incorrect locations. Further sensor data from other sources (e.g., fixed cameras, sensor data from fixed sensors (e.g., RFID sensor, shelf sensor systems, etc.), sensor data from customer and/or worker user interface units, other such sensor data, and often a combination of two or more of such sensor data). Using this sensor data, the central computer system is configured to detect items that are in unexpected and/or incorrect locations (e.g., placed on an incorrect shelf, lying on the floor, etc.). For example, sensor data may be obtained from a motorized transport unit while performing a cleaning task, while changing trash bins, items potentially identified as obstacles while assisting a customer, and other such tasks. The central computer system can obtain the sensor data, evaluate the sensor data to try to categorize, classify and/or identify items, and determine appropriately handling of these items (e.g., having the item returned to an intended shelf, having the item placed in a recycle bin, having the item placed in a waste bin, having the item delivered to a lost and found location, and other such actions).

Some embodiments can categorize and/or identify items using one or more types of sensor data even when the item is mislabeled, poorly labeled, missing bar codes. Often such automated categorization is more precise than would be achieved when relying on shopping facility workers alone. The central computer system typically accesses and evaluates sensor data and/or determined characteristics relative to multiple database sources of various characteristics, images, data, and the like. Accordingly, the central computer system is able to improve accuracy of handling of incorrectly placed items and/or reduce subjectivity regarding how items are handled. Further, the accurate categorization and/or identification of misplaced items improves consistency of pricing, enables items to be checked more often, and can have items mislabeled or misplaced routed to intended shelves, routed to a predefined returns location (e.g., for re-labeling and re-stocking, etc.), routed to a proper disposal location, and the like. The central computer system can further categorize items that are not for resale by the shopping facility, by in part distinguishes items for sale from items not for sale, and cause items not for sale to be removed from the sales floor. Some embodiments further provide for better compliance by, in part, identifying expired, recalled, damaged goods. Further, the identification and handling of incorrectly placed items can improved quality of service by, in part, continuously categorizing and/or identifying unknown items, having motorized transport units multitasking, which can achieve a level of service that typically is not possible through workers alone, due in part to time limitations, lack of information, and the like.

In some embodiments, the central computer system collects sensor information, evaluates the sensor information in sorting detected items, and causes one or more actions to be performed to handle the identified incorrectly placed items or objects. The collection of sensor data can include sensor data from one or more motorized transport units, which can obtain the sensor data while performing other tasks and/or while being directed to move through the shopping facility with the task of detecting items that may be incorrectly placed. Further, sensor data may be obtained sensors of the shopping facilities (e.g., RFID sensors, light sensors, cameras, shelf sensors, trash can sensor, waste processing sensors, and/or other such sensors). Similarly, sensor data may be received from workers (e.g., accessing a specific worker interface of a computer system, a worker user interface unit, etc.), customers, other sources, or combination of two or more of such sources. In some implementations, a sort processing provides for categorization, identification, determination of how to handle an item, storage, and/or other such functions. Collection processing may, in part, determine whether an item is to be picked up or left alone. Additionally or alternatively, a handling process may issue instructions to cause items to be addressed (e.g., determine whether an item is to be retained or disposed). In retaining an item, the item can be returned to a customer or reclaimed by the shopping facility. For example, items to be disposed of are typically categorized as recycle, trash or other category and/or sub-category (e.g., compose waste, trash, hazardous, etc.).

Some embodiments implement a sorting process that, in part, includes the categorization and/or identification of items. The sensor data is evaluated relative to known data, such as, but not limited to, an item database, index or the like that maintains information about different potential items that may be identified, imaging database that maintains image information corresponding to known items, other such databases, or combination of two or more of such databases. These databases may be part of the central computer system, separate from the central computer system and maintained by the shopping facility, a parent entity of the shopping facility (e.g., corporation of a chain of shopping facilities), and/or third party services (e.g., manufacturers, distributors, vendors, governmental agencies (e.g., environmental protection agency, city recycle services, etc.)).

The sensor data may be acquired while a motorized transport unit is performing other tasks or specifically collecting sensor data that can be used to detect potential items. In some instances, a potential item may be scanned and/or other sensors activated to obtain relevant data. For example, a motorized transport unit may include a weight scale sensors to obtain weight information. A bar code scanner and/or RFID sensor can be used to obtain identifying information about an item. Some embodiments use different sensor data to confirm and/or further narrow potential categorization and/or identification (e.g., a weight of an item can be compared with known weight associated with a bar code detected to evaluate completeness of the item). The weight sensor may determine weight by the amount of pull force it takes to pick up the object by a robotic arm, which may be grasping the item using, for example, a robotic clamp, fingers or the like. A metal detector and/or magnetic field can provide information to evaluate whether an item may have some metal recycling value. Optical sensors (e.g., lasers, infrared, opacity, color, etc.) may be utilized to aid in identifying size and classifying item. Some embodiments may activate 2D and/or 3D cameras for visual image recognition (e.g., models, shapes, dimensions, etc.) to determine size and whether the sensor data matches models and images currently stored. Again, a bar code readers (e.g., visible, invisible ink scanner, etc.) can provide quick assessment of item identity. Some embodiments implement image processing to compare patterns, shapes, and the like on an item. Further, text recognition (e.g., optical character recognition, etc.) to assist in identification and classification of items (e.g., paper cup verses jar of jam). Ultrasonic density scans may be used to assess value of an object and categorize the object (e.g., categorize as product sold and to be returned to a shelf, customer object and taken to lost and found, waste (e.g., recycle, trash, compost, hazardous, etc.), and the like.

In some applications, the item categorization includes a comparison with other known object specifications, models, consistency, and the like. The comparison can, in some instances, evaluate matching based upon highest probability of a match. The categorizing of an item can be based upon the probability of a match. In some instances, an item cannot be categorized and/or a probability of a match to a category is below a threshold, and the item can be categorized as an unknown object. Such a categorization can later be changed by a worker, or left as unknown for further processing. In some instances, the central computer system may obtain one or more images and/or video of an item and communicate the image and/or video to one or more workers for further consideration, categorization and/or identification. The worker may respond with a categorization or identification of the object, which may include a bar code, RFID information, or other identifying information.

The central computer system further identifies, based on the identification and/or categorization how the item is to be addressed. In part, the determination of how to handle an item can depend on whether the item is a product being sold by the shopping facility. In some instances, merchandise may be detected and/or recognized based on a scanning of a barcode, optical analysis, comparison to 2D and/or 3D models on file, text recognition, etc. Similarly, an item may be categorized as waste or trash when it cannot be recognized as merchandise, when it is recognized as waste (e.g., empty plastic bottles, cups, crinkled paper, smaller items, shape of a recognized item does match 3D models, text, or other criteria on file. Items can be categorized as potential lost and found items, such as merchandise-like items that failed to match criteria to be confirmed as merchandise, item correspond or match 2D or 3D models or other criteria but do not match within a threshold to be confirmed that it is store merchandise, items matching merchandise but the weight does not match or metal can be detected inside, and the like. Routing and/or handling of items is typically dependent on the categorization of the item. For example, an item may be categorized as a movable item container and routed to a staging area near an entrance of the shopping facility, and items recognized as owned by the shopping facility (e.g., equipment, tools, etc.) can be routed to an equipment handling location, items that merchandise and sold by the shopping facility may be returned to an intended location (e.g., transported by a worker, motorized transport unit, etc.) and/or routed to a returns location for further processing. Similarly, items categorized as potentially customer property may be routed to a lost and found location, while items identified as waste may be routed to a recycling location (e.g., if determined to have no other value), a composting location, a hazardous waste handling location, a general waste location for further processing, or the like Some embodiments may determine an item is and unknown object, but may further determine whether the item may have some value (e.g., recycle value, composting value, potential customer value, etc.). In some instances, such unknown categorized items may be routed to a particular worker, one of one or more predefined bins, or the like that allow a worker to inspect and determine how the item is to be handled (e.g., reviewed to see whether it should be routed to lost and found, recycle bins, waste bin, etc.). Sensor data may be considered in determine which of multiple unknown locations/bins an item should be placed. For example, when metal is detected, it may be recognized as a can and staged for recycling, while other items may be potential customer property (e.g., metal keys) are placed in a customer property review bin. In some instances, a recycle indicator or symbol may be detected providing guidance regarding how an item is to be recycled. Similarly, in some instances, plastic bottles may be assumed to be recyclable, but other types of plastic may need further review to be reviewed. Some paper items (e.g., napkins, paper plates, newspapers) can be placed in recycling bins. When an item is determined to contain a potential combination of materials, it may be categorized accordingly further evaluation by a worker performed (e.g., capturing an image or video, sending the captured image or video to a worker, staging in an evaluation location, and letting the worker identify the item). Items identified as not having value can be placed in a bin for disposal.

Some embodiments implement collection processes to identify how an item is to be addressed and/or how an item is retrieved. Unexpected item identification may occur by video analytics, by customers bringing objects to a motorized transport unit or worker, through 2D and/or 3D scanning of shelves, image processing and the like. The central computer system, in some instances, may determine an item is to be left alone (e.g., for a threshold period of time), which may depend on how long an object is in place. Once an object is detected as unexpectedly being in a location, a threshold of time may be considered in some instances before issuing instructions to cause the item to be retrieved. The threshold time may be set by a worker, and can be different depending on the area of store, categorization, type of object (providing it can be identified), whether a customer and/or movable item container is within a threshold distance from the item, whether a worker is within a threshold distance, a time of day or night, other such factors, or a combination of two or more of such factors. When the item is to be retrieved (e.g., after a threshold time), an instruction can be communicated to a motorized transport unit, a worker's user interface unit, or the like. Further, in some instances where the motorized transport unit is unable to retrieve the item (e.g., due to size, consistency, threshold number of failed attempts, etc.), a subsequent instruction can be communicated to a worker with location information and/or directions through the shopping facility to the item.

Again, based on the categorization and/or identification of the item, the central computer system can determine how an item is to be handled. For example, items identified as customer's property can be directed to a lost and found location, with instructions communicated to a motorized transport unit and/or worker to transport the item. Some embodiments maintain a lost and found database and/or virtual lost and found that may be electronically accessed by a worker and/or customers to determine whether an item was found. The database may obtain information about the item (e.g., an identification, categorization, etc.), where the item was found, when the item was found, when the item was placed into lost and found, and/or other such information. Further, in some instances, one or more images, scans, and/or video of the item may be maintained in the database and/or references in the database (e.g., link to access a separate memory storage and/or database). In some instances, a motorized transport unit and/or the central computer system may keep track of one or more items detected that appear to be something that may be of value to a customer. Similarly, workers that find items may give the items to a motorized transport unit.

The central computer system and/or the lost and found database may keep track of the length of time that an item has been in the lost-and-found, and properly dispose of it after a reasonable amount of time. In some embodiments, the central computer system and/or the motorized transport units may have access to the lost and found database (e.g., listing, images, etc.). The central computer system and/or the motorized transport units can access the database in response to a customer request and the motorized transport unit may display information to a customer regarding found items. Similarly, the customer may be allowed to enter information through the user interface of the motorized transport unit with details about an item the customer believes they lost at the store (e.g., approximate time of loss, type of item, color(s), size, model information, other characteristics). The central computer system and/or the motorized transport unit can implement a search through the lost and found database using the information to try and identify the item in the lost and found. Workers may refer customers who have lost something to pose questions to a motorized transport unit. In some instances, a motorized transport unit and/or a worker can be instructed to deliver a lost item to the customer who has lost them, by using the customer's user interface unit to locate the customer. Further, some items that are determined to be customer items, may be given higher priority. For example, the central computer system may apply a higher priority to found wallets, keys, smartphones, or the like. Customer service may also be immediately alerted in case this customer is still in the store. Other less important items (e.g., misplaced merchandise, trash, etc.), may be collected in a bin, and sorted through later as time permits. Similarly, the central computer system may be directed to identify and/or categorize an item that the shopping facility is willing and/or legally bound to accept (e.g., supporting the European WEEE (Waste Electrical and Electronic Equipment Directive) where a retailer is legally bound to take back end of life electronic), and can categorize the item based on an identification and/or categorization of the product and how to dispose of it.

In some embodiments, exemplary systems and methods are described herein useful to detect and address incorrectly and/or misplaced items. In some embodiments, a system comprises: a plurality of motorized transport units that are each configured to perform multiple different tasks at a retail shopping facility; and a central computer system configured to instruct various ones of the plurality of motorized transport units to implement at least one of the multiple different tasks relative to the retail shopping facility, receive and analyze input data detected and provided by the motorized transport units while the motorized transport units perform the at least one of the tasks, and detect and categorize each item of multiple items that are incorrectly placed within the retail shopping facility according to one of multiple different predefined categories.

In some embodiments, the central computer system in categorizing the items is further configured to: categorize at least some of the items as one of merchandise sold by the shopping facility, customer property, and a recyclable waste item. In some embodiments, the central computer system is further configured to: determine for each of the items, based on the categorization of the items, a location of multiple predefined different potential locations of the retail shopping facility the categorized item is to be taken, and communicate an instruction, relative to each of the categorized items, to cause the categorized item to be taken to the determined location. In some embodiments, the central computer system in communicating the instruction communicates the instruction to a first motorized transport unit, of the plurality of motorized transport units, to retrieve the item and transport the item through at least a portion of the retail shopping facility to the determined location. In some embodiments, the central computer system in categorizing each of the multiple items determines that a first item is not a retail item being offered for sale by the retail shopping facility, and further determines that the first item is presumed to be owned by a customer and should not be discarded, and the central computer system, in determining the location, determines that the first item is to be taken to a lost and found location. In some embodiments, the central computer system is further configured to receive image data captured by at least one camera fixed at a first location within the retail shopping facility, cause image processing of the image data, and detect at least a first item is incorrectly placed based on the image processing of the image data. In some embodiments, the central computer system in categorizing a first item communicates instructions to a first motorized transport unit to pick up the first item and communicate a weight of the first item to the central computer system, and categorizes the first item based on the weight of the first item. In some embodiments, the central computer system is further configured to determine that a first item has not been at a location where the first item was detected for more than a threshold period of time, and communicate an instruction, based on the categorization of the first item and in response to determining that the first item has not been at the location where the first item was detected for more than the threshold period of time, to leave the first item at the location. In some embodiments, the central computer system is further configured to receive additional sensor data, identify based on the additional sensor data that a customer is within a first threshold distance of a first item, and communicate an instruction, based on the categorization of the first item and when the customer is within the first threshold distance of the first item, instructing that the first item is to be left at a location where the first item is detected.

Further, some embodiments provide methods to address incorrectly placed items, comprising: by a central computer system for a retail shopping facility: tasking various ones of a plurality of motorized transport units to implement at least one of the multiple different tasks relative to the retail shopping facility; receiving and analyzing input data detected and provided by the motorized transport units while the motorized transport units perform the at least one of the tasks; detecting and categorizing each item of multiple items that are incorrectly placed within the retail shopping facility according to one of multiple different predefined categories.

In some embodiments, the categorizing the items comprise categorizing at least some of the items as one of merchandize sold by the shopping facility, customer property, and a recyclable waste item. In some embodiments, the system further performs determining for each of the items, based on the categorization of the items, a location of multiple predefined different potential locations of the retail shopping facility the categorized item is to be taken, and communicating an instruction, relative to each of the categorized items, to cause the categorized item to be taken to the determined location. In some embodiments, the communicating the instruction comprises communicating the instruction to a first motorized transport unit, of the plurality of motorized transport units, to retrieve the item and transport the item through at least a portion of the retail shopping facility to the determined location. In some embodiments, the categorizing each of the multiple items comprises: determining that a first item is not a retail item being offered for sale by the retail shopping facility and determining that the first item is presumed to be owned by a customer and should not be discarded; and wherein the determining the location comprises determining that the first item is to be taken to a lost and found location.

In some embodiments, 15, the system further performs: receiving image data captured by at least one camera fixed at a first location within the retail shopping facility and cause image processing of the image data, and detecting at least a first item is incorrectly placed based on the image processing of the image data. In some embodiments, the system further performs: communicating instructions to a first motorized transport unit to pick up and weigh a first item of the multiple items, receiving a communication from the first motorized transport unit a weight of the first item, wherein the categorizing each of the items comprises categorizing the first item based on the weight of the first item. In some embodiments, the system further performs: determining that a first item has not been at a location where the first item was detected for more than a threshold period of time, and communicating an instruction, based on the categorization of the first item and in response to determining that the first item has not been at the location where the first item was detected for more than the threshold period of time, to leave the first item at the location. In some embodiments, the system further performs: receiving additional sensor data, identifying based on the additional sensor data that a customer is within a first threshold distance of a first item, and communicating an instruction, based on the categorization of the first item and when the customer is within the first threshold distance of the first item, instructing that the first item is to be left at a location where the first item is detected.

In accordance with some embodiments, further details are now provided for systems and methods for sorting items discarded in a shopping facility.

In some embodiments, a system for sorting items discarded in a shopping facility comprises: a motorized transport unit configured to travel around discarded items collected from the shopping facility and placed in a sorting area in the shopping facility, the motorized transport unit comprises a sensor device and an item mover device, an item characterization database storing characteristics corresponding to a plurality of items likely to be found in the shopping facility, and a central computer system coupled to the motorized transport unit and the item characterization database, and configured to: receive data from the sensor device on the motorized transport unit, determine an item characteristic of an item among the discarded items in the sorting area based on the data from the sensor device, determine a sorting category of the item from a plurality of predefined categories based on the item characterization database, each of the predefined categories corresponds to a method of discarded item deposition, and cause the motorized transport unit to move the item, with the item mover device, from the sorting area into a category area associated with the sorting category.

In some embodiment, an MTU may be configured to bulk process large volumes of discarded items from trash bins and may be implemented for backroom trash bin handling. Trash bins may be checked for merchandise and select materials prior to transferring the content into a dumpster. In some embodiments, the systems and methods described herein may function to enhance existing recycling solutions or protocols. In some embodiments, the systems and methods described herein may increase both sustainability and loss prevention. An MTU may help associates to ensure that valuable items or material are accounted for and routed properly.

In some embodiments, system and methods described herein may be used in stores and warehouse stores to recycle and process discarded items that would otherwise be sent to landfill. MTUs and/or associates may empty filled trash bins from a shopping facility. Associates are not always able to sift through all of the garbage to check for items of value since some items or material of value may not be easily observed. This can result in potential loss and shrink. An MTU may automate the identification and recovery of materials, distinguish trash from treasure, and sort items into bins. In some embodiments, the system may operate towards achieving zero waste by providing an additional cost effective filter for reducing loss and/or locating value in the processing of discarded items. An MTU may use a combination of sorting technologies to distinguish selected recyclable materials such as glass or metals from other types of trash. In some embodiments, an MTU may perform sorting functions with the help of a central computer system. In some embodiments, merchandise-like items may be set aside and identifiable recyclable items may be moved to assigned bins. In some embodiments, the system may utilize technologies such as sensors, MTUs, and a central computer system. In some embodiments, the system may further use visual recognition to find and set aside recognized recyclables.

In some embodiments, non-recyclable but burnable materials may be collected as fuel to be used as a heat source for heating a building and/or a hot-water heater. Food waste may be sorted out and used as a feed for animals or as a compost to be added as a soil supplement. Hazardous waste such as batteries, light bulbs, or chemical compounds may be set aside for proper disposal.

In some embodiments, with a sorting system, contents of trash bins are dumped into a tumbler which loosens up the trash in preparation of machine or human inspection. The tumbler may sort larger items from smaller by allowing smaller items to fall through holes in the tumbler. Smaller items may be separated onto a sorting pad and inspected for jewelry and small electronic items. Lighter items (e.g. paper, plastic bags, etc.) may be blown off into a dumpster. Larger items may come out of the end of the tumbler placed on a sorting pad, on which an MTU may look for potential merchandise-like items and identifiable recyclable material (metal, glass, plastics). On the sorting pad, the MTU may identify, classify, and recommend disposition methods for items and move items of potential interest to separate bins. In some embodiments, store associates may be instructed to make a final inspection of presorted material, confirms selected disposition method, and places material in proper receptacles for pick up.

In some embodiments, the system may perform weight detection to evaluate discarded items. In some embodiments, the system may include one or more of: a metal detector (magnetic field) to determining values of items, an optical sensor (lasers, infrared, opacity, color) for identifying items, a camera for visual (models, shapes) identification and text recognition, a barcode reader for obtaining an item identifiers, ultrasonic density scanner for determining content volume/mass. The system may further include sorting holes for smaller items to fall through, a blower for moving lighter items aside, and a rotating brush for loosening items as part of a presorting process.

Figure 18:
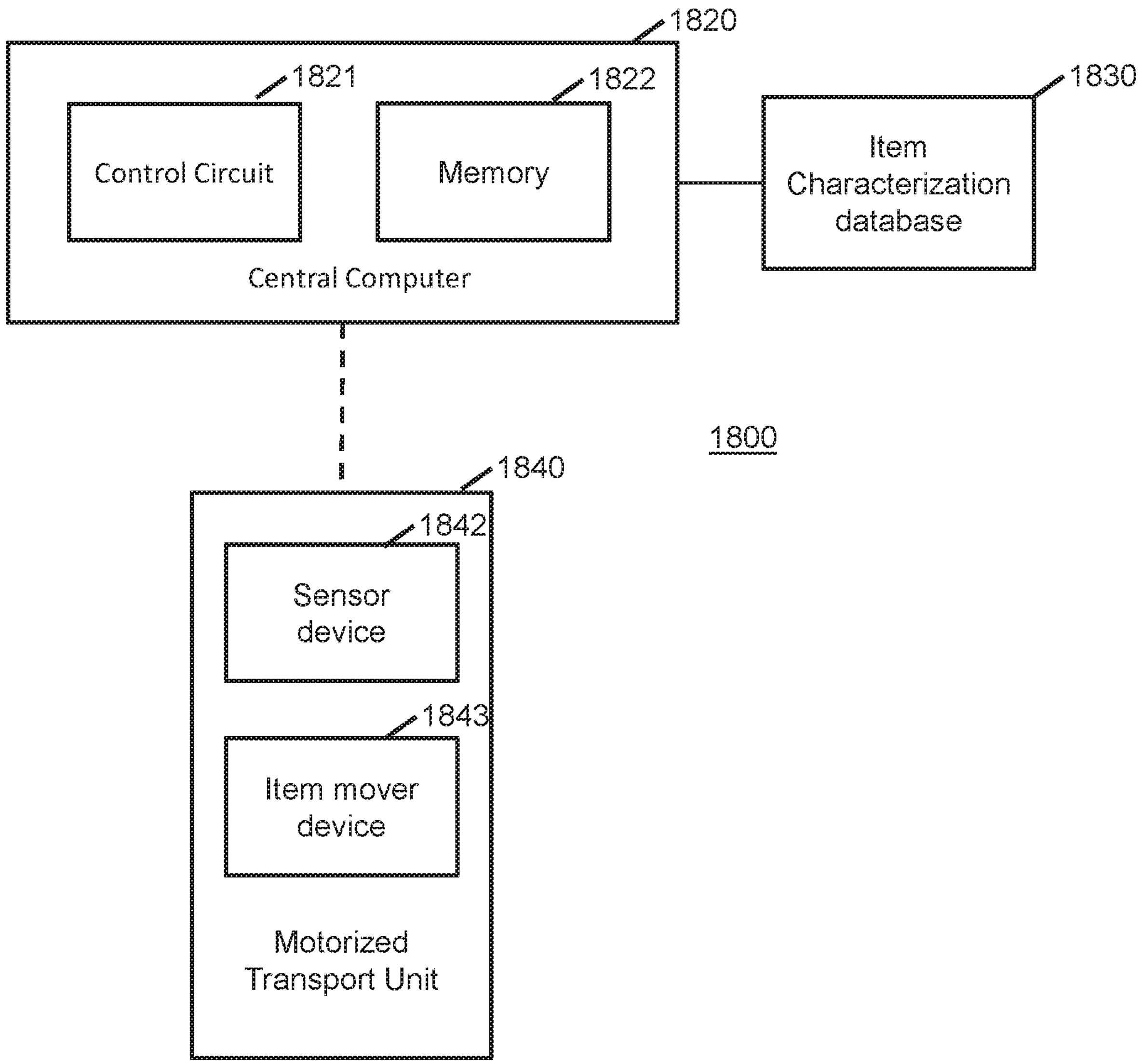
FIG. 18 comprises a block diagram of a system in accordance with some embodiments.

FIG. 18 illustrates a block diagram of an exemplary shopping facility assistance system 1800, similar to that of FIG. 1, as configured in accordance with various embodiments of these teachings. The shopping facility assistance system 1800 includes a central computer system 1820, an item characterization database 1830, and a motorized transport unit 1840 (MTU). The shopping facility assistance system 1800 may include or be implemented at least partially with one or more components shown in FIGS. 1, 4, and 5 or may be implemented outside of the embodiments of FIGS. 1, 4 and 5.

The central computer system 1820 includes a control circuit 1821 and a memory 1822, and may be generally referred to as a processor-based device. In some embodiments, the central computer system 1820 may be implemented to include or as part of one or more of the central computer system 106 and/or the computer device 500 described above. For example, the functionalities of the central computer system 1820 described herein may be implemented as one or more software modules in the central computer system 106.

The central computer system 1820 has stored in its memory 1822, a set of computer readable instructions that is executable by the control circuit 1821 to cause the control circuit 1821 to instruct an MTU 1840 to sort items discarded in a shopping facility based the information stored in the item characterization database 1830. In some embodiments, the central computer system 1820 may be located inside of and serve a specific shopping space. In some embodiments, the central computer system 1820 may be at least partially implemented on a remote and/or cloud-based server that provides instructions to MTUs in one or more shopping facilities.

The item characterization database 1830 may comprise a database that stores item characteristics corresponding to a plurality of items likely to be found in the shopping facility. In some embodiments, item characteristics may comprise one or more of: item appearance, item shape, item weight, item density, item text, item identifier, item barcode, item condition, etc. In some embodiments, item characterization database 1830 comprises a plurality of object models, and the item characteristic may be determined based on comparing the data received from the sensor device 1842 with the plurality of object models in the item characterization database. In some embodiments, an item characteristic may comprise a characteristic directly obtained from the item by a sensor. In some embodiments, an item characteristic may comprise a characteristic retrieved from the item characteristics database using another characteristic obtained from the item by a sensor. In some embodiments, the item characterization database 1830 may match item characteristics and/or combination of characteristics to one or more predefined categories for sorting purposes. For example, a sorting category may be associated with each unique item identifier and/or identifiable item type in the item characterization database 1830. In some embodiments, predefined categories may comprise one or more: recyclable items, compostable items, likely customer items, merchandise, merchandise-like items, valuable items, metal items, glass items, paper items, plastic items, and trash. Generally, the item characterization database 1830 stores information that allows the central computer system 1820 to identify an item and/or select one or more sorting categories based on information collected by one or more types of sensor. While the item characterization database 1830 is shown as being external to the central computer system in 1820, in some embodiments, the item characterization database 1830 and the memory 1822 of the central computer system 1820 may be implemented on the same one or more computer-readable memory devices or on separate devices. The central computer system 1820 may be communicatively coupled to the item characterization database 1830 through wired and/or wireless local and/or remote data connections.

The motorized transport unit 1840 may comprise a motorized unit configured to communicate with the central computer system 1820 and carry out one or more tasks based on instructions received from the central computer system 1820. In some embodiments, the motorized transport unit 1840 may comprise the MTU 102 described in FIG. 1, the MTU shown in FIGS. 2A-3B, and/or the MTU 102 described in FIG. 4, for example. Generally, an MTU 1840 may comprise a motorized device configured to move around a sorting pad, gather sensor information, and sort items on the sorting pad according to instructions received from a central computer system 1820. The MTU 1840 includes a sensor device 1842 and an item mover device 1843. The sensor device 1842 may comprise one or more of an image sensor, a weight sensor, a barcode reader, a radio frequency identification (RFID) reader, a metal detector, an optical sensor, an ultrasonic density scanner, etc. The sensor device 1842 may be attached to and carried by the MTU 1840. In some embodiments, one or more sensors of the sensor device 1842 may comprise a sensor module attachment that may be removably attached to the MTU 1840. In some embodiments, similar and/or additional sensor(s) may be stationed around a sorting pad and/or one or more presorting devices for collecting additional information from the items for the central computer system 1820 to analyze. In some embodiments, the sensor device 1842 may be include one or more sensors for detecting item characteristic comprising one or more of: item appearance (e.g. color, reflectiveness, pattern, etc.), item shape, item weight, item density, item text, item identifier, item barcode, item condition (e.g. dirty, damaged, etc.), etc.

The item mover device 1843 may comprise a structure for making contact with items to move an item on a sorting pad. In some embodiments, the item mover device 1843 may comprise a bumper, a shovel, a clamp, a brush, a suction device, a magnet, a scoop, an arm, etc. In some embodiments, the item mover device 462 may comprise a removable attachment of the MTU 1840. In some embodiments, the item mover device 462 may comprise the housing of the MTU such as the edges of the lower body portion 204 and/or the upper body portion 206 of the MTU shown in FIGS. 2A and 2B. In some embodiments, an item mover device 1843 may be configured to push, pull, pick up, and/or attach to an item for sorting. While one MTU is shown in FIG. 18, in some embodiments, the central computer system 1820 may communicate with a plurality of MTU performing one or more types of tasks. In some embodiments, two or more MTUs may be assigned to sort discarded items and may simultaneously sort the same group of items in a sorting area.

Figure 19:
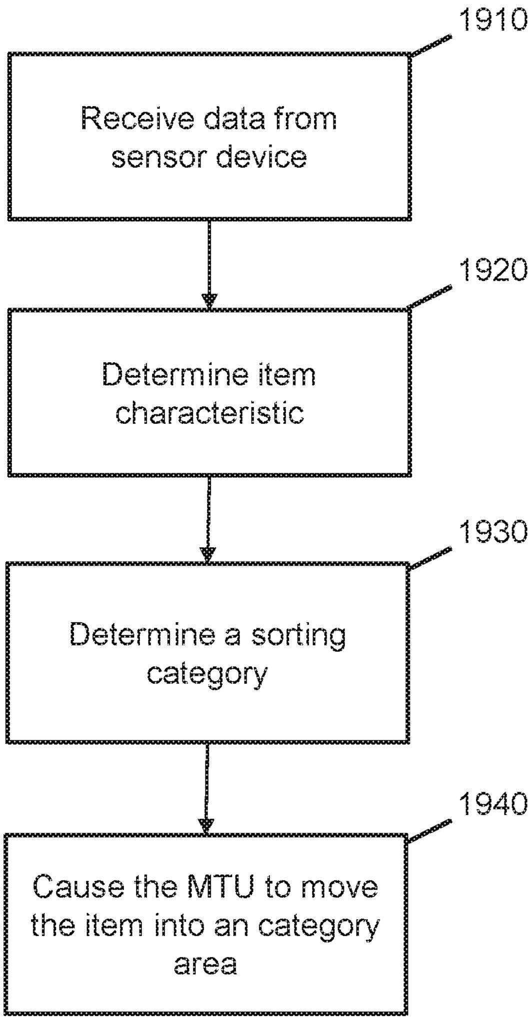
FIG. 19 comprises a flow diagram in accordance with some embodiments.

FIG. 19 shows a flow diagram of a process for sorting items discarded in a shopping facility in accordance with various embodiments of these teachings. The steps shown in FIG. 19 may be performed by one or more of the central computer system 1820 in FIG. 18, the central computer system 106 in FIG. 1, and the computer device 500 in FIG. 5, for example. In some embodiments, the steps are performed by a processor-based device executing a set of computer readable instructions stored on a memory device. In some embodiments, one or more of the steps may be performed by a software program and/or modules of a software program running on a computer system. Generally, the steps shown in FIG. 19 may be performed by a control circuit of a processor-based device.

Prior to step 1910, discarded items from a shopping space may be collected and placed in a sorting area. In some embodiments, discarded items comprise items in trash bins of a shopping facility and/or items collected from the floor of the shopping space (including one or more of sales floor, storage area, restroom, parking lot, etc.) In some embodiments, the discarded items may go through a presort process including one or more of loosening, separating, and winnowing to separate out items by weight and/or size. An example of a presorting process is described in more detail with reference to FIG. 20 herein. In some embodiments, the sorting area may comprise a sorting pad in a backroom area and/or outdoor area of a shopping facility. In some embodiments, the sorting area may be used for other functions in the shopping facility such as a pathway, a storage area, a parking area, etc. when the area is not used for sorting discarded items. In some embodiment, the sorting area may comprise any area where a sorting pad may be set up. In some embodiments, a sorting pad may generally refer to a defined area in which an MTU may travel to perform item sorting. In some embodiments, a sorting pad may prefer to a flexible material that can be folded/rolled up and stored. In some embodiments, the items may be placed in a pile on the sorting pad and the MTU may be configured to retrieve and sort items from the perimeter of the pile. In some embodiments, the items may be spread out over the sorting pad and the MTU may be configured to travel among the items to sort them.

In step 1910, the system receives data from a sensor device. In some embodiments, the sensor device may comprise one or more sensors on an MTU. The MTU may be positioned on or around the sorting pad in which discarded items are placed. In some embodiments, the MTU may be configured to travel among discharged items on a sorting pad. In some embodiments, the sensor device may comprise one or more of an image sensor, a weight sensor, a barcode reader, a radio frequency identification (RFID) reader, a metal detector, an optical sensor, and an ultrasonic density scanner. The sensor device may be attached to and carried by the MTU. In some embodiments, in step 1910, the system may instruct the MTU to manipulate one or more items to gather additional data. For example, the system may cause the MTU to remove obstructions and/or change the orientation of the item to look for barcodes and/or other identifying marks on the item. In some embodiments, in step 1910, additional data may be received from similar and/or additional sensors stationed around the sorting pad for collecting additional information for the central computer system to analyze.

In step 1910, the system determines one or more item characteristics of an item among the discarded items in the sorting area based on the data collected by the sensor device. In some embodiments, item characteristic may comprise one or more of: item appearance (e.g. color, reflectiveness, pattern, etc.), item shape, item weight, item density, item text, item identifier, item barcode, item condition (e.g. dirty, damaged, etc.), etc. In some embodiments, the system may further identify the item based on the characteristics data. For example, an item characteristic database may store a plurality characteristics corresponding to a plurality of items likely to be found in the shopping facility. The system may compare the data received in step 1910 with the characteristic data in the item characteristic database to identify the item. In some embodiments, item characteristic may be determined by comparing an item identifier associated with the item with a store inventory database to determine whether the item corresponds to merchandise sold in the shopping facility. In some embodiments, the system may match the item to an item for sale in step 1920. For example, the MTU may read a barcode, an item identifier (name, brand, marking, etc.), and/or a RFID tag on the item to determine the identity of the item and derive the characteristics based on the determined identity (e.g. "no. 123456" corresponds to an alumni can, "family size A brand cereal" corresponds to cardboard box, etc.). In some embodiments, the barcode, item identifier, and RFID tag information for items may be retrieved from an inventory database of the shopping facility. In some embodiments, the system may use the item's appearance, size, shape, weight, etc. to identify the merchandise and/or non-merchandise items. For example, the system may identify a round and flat metal disk as a coin, and may use the weight of the coin to further determine the coin denomination. In some embodiments, item characteristic may be based on both identifying the item and making direct measurements of one or more item characteristics. For sample, the system may be configured to identify a soda can based on an identifier (e.g. barcode) and distinguish whether the can is full, half full, or empty based measuring the can's weight. In some embodiments, the sensor data may be used to determine a state of the item such as one or more of: new, used, full, empty, dirty, damaged, broken, etc. Generally, in step 1920, the system may match a discarded item to a specific item and/or an item type based on sensor data.

In step 1930, the system determines a sorting category for the item. In some embodiments, the item characterization database may assign a sorting category to a plurality of identifiable items and item types. In some embodiments, an item may be assigned to one of the two or more sorting categories based on the state of the item (e.g. unopened and undamaged soda can may be categorized as merchandise while empty soda can may be categorized as recyclable metal). In some embodiments, the sorting category may be determined based on one or more characteristics and/or combination of characteristics measured by the sensor device. The sorting categories may comprise predefined categories such as one or more: recyclable items, compostable items, likely customer items, merchandise, merchandise-like items, valuable items, metal items, glass items, paper items, plastic items, and trash. In some embodiments, each categorize may be generally associated with a method of deposition (e.g. send to X recycling service, send to landfill, convert to fuel, convert to compost, inspected for restocking, etc.).

In step 1940, the system causes the MTU to move the item into a category area. In some embodiments, the MTU may be configured to push, pull, pick up, and/or attach to an item. In some embodiments, the MTU may comprise an item mover device for moving the item. In some embodiments, as the MTU moves the item, the MTU may use one or more of its sensor devices to navigate among one or more items in the sorting area. In some embodiments, in step 1940, the instructions provided to the MTU may further comprise instructions to move other items out of the way. In some embodiments, the category areas may be around and/or adjacent to the sorting pad. In some embodiments, the sorting pad may comprise a platform that is raised relative to the category areas. In some embodiments, the categories areas may each comprise an item receptacle such as a receptacle bin. In some embodiments, the MTU may be configured to push items off the sorting pad and into one of the category receptacles adjacent to the sorting pad. An example of a sorting area is described herein with reference to FIG. 20.

After step 1940, the process may return to step 1910 to sort another item on the sorting pad. In some embodiments, the process may continue to repeat until all items on the sorting pad have been moved to a category area and/or when a category area is full. In some embodiments, when a bin of a category area is full, the system may instruct the MTU, another MTU, and/or a store associate to replace the bin with a new bin. In some embodiments, after sorting of the discarded items is complete, the MTU may exit sorting mode and may be assigned to one or more other shopping space assistance tasks described herein. In some embodiments, the MTU may comprise a dedicated sorting MTU. While one MTU is generally described herein with reference to FIG. 19, in some embodiments, the system may instruct two or more MTUs to sort the same group of items on a sorting pad simultaneously.

Figure 20:
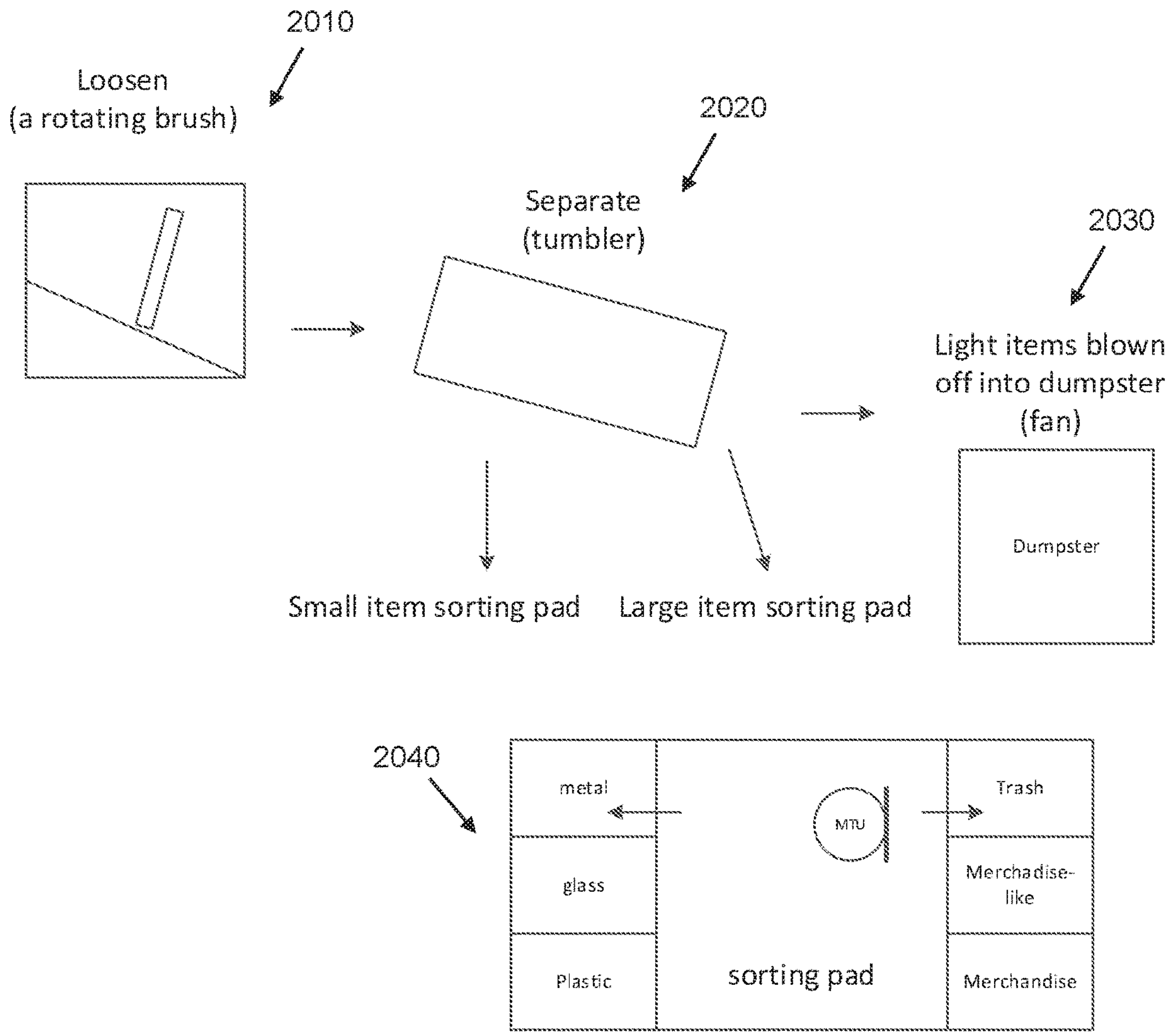
FIG. 20 comprises an illustration of a process in accordance with some embodiments.

FIG. 20 shows an illustration of a process according to some embodiments. In stage 2010, the discarded items collected in a shopping facility are moved through a rotating brush to loosen the gathered items. The rotating brush may be part of a separator configured to receive discarded items from a container and loosen the discarded items from each other. In stage 2020, items are separated through a tumbler. In some embodiments, the tumbler may be configured to separate discarded items by size. For example, the tumbler may comprise one or more holes through which smaller items may drop through. In some embodiments, the smaller items may be placed on a small item sorting pad separate from large items placed on a large item sorting pad. One or more MTUs and/or store associated may be instructed to sort the items on different sorting pads separately. In some embodiments, the tumbler may separate the items based on three or more size types (e.g. small, medium, and large). In stage 2030, a fan blows light items (e.g. paper, plastic bags) off into a dumpster. In some embodiments, the fan may be implemented with or near the rotating brush, the tumbler, and/or the sorting pad. In stage 2040, items on a sorting pad are sorted by an MTU.

In FIG. 20, the sorting pad is surrounding by six category areas: metal, glass, plastic, trash, merchandise-like items, and merchandise items. The MTU may be configured to move the items that were presorted by the tumbler into one of the six category areas according to methods for sorting discarded items described herein. In some embodiments, items sorted into metal, glass, and plastic categories may be sent to a corresponding cycling center, trash may be sent to landfill, and merchandise may be inspected and potentially re-shelved. Merchandise-like may comprise items that need to be inspected for proper disposal. In some embodiments, merchandise-like items may include items that do not match merchandise being sold in the shopping facility and could be items lost by customer and/or associates (e.g. wallet, key, ring, etc.). In some embodiments, customer items may be sent to lost and found. The categories in FIG. 20 are shown as an example only. The system may include any number of categories area in any placement and order around the sorting pad without departing from the spirit of the present disclosure. In some embodiments, one or more of the rotating brush, the tumbler, the fan, and the sorting pad may comprise a stationary and/or portable system configured to operate at the shopping facility at which the discarded items are collected.

Figure 21:
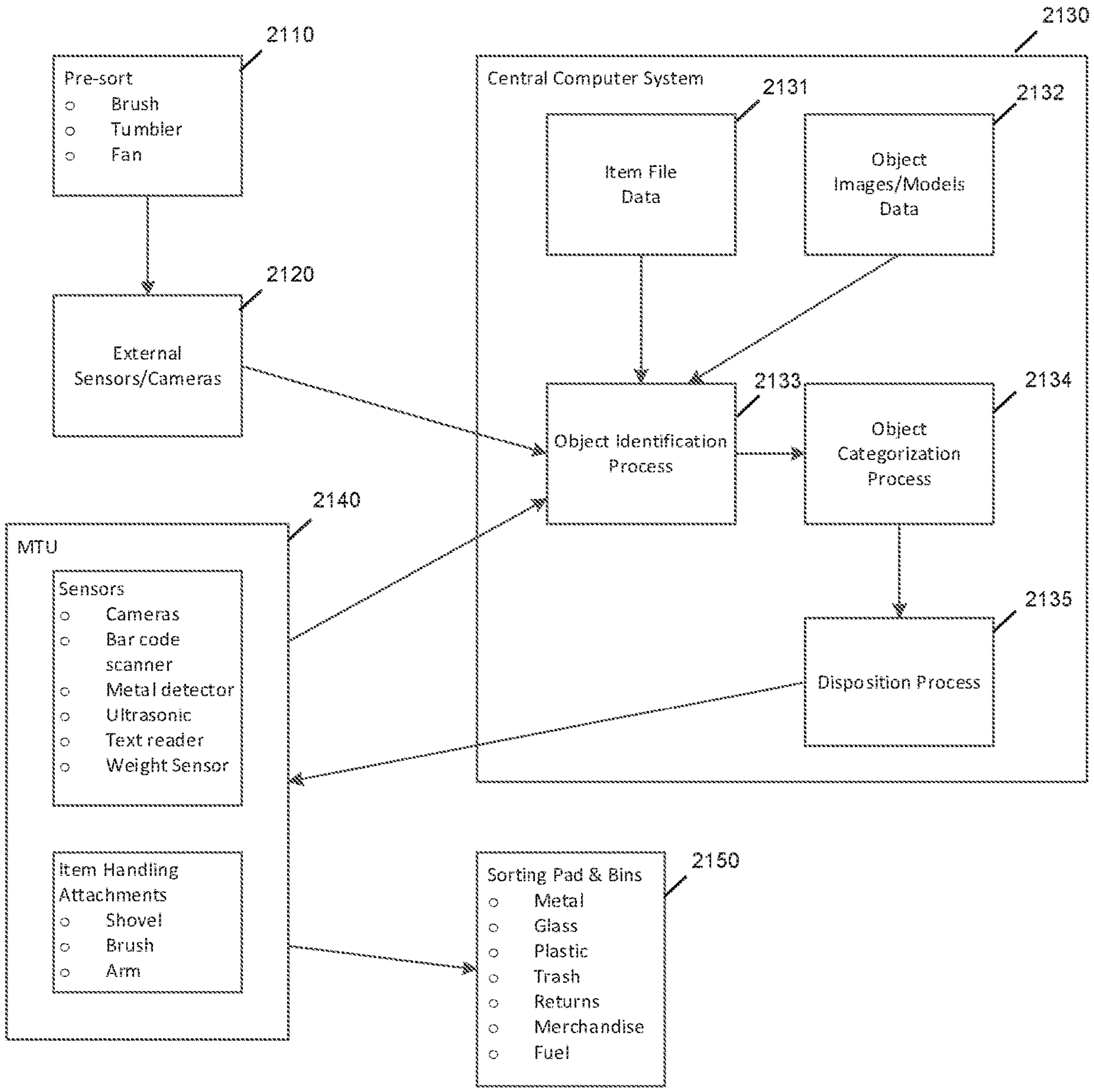
FIG. 21 comprises a block diagram of a system in accordance with some embodiments.

FIG. 21 shows a system diagram for sorting discarded items in a shopping facility. The system comprises a presort system 2110, an external sensor/camera 2120, a central computer system 2130, an MTU 2140, and a sorting pad and bins 2150 setup. In some embodiments, one or more of the presort system 2110, the external sensor/camera 2120, the central computer system 2130, the MTU 2140, and the sorting pad and bins 2150 setup may be located in the shopping facility from which the discarded items are collected. The presort system 2110 may comprise one or more of a brush, a tumbler, and a fan to separate discarded items collected from a shopping facility. In some embodiments, the system includes external sensor/camera 2120 for collecting data from discarded items. In some embodiments, data may be collected by the sensors while the items are being pre-sorted.

The central computer system 2130 may comprise a processor-based device configured to categorize discarded items and provide instructions to the MTU 2140. The central computer system 2130 may comprise an item file database 2131, an object images/models database 2132, an object identification process module 2133, an object categorization process module 2134, and a disposition process module 2135. The item file data 2131 may comprise identifiers and/or characteristics associated with various items sold in a shopping facility and/or items likely to be found in a shopping facility. The object image/models database 2132 may comprise object images and models that are representative different object's characteristics and property (e.g. visual properties, weight, texture, size, etc.). The object identification process module 2133 may be configured to compare data collected by the external sensor/camera 2120 and/or sensors on the MTU 2140 with the information in the item file database 2131 and/or the object images/models database 2132 to identify and/or categorize an object. An object may be matched to an item identifier (e.g. barcode, UPC, etc.) and/or an item type description (e.g. keys, coins, credit cards, empty cup, etc.). The object categorization process module 2134 may be configured to categorize objects based on each object's identity determined by the object identification process module 2133. For example, each item identifier and/or type may be assigned to one of a plurality of predetermined categories such as recyclable items, compostable items, likely customer items, merchandise, merchandise-like items, valuable items, metal items, glass items, paper items, plastic items, trash, etc. The disposition process module 2135 may then determine a disposition method (e.g. where to move the item) and provide instructions to the MTU 2140.

The MTU 2140 may comprise a motored movable unit configured to move items based on instructions received from the central computer system 2130. In some embodiments, the MTU 2140 may comprise an MTU identical or similar to MTUs described herein. The MTU 2140 may be configured to sort items on a sorting pad based on instructions from the central computer system 2130. The MTU 2140 comprises a sensor such as one or more of: a camera, a barcode scanner, a metal detector, an ultrasonic reader, a text reader, a weight sensor, etc. The sensor data collected by the MTU 2140 sensor may be transmitted back to a central computer system 2130 for object identification and/or MTU navigation. In some embodiments, the MTU 2140 may further include an item handling attachment such as one or more of a shovel, a brush, and an arm to move selected items.

The sorting pad and bins 2150 set up may comprise a sorting pad and a plurality of bins around the sorting pad for receiving sorted items. The MTU 2140 may be configured to travel on the sorting pad and, based on instructions from the central computer system 2130, sort the discarded items by moving each item into one or more of the bins. In some embodiments, the sorting pad may comprise a raised sorting platform and the bins may be configured to catch items that are pushed/dropped off the platform. In some embodiments, each bin may correspond to one or more sorting categories such as metal, glass, plastic, trash, returns merchandise, fuel, etc.

Figure 22:
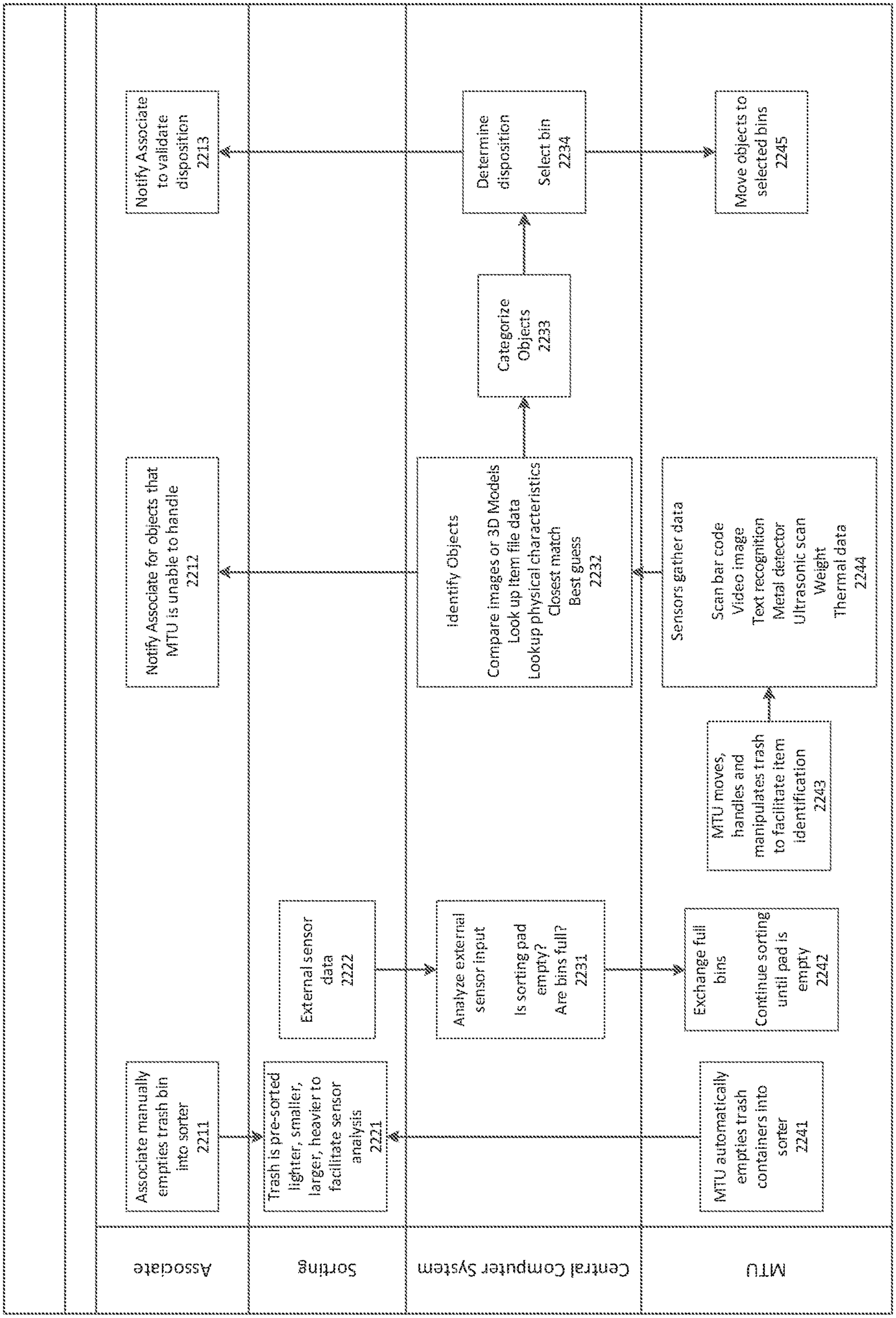
FIG. 22 comprises a process diagram in accordance with some embodiments.

FIG. 22 shows a process diagram for sorting discarded items according to some embodiments. In step 2211, an associate may manually empty one or more trash bins into an item sorter. Additionally or alternatively, in step 2241, an MTU may be configured to empty trash bins into sorters. In step 2221, trash is pre-sorted and separated by size and/or weight (e.g. lighter, smaller, larger, heavier, etc.) to facilitate sensor analysis.

In step 2222, external sensor data may be collected by one or more external sensors. The external sensor may be positioned at the sorting system and/or may be positioned in or around a sorting pad. In step 2231, the central computer system analyzes the external sensor data to determine whether the sorting pad is empty and/or if bins associated with sorting categories are full. In step 2242, an MTU may be instructed to exchange full bins with empty ones. In some embodiments, the MTU may be instructed to continue sorting until the sorting pad is empty. In some embodiments, the sorting pad may comprise a category area and items left on the sorting pad may be collected for disposal (e.g. inspect manually, send to landfill, etc.). In some embodiments, the external sensor data monitoring steps of 2222, 2231, and 2242 may be repeated while an MTU sorts items on a sorting pad.

In step 2243, an MTU moves, handles, and manipulates trash items to facilitate item identification. For example, the MTU may change the orientation of an item and/or remove obstructions to the item to look for identifying marks such as barcodes, logos, etc. In some embodiments, the MTU may pick up the item to determine the weight of the item. In step 2244, the sensor(s) on the MTU gathers data from the discarded items. The gathered data may comprise one or more of: scanned barcode, video image, recognizable text, metal detector reading, ultrasonic scanner reading, weight, thermal data, etc. In step 2232, the central computer system identifies objects based on one or more of: comparing images or 3D models, looking up item file data and looking up physical characteristics to determine the closest match and/or the best guess of the identity of the item. In step 2212, the system may notify associates of any object that the MTU may be unable to handle. For example, oversize items, fragile items, and/or unidentifiable items may be left on the pad or sorted into a separate area for human handling. In step 2233, the central computer system categorizes objects based on the identity of the object determine in step 2232. In step 2234, the central computer system determines a disposition methods for the objects. In some embodiments, the system may further select a disposal bin based on category and/or disposition method determined in step 2234. In step 2245, the central computer system instructs the MTU to move objects into selected bins. In some embodiments, the MTU may move items off the sorting pad and into one of the bins associated with a sorting category around the sorting pad. In step 2213, the central computer system may notify associates to validate the disposition of items in various bins. For example, associates may be instructed to perform a manual inspection and/or secondary sorting of the one or more bins and/or the items remaining on the sorting pad.

In some embodiments, apparatuses and methods are provided herein useful for sorting items discarded in a shopping facility. In some embodiments, a system for sorting items discarded in a shopping facility, comprises a motorized transport unit configured to travel around discarded items collected from the shopping facility and placed in a sorting area in the shopping facility, the motorized transport unit comprises a sensor device and an item mover device, an item characterization database storing characteristics corresponding to a plurality of items likely to be found in the shopping facility, and a central computer system coupled to the motorized transport unit and the item characterization database. The central computer system is configured to receive data from the sensor device on the motorized transport unit, determine an item characteristic of an item among the discarded items in the sorting area based on the data from the sensor device, determine a sorting category of the item from a plurality of predefined categories based on the item characterization database, each of the plurality of predefined categories corresponds to a method of discarded item deposition, and cause the motorized transport unit to move the item, with the item mover device, from the sorting area into a category area associated with the sorting category.

In some embodiments, a plurality of predefined categories comprises one or more: recyclable items, compostable items, likely customer items, merchandise, merchandise-like items, valuable items, metal items, glass items, paper items, plastic items, and trash. In some embodiments, the sensor device comprises one or more of an image sensor, a weight sensor, a barcode reader, and a radio frequency identification (RFID) reader. In some embodiments, the item characteristic comprises one or more of: item appearance, item shape, item weight, item density, item text, item identifier, item barcode, and item condition. In some embodiments, the item characterization database comprises a plurality of object models, and the item characteristic is determined based on comparing the data received from the sensor device with the plurality of object models in the item characterization database. In some embodiments, the item characteristic is determined by comparing an item identifier associated with the item with a store inventory database to determine whether the item corresponds to merchandise sold in the shopping facility. In some embodiments, the system further comprises a separator configured to receive the discarded items from a container and loosen the discarded items from each other prior to the discarded items being placed in the sorting area. In some embodiments, the system further comprises a tumbler configured to separate the discarded items by size prior to the discarded items being placed in the sorting area. In some embodiments, the system further comprises a fan configured to remove light weight material from the discarded items. In some embodiments, the sorting area comprises a sorting platform and the category area comprises one of a plurality of receptacle bins positioned adjacent to the sorting platform.

In some embodiments, a method for sorting items discarded in a shopping facility, comprises receiving, at a control circuit, data from a sensor device on a motorized transport unit configured to travel around discarded items collected from the shopping facility and placed in a sorting area in the shopping facility, determining, by the control circuit, an item characteristic of an item among the discarded items in the sorting area based on the data from the sensor device, determining, by the control circuit, a sorting category of the item from a plurality of predefined categories based on an item characterization database storing characteristics corresponding to a plurality of items likely to be found in the shopping facility, wherein each of the plurality of predefined categories corresponds to a method of discarded item deposition, and causing the motorized transport unit to move the item from the sorting area into a category area associated with the sorting category with an item mover device of the motorized transport unit.

In some embodiments, the plurality of predefined categories comprises one or more: recyclable items, compostable items, likely customer items, merchandise, merchandise-like items, valuable items, metal items, glass items, paper items, plastic items, and trash. In some embodiments, the sensor device comprises one or more of an image sensor, a weight sensor, a barcode reader, and a radio frequency identification (RFID) reader. In some embodiments, the item characteristic comprises one or more of: item appearance, item shape, item weight, item density, item text, item identifier, item barcode, and item condition. In some embodiments, the item characterization database comprises a plurality of object models, and the item characteristic is determined based on comparing the data received from the sensor device with the plurality of object models in the item characterization database. In some embodiments, the item characteristic is determined by comparing an item identifier associated with the item with a store inventory database to determine whether the item corresponds to merchandise sold in the shopping facility. In some embodiments, the system further performs: causing a separator configured to receive the discarded items from a container to loosen the discarded items from each other prior to the discarded items being placed in the sorting area. In some embodiments, the system further performs: causing a tumbler to separate the discarded items by size prior to the discarded items being placed in the sorting area. In some embodiments, the system further performs: causing a fan to remove light weight material from the discarded items. In some embodiments, the sorting area comprises a sorting platform and the category area comprises one of a plurality of receptacle bins positioned adjacent to the sorting platform.

In some embodiments, an apparatus for sorting items discarded in a shopping facility comprises: a non-transitory storage medium storing a set of computer readable instructions and a control circuit configured to execute the set of computer readable instructions which causes to the control circuit to: receive, at a control circuit, data from a sensor device on a motorized transport unit configured to travel among discarded items collected from the shopping facility and placed in a sorting area in the shopping facility, determine, by the control circuit, an item characteristic of an item among the discarded items in the sorting area based on the data from the sensor device, determine, by the control circuit, a sorting category of the item from a plurality of predefined categories based on an item characterization database storing characteristics corresponding to a plurality of items likely to be found in the shopping facility, each of the plurality of predefined categories corresponds to a method of discarded item deposition, and cause the motorized transport unit to move the item from the sorting area into a category area associated with the sorting category with an item mover device of the motorized transport unit.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A computer implemented method for determining item availability in a shopping space comprising:

receiving, at a control circuit, a request for an item for purchase;

causing, via the control circuit, a motorized transport unit having a locomotion system to travel to a display space in a shopping space, the display space intended to stock multiple items, including the item for purchase;

capturing, via one or more sensors of the motorized transport unit, image data of at least a portion of the display space;

based on the image data obtained during the capturing step, determining, via the control circuit, whether the item for purchase is available in the display space; and in the event the item is not available in the display space, determining, with the control circuit, an alternative display space for the item for purchase;

causing a locomotion system of the motorized transport unit to travel to the alternative display space; and determining, based on additional image data captured by the motorized transport unit at the alternative display space, whether the item for purchase is available at the alternative display space.

2. The method of claim 1, wherein the request for the item for purchase comprises a verbal command issued to the motorized transport unit, a shopping list entered at a user interface device, or an item selected through the user interface device.

3. The method of claim 1, wherein the one or more sensors of the motorized transport unit further captures a barcode scan, a radio frequency identification (RFID) scan, and/or an environmental temperature of the display space.

4. The method of claim 1, wherein the determining that the item is available in the display space is based on a presence of the item, an appearance of the item, an expiration date of the item, an appearance of the display space, and/or a storage environment of the item.

5. The method of claim 1, further comprising: instructing the motorized transport unit to travel to the alternative display space.

6. A system for determining item availability in a shopping space comprising:

a communication device configured to communicate with a motorized transport unit including a locomotion system;

an inventory database storing inventory information of a plurality of items available for purchase in the shopping space; and a control circuit coupled to the communication device and the inventory database, the control circuit being configured to:

receive a request for an item for purchase;

cause the motorized transport unit to travel a display space in the shopping space, the display space intended to stock multiple items, including the item for purchase;

receive, from via one or more sensors of the motorized transport unit, image data of at least a portion of the display space;

based on the image data obtained during the capturing step, determine, whether the item for purchase is available in the display space; and in the event the item is not available in the display space, determine an alternative display space for the item for purchase and cause the motorized transport unit to travel to the alternative display space; and determine, based on additional image data captured by the motorized transport unit at the alternative display space, whether the item for purchase is available at the alternative display space.

7. The system of claim 6, wherein the request for the item for purchase comprises one or more of: a verbal command issued to the motorized transport unit, a shopping list entered at a user interface device, and an item selected through the user interface device.

8. The system of claim 6, wherein the one or more sensors of the motorized transport unit further captures a barcode scan, a radio frequency identification (RFID) scan, and/or an environmental temperature of the display space.

9. The system of claim 6, wherein the determination that the item is available in the display space is based one or more of: a presence of the item, an appearance of the item, an expiration date of the item, an appearance of the display space, and a storage environment of the item.

10. The system of claim 6, wherein the control circuit is further configured to instruct the motorized transport unit to travel to the alternative display space.

11. An apparatus for determining item availability in a shopping space comprising:

a wireless transceiver configured to communicate with a central computer system;

a motorized wheel system;

a user interface device;

a sensor;

a control circuit coupled to the wireless transceiver, the motorized wheel system, the user interface device, and the sensor, the control circuit being configured to:

travel, via the motorized wheel system and according to a determined route, to a display space in a shopping space stocking multiple items, including an item for purchase requested by a user;

captured, via the sensor, image data of at least a portion of the display space;

in the event the item is not available in the display space based on the image data, cause the motorized wheel system to travel to an alternative display space for the item for purchase; and determine, based on additional image data captured by the sensor the alternative display space, whether the item for purchase is available at the alternative display space.

12. The apparatus of claim 11, wherein the determined route to the display space is received from the central computer system.

13. The apparatus of claim 11, wherein the determined route to the display space is determined by the control circuit in response to a location of the display space received from the control circuit.

14. The apparatus of claim 11, further comprising one or more sensors for capturing a barcode scan, a radio frequency identification (RFID) scan, and/or an environmental temperature of the display space.

15. The apparatus of claim 11, wherein the determination that the item is available in the display space is based one or more of: a presence of the item, an appearance of the item, an expiration date of the item, an appearance of the display space, and a storage environment of the item.

* * * * *